United States Patent
Aleksic et al.

(10) Patent No.: US 9,001,227 B2
(45) Date of Patent: Apr. 7, 2015

(54) COMBINING DATA FROM MULTIPLE IMAGE SENSORS

(75) Inventors: Milivoje Aleksic, San Diego, CA (US);
Sergiu R. Goma, San Diego, CA (US);
Hau Hwang, San Diego, CA (US);
Joseph Cheung, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 326 days.

(21) Appl. No.: 13/079,629

(22) Filed: Apr. 4, 2011

(65) Prior Publication Data

US 2011/0242356 A1 Oct. 6, 2011

Related U.S. Application Data

(60) Provisional application No. 61/320,940, filed on Apr. 5, 2010, provisional application No. 61/324,259, filed on Apr. 14, 2010, provisional application No. 61/359,312, filed on Jun. 28, 2010, provisional application No. 61/412,755, filed on Nov. 11, 2010.

(51) Int. Cl.
| | |
|---|---|
| *H04N 5/228* | (2006.01) |
| *H04N 5/225* | (2006.01) |
| *H04N 5/235* | (2006.01) |
| *H04N 5/247* | (2006.01) |
| *H04N 5/232* | (2006.01) |
| *H04N 13/00* | (2006.01) |
| *H04N 13/02* | (2006.01) |
| *H04N 9/04* | (2006.01) |

(52) U.S. Cl.
CPC ............. *H04N 5/247* (2013.01); *H04N 5/2258* (2013.01); *H04N 5/232* (2013.01); *H04N 5/23238* (2013.01); *H04N 13/0048* (2013.01); *H04N 13/0239* (2013.01); *H04N 13/0296* (2013.01); *H04N 9/045* (2013.01)

(58) Field of Classification Search
USPC ......... 348/159, 143, 157, 207.99, 218.1, 262, 348/264, 265, 36–50, 222, 1, 221.1
See application file for complete search history.

(56) References Cited

U.S. PATENT DOCUMENTS

| | | |
|---|---|---|
| 4,323,925 A | 4/1982 | Abell et al. |
| 4,523,226 A | 6/1985 | Lipton et al. |
| 5,327,236 A | 7/1994 | Sugimori et al. |

(Continued)

FOREIGN PATENT DOCUMENTS

| | | |
|---|---|---|
| EP | 1906677 A1 | 4/2008 |
| EP | 1912447 A1 | 4/2008 |

(Continued)

OTHER PUBLICATIONS

International Search Report and Written Opinion—PCT/US2011/031285, ISA/EPO—Jul. 4, 2011.

(Continued)

*Primary Examiner* — Ahmed A Berhan
(74) *Attorney, Agent, or Firm* — Espartaco Diaz Hidalgo

(57) ABSTRACT

A method of combining data from multiple sensors is disclosed. The method includes providing a common control signal to multiple image sensors. Each of the multiple image sensors is responsive to the common control signal to generate image data. The method also includes receiving synchronized data output from each of the multiple image sensors.

35 Claims, 35 Drawing Sheets

(56) References Cited

U.S. PATENT DOCUMENTS

| | | | |
|---|---|---|---|
| 5,475,422 A | 12/1995 | Mori et al. | |
| 5,657,095 A | 8/1997 | Yoshida et al. | |
| 5,786,850 A | 7/1998 | Pritchett et al. | |
| 5,870,137 A | 2/1999 | Stuettler | |
| 5,995,140 A | 11/1999 | Cooper et al. | |
| 6,008,839 A | 12/1999 | Nagele et al. | |
| 6,064,355 A | 5/2000 | Donahue et al. | |
| 6,108,005 A | 8/2000 | Starks et al. | |
| 6,233,361 B1 | 5/2001 | Downs | |
| 6,278,480 B1 | 8/2001 | Kurahashi et al. | |
| 6,535,688 B1 | 3/2003 | Kawamura et al. | |
| 6,611,289 B1 | 8/2003 | Yu et al. | |
| 6,750,904 B1 | 6/2004 | Lambert | |
| 7,009,638 B2 | 3/2006 | Gruber et al. | |
| 7,050,085 B1 | 5/2006 | Park et al. | |
| 7,112,774 B2 | 9/2006 | Baer | |
| 7,199,348 B2 | 4/2007 | Olsen et al. | |
| 7,305,180 B2 | 12/2007 | Labaziewicz et al. | |
| 7,319,720 B2 | 1/2008 | Abrams, Jr. | |
| 7,345,701 B2 | 3/2008 | Park et al. | |
| 7,525,576 B2 * | 4/2009 | Kannermark et al. | 348/222.1 |
| 7,561,191 B2 | 7/2009 | May et al. | |
| 7,577,881 B1 | 8/2009 | Shridhar et al. | |
| 8,009,200 B2 * | 8/2011 | Goh et al. | 348/218.1 |
| 8,446,482 B2 * | 5/2013 | McNaughton | 348/222.1 |
| 2002/0122585 A1 | 9/2002 | Swift et al. | |
| 2002/0196332 A1 | 12/2002 | Lipton et al. | |
| 2003/0048354 A1 | 3/2003 | Takemoto et al. | |
| 2003/0179198 A1 | 9/2003 | Uchiyama | |
| 2004/0075741 A1 | 4/2004 | Berkey et al. | |
| 2004/0196378 A1 * | 10/2004 | Kannermark et al. | 348/207.99 |
| 2005/0270385 A1 * | 12/2005 | Shioya et al. | 348/239 |
| 2005/0280702 A1 | 12/2005 | Nakano et al. | |
| 2005/0285945 A1 | 12/2005 | Usui et al. | |
| 2006/0119710 A1 * | 6/2006 | Ben-Ezra et al. | 348/208.99 |
| 2006/0177124 A1 | 8/2006 | Ha | |
| 2006/0181610 A1 * | 8/2006 | Carlsson et al. | 348/159 |
| 2007/0050085 A1 | 3/2007 | Hashimoto et al. | |
| 2007/0081716 A1 | 4/2007 | Ha et al. | |
| 2007/0085903 A1 | 4/2007 | Zhang | |
| 2007/0146478 A1 | 6/2007 | Butler-Smith et al. | |
| 2007/0160361 A1 | 7/2007 | Yanazume | |
| 2007/0183650 A1 | 8/2007 | Lipton et al. | |
| 2007/0248260 A1 | 10/2007 | Pockett | |
| 2008/0013793 A1 | 1/2008 | Hillis et al. | |
| 2008/0024596 A1 | 1/2008 | Li et al. | |
| 2008/0112616 A1 | 5/2008 | Koo et al. | |
| 2008/0204570 A1 | 8/2008 | Schultz et al. | |
| 2008/0266399 A1 * | 10/2008 | McNaughton | 348/181 |
| 2008/0309774 A1 * | 12/2008 | Beng Goh et al. | 348/218.1 |
| 2009/0026267 A1 | 1/2009 | Wang et al. | |
| 2009/0268983 A1 | 10/2009 | Stone et al. | |
| 2010/0182409 A1 | 7/2010 | Suzuki | |
| 2011/0019048 A1 | 1/2011 | Raynor et al. | |
| 2011/0242342 A1 | 10/2011 | Goma et al. | |
| 2011/0242355 A1 | 10/2011 | Goma et al. | |
| 2012/0081519 A1 | 4/2012 | Goma et al. | |
| 2012/0154534 A1 | 6/2012 | Suh et al. | |

FOREIGN PATENT DOCUMENTS

| | | | |
|---|---|---|---|
| GB | 2355612 A | 4/2001 | |
| JP | 7255068 A | 10/1995 | |
| JP | H0822557 A | 1/1996 | |
| JP | 2001069530 A | 3/2001 | |
| JP | 2003111101 A | 4/2003 | |
| JP | 2005130313 A | 5/2005 | |
| JP | 2005522958 A | 7/2005 | |
| JP | 2006013828 A | 1/2006 | |
| JP | 2006518147 A | 8/2006 | |
| JP | 2007189333 A | 7/2007 | |
| JP | 2008193693 A | 8/2008 | |
| JP | 2010541513 A | 12/2010 | |
| RU | 2127961 C1 | 3/1999 | |
| RU | 2250504 C1 | 4/2005 | |
| TW | 200908707 A | 2/2009 | |
| WO | 9418789 | 8/1994 | |
| WO | 0039998 | 7/2000 | |
| WO | 0129649 A1 | 4/2001 | |
| WO | WO0148537 A2 | 7/2001 | |
| WO | 03088682 A | 10/2003 | |
| WO | 2004059579 A1 | 7/2004 | |
| WO | WO2004073299 A1 | 8/2004 | |
| WO | 2008080156 | 7/2008 | |
| WO | 2009048254 A1 | 4/2009 | |

OTHER PUBLICATIONS

Wilburn, et al. "High Performance Imaging Using Large Camera Arrays", Stanford University, viewed May 20, 2010, 12 pp.

Taiwan Search Report—TW100111891—TIPO—Jul. 23, 2013.

* cited by examiner

```
                                        ← 2600
```

```
                    ┌─ 2602
┌─────────────────────────────────────────────────┐
│ Receive lines of image data at an image processor having │
│ an input for a single camera, wherein each line of the image │
│ data includes first line data from a first image captured by a │
│    first camera and second line data from a second image │
│              captured by a second camera                │
└─────────────────────────────────────────────────┘
                            │
                            ▼
                    ┌─ 2604
┌─────────────────────────────────────────────────┐
│   Generate an output frame having a first section     │
│  corresponding to line data of the first image and having a │
│   second section corresponding to line data of the second │
│   image, where the first section and the second section are │
│  configured to be used to generate a three-dimensional (3D) │
│           image format or a 3D video format            │
└─────────────────────────────────────────────────┘
```

FIG. 26

COMBINING DATA FROM MULTIPLE IMAGE SENSORS

PRIORITY CLAIM

This application claims the benefit of, and incorporates by reference, each of U.S. Provisional Application No. 61/320,940 filed Apr. 5, 2010, U.S. Provisional Application No. 61/324,259 filed Apr. 14, 2010, U.S. Provisional Application No. 61/359,312 filed Jun. 28, 2010, and U.S. Provisional Application No. 61/412,755, filed Nov. 11, 2010.

FIELD

The present disclosure is generally related to combining data from multiple image sensors.

DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera and a digital video camera. Also, such wireless telephones can process executable instructions, including software applications, such as a web browser application, that can be used to access the Internet.

In addition, wireless devices may execute three dimensional (3D) applications. In 3D applications, typically at least two image sensors are used to capture depth information from a scene. Frame data from two image sensors is combined and processed to infer distance information and used to construct a 3D representation. Combining image data from each of the sensors typically involves performing frame synchronization and line synchronization, which may result in synchronization and alignment challenges. In addition, filtering of image data from multiple sensors and interleaving such image data may be further complicated when source sensors provide data at different frequencies or phases. It would be advantageous to effectively synchronize data from multiple sensors and efficiently process the data to reduce overall image processing system cost and complexity.

SUMMARY

In multiple camera array applications, image data from each of the multiple sensors is to be synchronized at a line level and processed. An image processing system to combine data from multiple sensors is disclosed where image data from a first image sensor and a second image sensor is synchronized and processed. Synchronized data lines are generated by synchronizing and combining first data from a first data stream generated by the first image sensor with second data from a second data stream generated by the second image sensor. The image signal processor is configured to process the synchronized data lines received from a combiner and to output the processed frame to a display.

In a particular embodiment, a method is disclosed. The method includes providing a common control signal to multiple image sensors to be synchronized. The method further includes receiving a first data line from a first image sensor of the multiple image sensors, receiving a second data line from a second image sensor of the multiple image sensors, and combining the first data line and the second data line to generate a synchronized data line.

In another particular embodiment, an apparatus is disclosed. The apparatus includes a first input configured to receive a first data line from a first image sensor of multiple image sensors to be synchronized via a common control signal. The apparatus further includes a second input configured to receive a second data line from a second image sensor of the multiple image sensors, and a combiner coupled to the first input and to the second input, wherein the combiner is configured to combine the first data line and the second data line to generate a synchronized data line.

In another particular embodiment, a method is disclosed. The method includes providing a common control signal to multiple image sensors. Each of the multiple image sensors is responsive to the common control signal to generate image data. The method further includes receiving synchronized data output from each of the multiple image sensors, combining the synchronized data output from each of the multiple image sensors to generate a synchronized data line, and providing the synchronized data line to an image processor via a single camera input of the image processor.

In another particular embodiment, an apparatus is disclosed. The apparatus includes a sensor synchronizer configured to provide a common control signal to multiple image sensors. Each of the multiple image sensors is responsive to the common control signal to generate image data. The apparatus further includes a combiner configured to combine synchronized data output received from each of the multiple image sensors to generate a synchronized data line to be provided to an image processor via a single camera input of the image processor.

In another particular embodiment, a method is disclosed. The method includes providing a common control signal to multiple image sensors. Each of the multiple image sensors is responsive to the common control signal to generate image data. The method further includes receiving synchronized data output from each of the multiple image sensors.

In another particular embodiment, a method is disclosed. The method includes receiving a common control signal at multiple image sensors. Each of the multiple image sensors is responsive to the common control signal to generate image data. The method further includes generating synchronized data output from each of the multiple image sensors.

In another particular embodiment, an apparatus is disclosed. The apparatus includes a sensor synchronizer configured to provide a common control signal to multiple image sensors to cause the multiple image sensors to generate image data. The apparatus further includes a sensor data interface configured to receive synchronized data output from each of the multiple image sensors.

In another particular embodiment, a method is disclosed. The method includes receiving lines of image data at an image processor having an input for a single camera. Each line of the image data includes first line data from a first image captured by a first camera and second line data from a second image captured by a second camera. The method further includes generating an output frame having a first section corresponding to line data of the first image and having a second section corresponding to line data of the second image. The first section and the second section are configured to be used to generate a three-dimensional (3D) image format or a 3D video format.

In another particular embodiment, an apparatus is disclosed. The apparatus includes an image processor having an input for a single camera. The image processor is configured to receive lines of image data via the input. Each line of the image data includes first line data from a first image captured by a first camera and second line data from a second image captured by a second camera. The image processor is configured to generate an output frame having a first section corresponding to line data of the first image and having a second section corresponding to line data of the second image. The first section and the second section are configured to be used to generate a three-dimensional (3D) image format or a 3D video format In a particular embodiment, a method of combining data from multiple sensors into a frame is disclosed. The method includes receiving a first data stream from a first image sensor, receiving a second data stream a second image sensor, and combining data from the first data stream and from the second data stream to generate a frame. The method further includes processing the frame at an image signal processor to generate a processed frame and outputting the processed frame for display. Each of the first image sensor and the second image sensor is directly responsive to the image signal processor.

In another particular embodiment, an apparatus is disclosed. The apparatus includes a first image sensor configured to generate a first data stream, a second image sensor configured to generate a second data stream, and a combiner configured to combine first data from the first data stream and second data from the second data stream to generate a frame. The apparatus further includes an image signal processor configured to process the frame and to output a processed frame to a display. Each of the first image sensor and the second image sensor is directly responsive to the image signal processor.

In another particular embodiment, a method is disclosed. The method includes receiving first image data of an image from a first image sensor, receiving second image data of an image from a second image sensor, and synchronizing line by line exposure of the first image sensor and the second image sensor during image data acquisition. The first image sensor and the second image sensor are independent of each other. The synchronizing may be line by line and may be frame by frame.

In another particular embodiment, an apparatus is disclosed. The apparatus includes a memory buffer. The memory buffer includes a section to align incoming streams in a deterministic order through the streaming of each frame and a programmable gap section between streams.

In another particular embodiment, a method is disclosed. The method includes receiving rows of image data at an image processor having an input for a single camera. Each row of the image data includes data from a row of a first image captured by a first camera and data from a row of a second image captured by a second camera. The method also includes generating an output having a three dimensional (3D) image format or a 3D video format. The output corresponds to the first image and the second image.

In another particular embodiment, an apparatus is disclosed. The apparatus includes an image processor having an input for a single camera. The apparatus also includes a combiner configured to send rows of image data to the image processor. Each row of the image data includes first data from a row of a first image captured by a first camera and second data from a row of a second image captured by a second camera. The image processor is configured to generate an output having either a three dimensional (3D) image format or a 3D video format. The output corresponds to the first image and the second image.

One particular advantage provided by at least one of the disclosed embodiments is that a single image signal processor may be used to synchronize and control image data from multiple image sensors. Another particular advantage is that having gaps between streams offers the flexibility of processing the combined stream in an image signal processor as a single frame, and avoids contamination of streams by subsequent block-based processing (i.e., if the gap is equal with the biggest block-based processing contamination of streams is avoided).

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIG. 26 is a flow diagram of a particular illustrative embodiment of a method of combining data from multiple sensors at an image signal processor having an input for a single camera;

DETAILED DESCRIPTION

Figure 1:
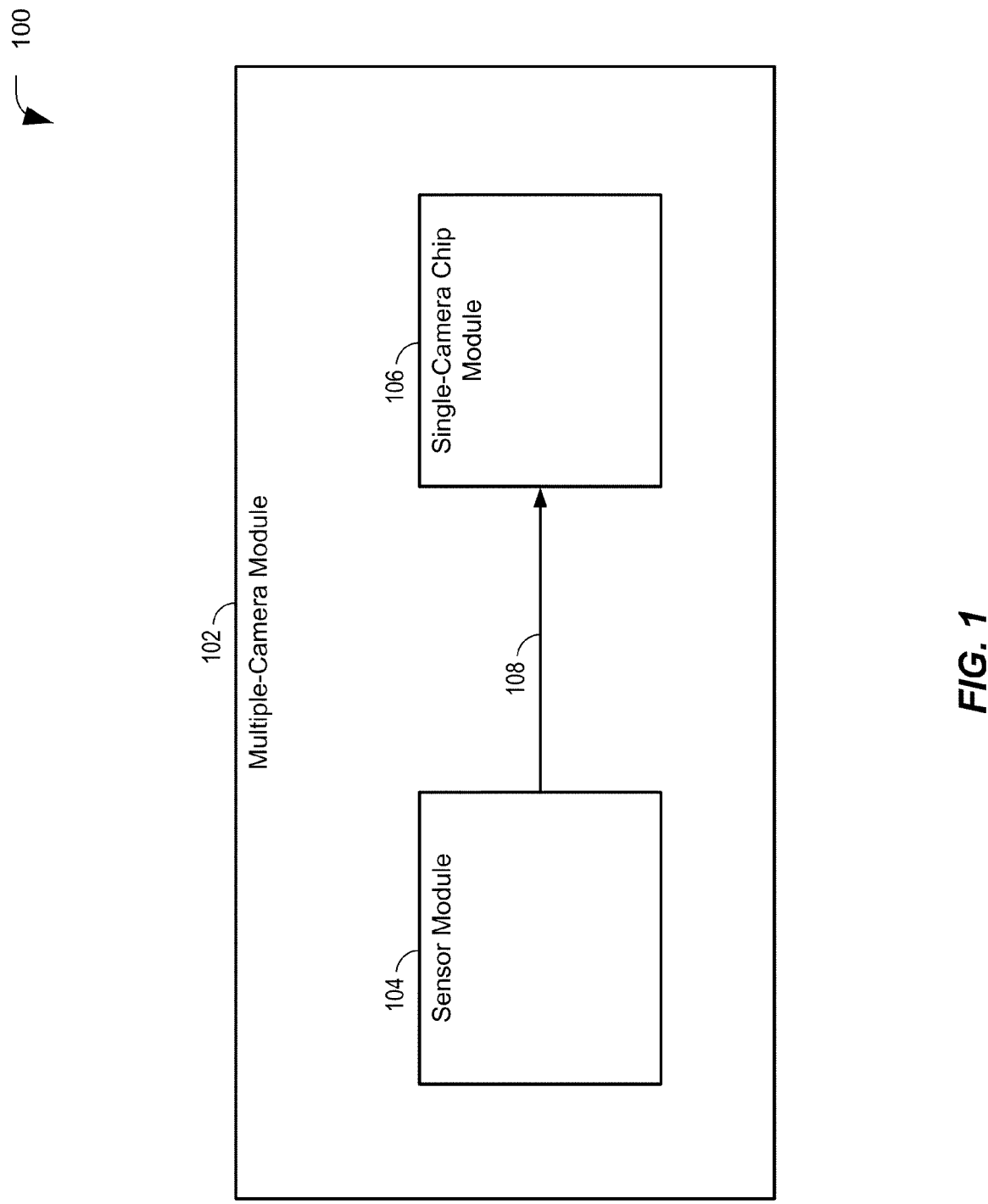
FIG. 1 is a block diagram of a particular illustrative embodiment of an image processing system to combine data from multiple image sensors.

Referring to FIG. 1, a particular illustrative embodiment of an image processing system to combine data from multiple sensors is depicted and generally designated 100. The image processing system 100 includes a multiple camera module 102, a sensor module 104, and a single camera chip module 106. In a particular embodiment, the sensor module 104 may include a plurality of sensors, such as sensors 202 and 204 of FIG. 2 and FIG. 3, where each of the plurality of sensors is configured to generate a data stream that includes data lines of an image. The single camera module 106 may include an image processor having a single camera input, such as image processor 208 of FIG. 2 and FIG. 3. Combining line-by-line image data of the image data streams of multiple sensors into synchronized data lines 108 enables the image processor to perform formatting for multi-camera processing even though the image processor has a single camera input. As a result, the system 100 may be implemented at a reduced cost as compared to a system that uses a separate processor for each camera or that uses a processor having multiple camera inputs.

Figure 2:
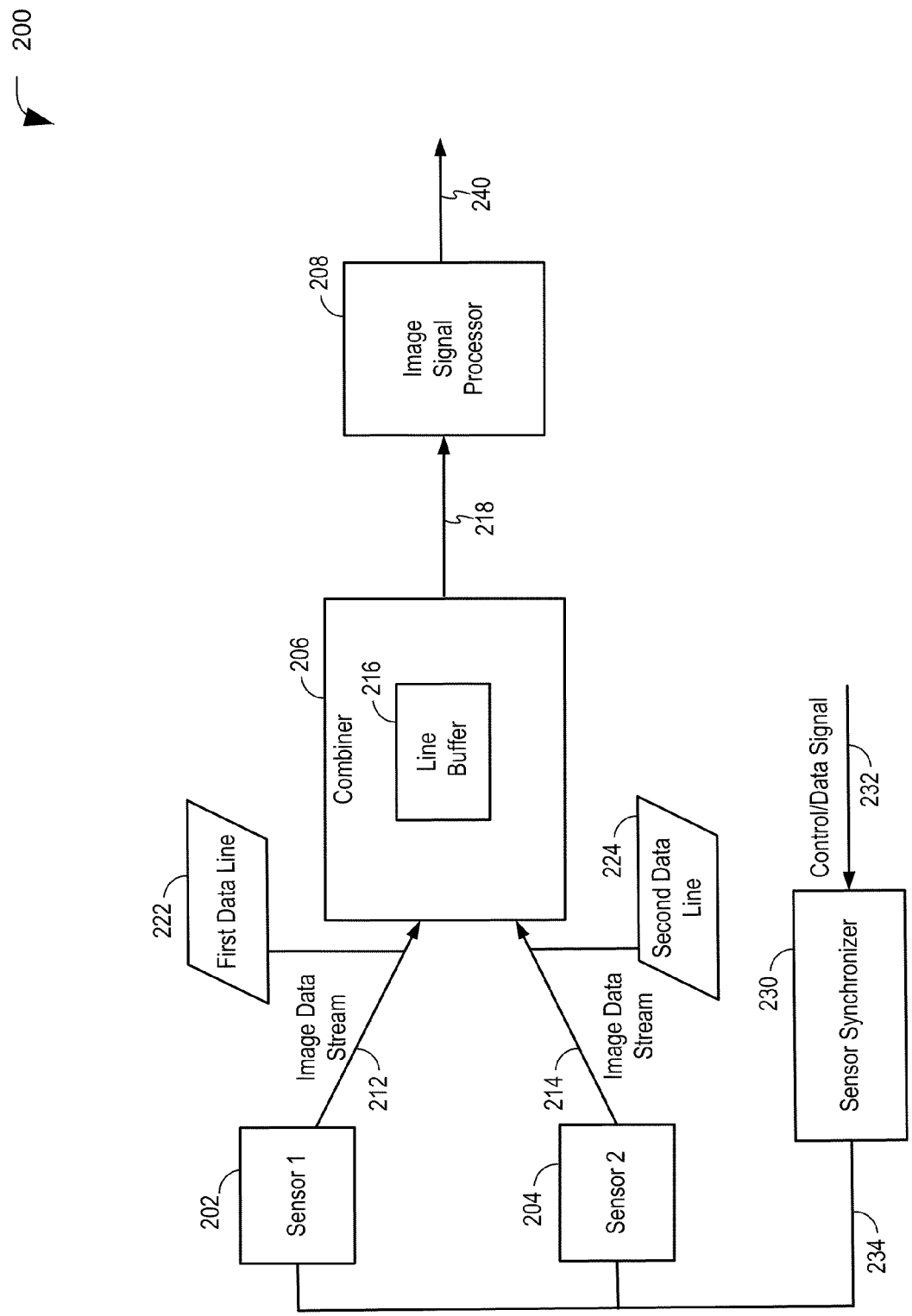
FIG. 2 is a block diagram of a second illustrative embodiment of an image processing system to combine data from multiple image sensors.

Referring to FIG. 2, a particular illustrative embodiment of an image processing system to combine data from multiple sensors is depicted and generally designated 200. The image processing system 200 includes a first sensor 202 and a second sensor 204. The image processing system 200 further includes a combiner 206, an image signal processor or video front end 208, and a sensor synchronizer 230. The image signal processor 208 may be coupled to a display device (not shown). The combiner 206 includes one or more line buffers 216. The image processing system 200 may be integrated in at least one semiconductor die.

The first sensor 202 is configured to generate a first data stream, illustrated as a first image data stream 212. The first image data stream 212 includes a first data line 222. The second sensor 204 is configured to generate a second data stream, illustrated as a second image data stream 214. The second image data stream 214 includes a second data line 224. The first and second sensors 202, 204 may be substantially similar image sensors that are independent of each other and that receive a common control signal 234 from the sensor synchronizer 230. The sensor synchronizer 230 is configured to receive a control/data signal 232 and to output the common control signal 234 to the first and second sensors 202, 204, enabling the first and second sensors 202, 204 to generate closely aligned data streams 212, 214. For example, the data streams 212, 214 may have substantially the same timing characteristics, such as frequency and phase. In a particular embodiment, the control/data signal 232 may be received from the image signal processor 208.

The combiner 206 is responsive to the first image data stream 212 and the second image data stream 214. The combiner 206 is configured to combine data from the first image data stream 212 and data from the second image data stream 214 within the line buffer 216. In a particular embodiment, the line buffer 216 is configured to align first data, such as the first data line 222 from the first sensor 202, and second data, such as the second data line 224 from the second sensor 204. In a particular embodiment, the combiner 206 is responsive to data stored within the line buffer 216 and provides line data 218 to the image signal processor 208. In a particular embodiment, the line data 218 may include a plurality of rows, where each row is a combination of corresponding rows from each sensor 202, 204, such as described with respect to FIG. 6.

Figure 3:
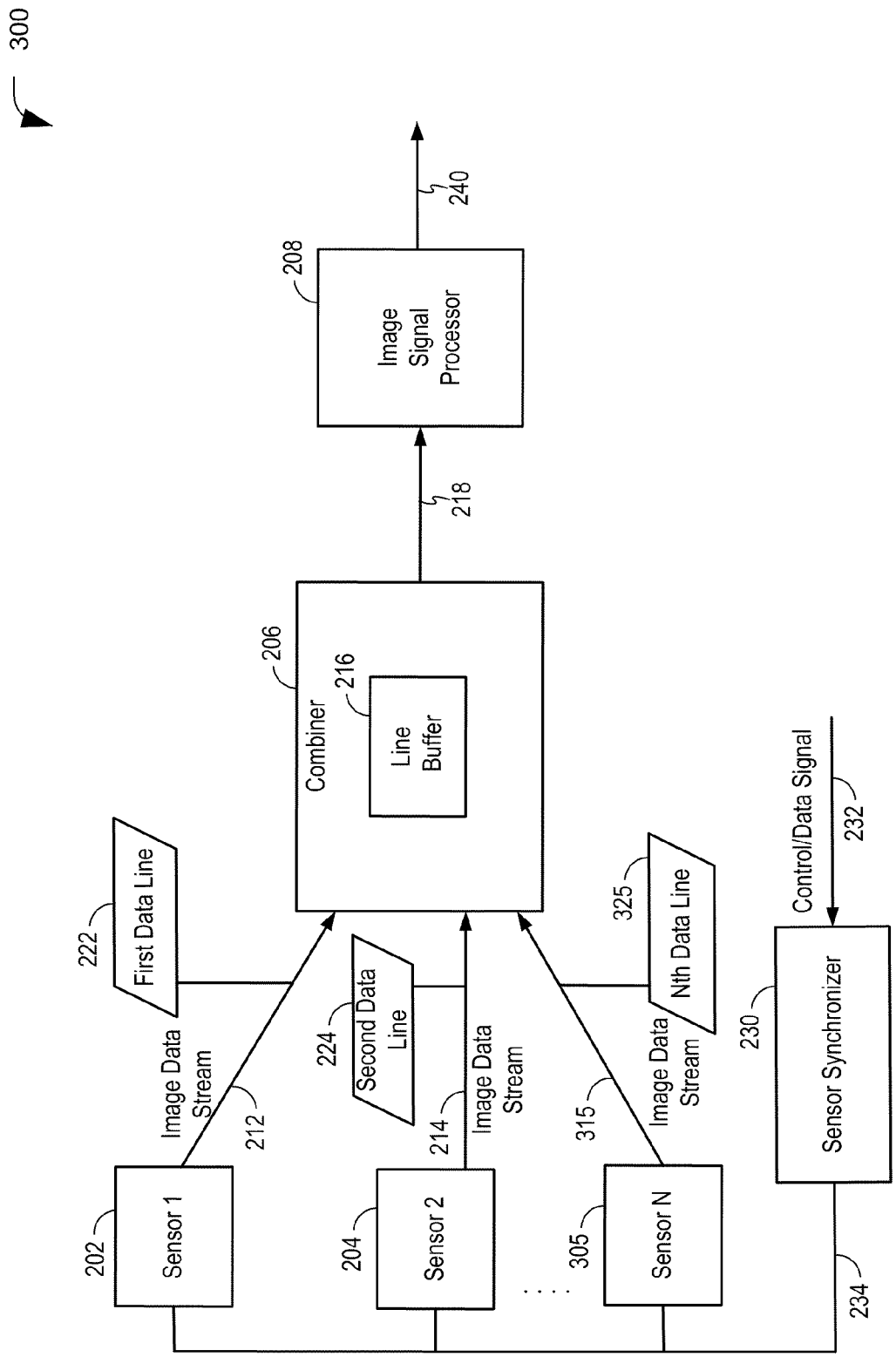
FIG. 3 is a block diagram of a third illustrative embodiment of an image processing system to combine data from multiple image sensors.

The image signal processor 208 is configured to process the line data 218 and to generate processed line data 240. In a particular embodiment, the processed line data 240 may be provided as processed frame data. While two sensors have been shown, it should be understood that other embodiments may include more than two sensors. For example, FIG. 3 depicts an embodiment 300 that includes more than two sensors. An Nth sensor 305 is configured to generate an Nth data stream, illustrated as an Nth image data stream 315. The Nth image data stream 315 includes an Nth data line 325. The Nth sensor 305 may be substantially similar to the first and second image sensors 202, 204 and may receive the common control signal 234 from the sensor synchronizer 230, enabling the first, second, and Nth sensors 202, 204, 305 to generate closely aligned data streams 212, 214, 315. For example, the data streams 212, 214, 315 may have substantially the same timing characteristics, such as frequency and phase. The combiner 206 is responsive to the first image data stream 212, the second image data stream 214, and the Nth image data stream 315. The combiner 206 is configured to combine data from the first image data stream 212, the second image data stream 214, and the Nth image data stream 315 within the line buffer 216.

Because data received from commonly controlled, similar sensors (e.g., 202, 204 of FIG. 2, or 202, 204, 305 of FIG. 3) has substantially the same frequency and phase, synchronization between data streams received at the combiner 206 may occur within a single image line of image data. In a particular embodiment, the line buffer 216 may be dimensioned for a worst case of misalignment (i.e., if the synchronization misalignment is three lines then the line buffer 212 should be sized to buffer at least six lines). As a result, the combined data may be efficiently processed using a single image signal processor. Thus, overall image system cost and complexity may be reduced compared to multiple processor systems (e.g., a processor assigned to each sensor).

Figure 4:
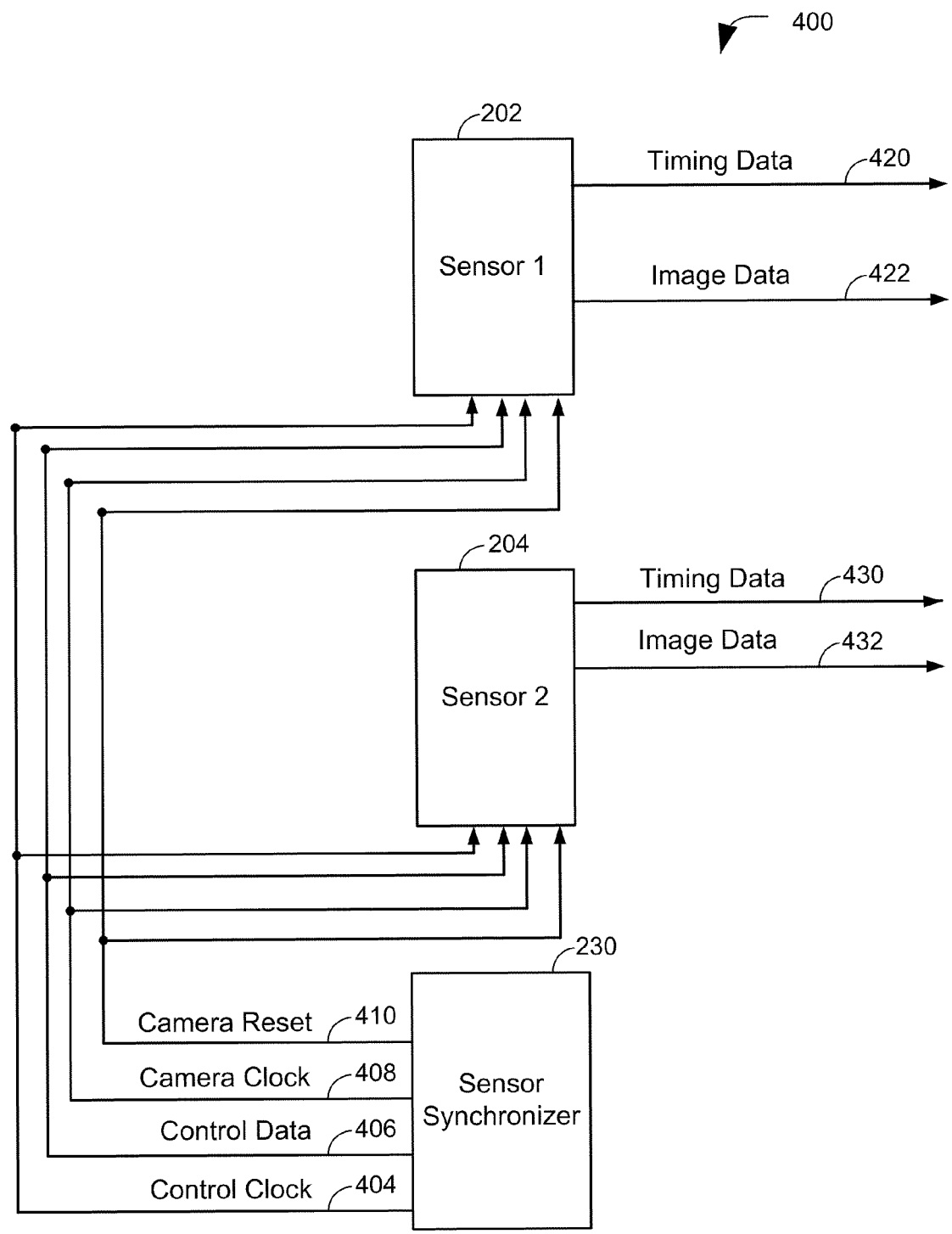
FIG. 4 is a block diagram of a particular illustrative embodiment of a selected portion of the image processing system of FIG. 2, where a first image sensor and a second image sensor receive common control data.

Referring to FIG. 4, a particular illustrative embodiment of a selected portion 400 of the image processing system 200 of FIG. 2 is depicted. The portion 400 of the image processing system includes the first sensor 202, the second sensor 204, and the sensor synchronizer 230. In a particular embodiment, the first sensor 202 and the second sensor 204 are identical sensors or nearly identical sensors that receive the same start-up or reset signals and the same clock input from the sensor synchronizer 230. For example, the first sensor 202 and the second sensor 204 may each receive common control data/signals from the sensor synchronizer 230. In a particular embodiment, the control data/signals may include a control clock signal 404, a control data signal 406, a camera clock signal 408, and a camera reset signal 410. The control data/signals 404-410 may be formed and transmitted via an interface compliant with a two wire inter-chip communication protocol, such as an Inter-Integrated Circuit (I2C) multi-master serial computer bus. Alternatively, the control data/signals 404-410 may be formed and transmitted according to an interface compliant with a specification of a serial interface between a digital camera module and mobile phone engine, such as a Camera Serial Interface (CSI), an interface between a peripheral device (camera) and a host processor (baseband, application engine) such as a Camera Serial Interface 2 (CSI-2), a parallel interface between a digital camera module and a mobile phone engine such as a Camera Parallel Interface (CPI), or other control interfaces.

Figure 5:
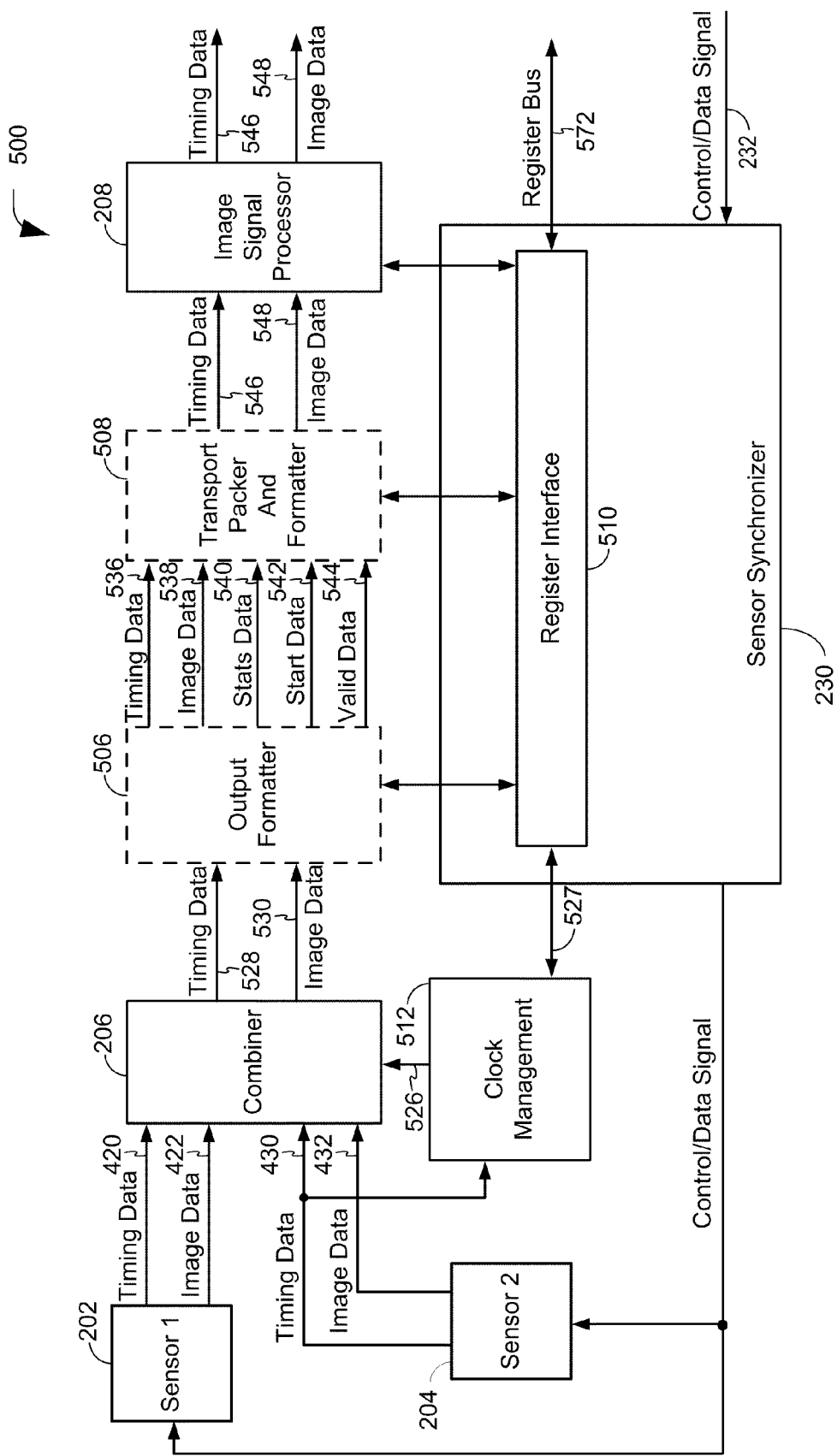
FIG. 5 is a block diagram of a fourth illustrative embodiment of an image processing system to combine data from multiple image sensors.

The first sensor 202 may be configured to send first timing data 420 and first sensor image data 422 to the combiner 206 as illustrated in the system of FIG. 2 or FIG. 5. Similarly, the second sensor 204 may be configured to send second timing data 430 and second sensor image data 432 to the combiner 206 of FIG. 2 or FIG. 5.

During operation, the first sensor 202 and the second sensor 204 each operate in identical or nearly identical conditions from a timing standpoint. For example, the first and second sensors 202, 204 each receive the same control clock signal 404, the same control data signal 406, the same camera clock signal 408, and the same camera reset signal 410. Because the first and second sensors 202, 204 are identical or nearly identical, they operate substantially similarly under the same timing conditions. For example, data output from the first sensor 202 has substantially the same frequency and phase as data output from the second sensor 204. To illustrate, a phase difference between data output from the first sensor 202 and the second sensor 204 may be less than a single horizontal line of phase difference, enabling a single image signal processor to be used to synchronize and control image data from the two image sensors 202, 204.

Referring to FIG. 5, a block diagram of a particular illustrative embodiment of an image processing system to combine data from multiple sensors is depicted and generally designated 500. The system 500 includes the first image sensor 202, the second image sensor 204, the combiner 206, the sensor synchronizer 230, and the image signal processor 208. The system 500 further includes a register interface 510 and a clock management device 512. In a particular embodiment, the register interface 510 may be within the sensor synchronizer 230. Alternatively, the register interface 510 may be a standalone module. In a particular embodiment, the system 500 may further include a thin output formatter 506 (shown in shadow) and a transport packer and formatter 508 (shown in shadow).

In a particular embodiment, the combiner 206 is configured to receive the first timing data 420 and the first sensor image data 422 from the first sensor 202. The combiner 206 is also configured to receive the second timing data 430 and the second sensor image data 432 from the second sensor 204. The combiner 206 is further configured to receive a clock signal 526 from the clock management device 512. The combiner 206 uses the first timing data 420, the first sensor image data 422, the second timing data 430, and the second sensor image data 432 to generate a synchronized data line which is provided to the image signal processor 208. The image signal processor 208 processes the synchronized data line to create processed data line data. The processed data line data may be provided to another component, such as to a display device. Thus, image data from multiple sensors may be combined, processed and rendered for display at a display device.

In a particular embodiment, the first timing data 420 may be associated with a first pixel clock, the first sensor image data 422 may be associated with a first pixel size, the second timing data 430 may be associated with a second pixel clock, and the second sensor image data 432 may be associated with a second pixel size. When the combiner 406 combines the first timing data 420, the first sensor image data 422, the second timing data 430, and the second sensor image data 432 to generate the synchronized data line, a first line of the first image data and a corresponding line of the second image data are combined into a single image line. In a particular embodiment, the size of the single image line may be substantially double that of the first line of the first image data or the corresponding line of the second image data (e.g., double that of the first pixel size or the second pixel size), and the rate of pixel clock of the combined single image line may be substantially double the rate of the first pixel clock or the second pixel clock (e.g., may have a clock frequency that is double the first pixel clock frequency or the second pixel clock frequency). The generated synchronized data line is sent to the image signal processor 208 via a combiner timing data signal 528 and a combiner image data signal 530.

In a particular embodiment, the synchronized data line that is generated by the combiner 206 may be provided to the thin output formatter 506 to create formatted data which is provided to the transport packer and formatter 508 prior to being provided to the image signal processor 208.

In a particular embodiment, the thin output formatter 506 receives the combiner timing data signal 528 and the combiner image data signal 530 to create formatted data. The formatted data may include output formatter timing data signal 536, output formatter image data signal 538, output formatter stats data signal 540, output formatter start data signal 542, and output formatter valid data signal 544. In a particular embodiment, the transport packer and formatter 508 receives the formatted data 536-544 from the thin output formatter 506 and generates a transport data stream including a transport timing data signal 546 and a transport image data signal 548.

In a particular embodiment, the register interface 510 may be coupled to the image signal processor 208 and coupled to the clock management device 512. In a particular embodiment, the register interface 510 may receive a clock signal 527 from the clock management device 512 and may be coupled to a register bus 572. The clock management device 512 is configured to receive the second timing data signal 430 and to output the clock signal 526. In a particular embodiment, the clock signal 526 is substantially double the frequency of the second timing data signal 430 to enable the combiner 206 to maintain a frame processing rate while combining concurrent data from multiple sensors.

Because data output from commonly controlled, similar sensors has substantially the same frequency and phase, synchronization between data streams may occur within a single image line of image data. Thus, the combined data may be efficiently processed using a single image signal processor having access to the single line of image data.

Figure 6:
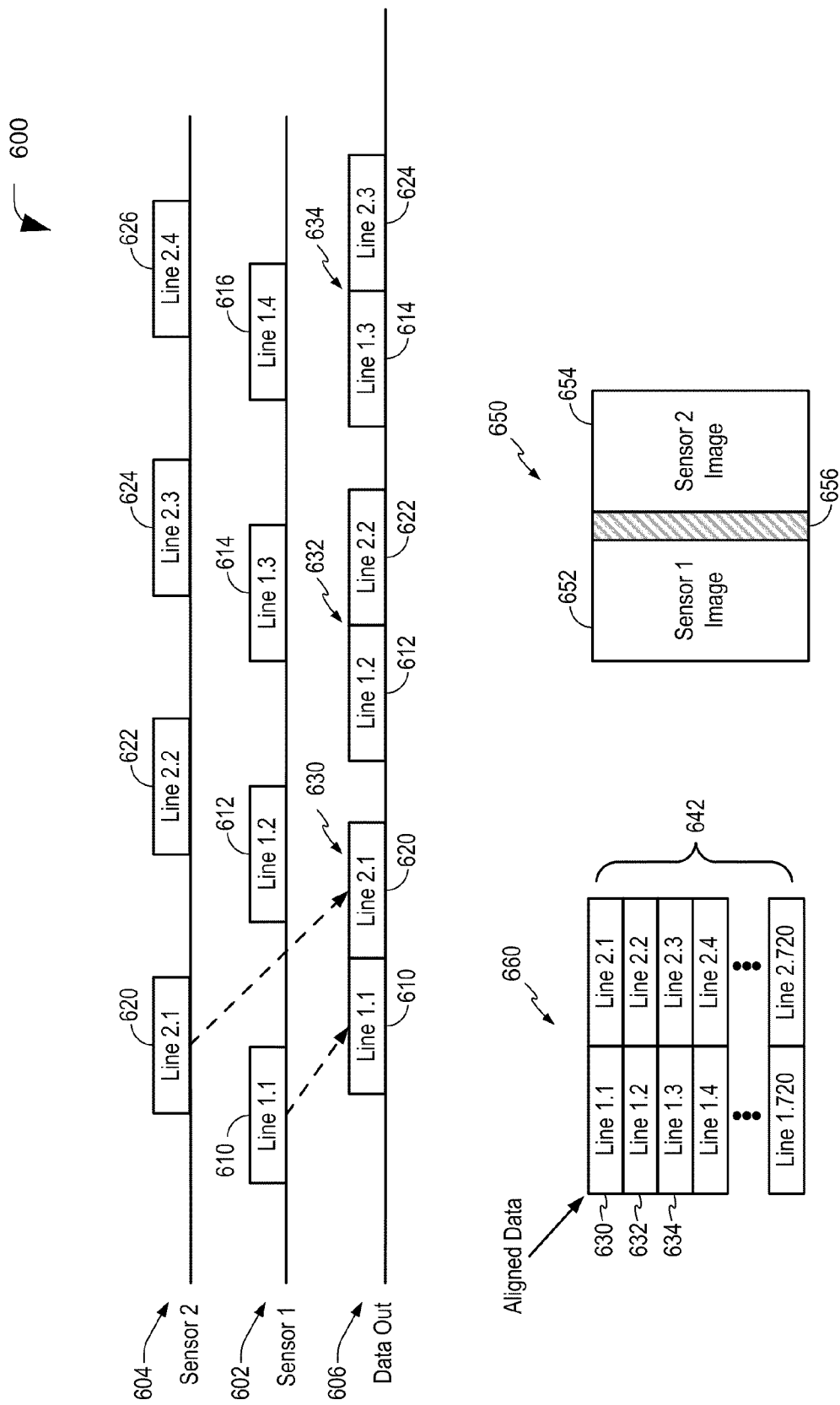
FIG. 6 is a diagrammatic representation of a first embodiment of a first data stream at an output of a first image sensor and a second data stream at an output of a second image sensor being combined to form a synchronized data line.

Referring to FIG. 6, a diagrammatic representation of a particular embodiment of a first data stream at an output of a first image sensor and a second data stream at an output of a second image sensor being combined to form a synchronized data line is depicted and generally designated 600. A first sensor, such as the first sensor 202 of FIG. 2, generates a first data stream 602 that corresponds to first image data of an image. A second sensor, such as the second sensor 204 of FIG. 2, generates a second data stream 604 that corresponds to second image data of the image. Data from the first data stream 602 and data from the second data stream 604 are combined to form a data out data stream 606.

In a particular embodiment, the first data stream 602 includes data associated with a first line of the first image data of the image and the second data stream 604 includes data associated with a corresponding line of the second image data of the image. The first data stream 602 includes line data 610 having a first line index value, line data 612 having a second line index value, line data 614 having a third line index value, and line data 616 having a fourth line index value. The second data stream 604 includes corresponding line data to that of the first data stream, including corresponding line data 620 having the first line index value, corresponding line data 622 having the second line index value, corresponding line data 624 having the third line index value, and corresponding line data 626 having the fourth line index value.

The data out data stream 606 includes a combination of the first line of the first image data of the image and the corresponding line of the second image data of the image. As illustrated, the first data stream 602 and the second data stream 604 are interleaved to form the data out data stream 606. For example, the data out data stream 606 includes combined line data 630 having the first line index value, combined line data 632 having the second line index value, and combined line data 634 having the third line index value. The combined line data 630 includes the line data 610 and the corresponding line data 620. The combined line data 632 includes the line data 612 and the corresponding line data 622. The combined line data 634 includes the line data 614 and the corresponding line data 624. Each combined line 630-634 may be generated by combining corresponding lines within a line buffer, such as the line buffer 216 of FIG. 2.

In a particular embodiment, the data from the first data stream 602 is combined with the data from the second data stream 604 to generate a plurality of synchronized data lines that form a frame 660. The frame 660 may include a plurality of rows 642, where each row corresponds to a line index value and stores a synchronized data line that includes a line of the first image data having the line index value and a corresponding line of the second image data having the line index value. For example, a first row of the frame 660 may include the combined line data 630, a second row of the frame 660 may include the combined line data 632, a third row of the frame 660 may include the combined line data 634, etc. Each synchronized image data line forms part of the frame 660 such that the data in the frame 660 is aligned.

The frame 660 is depicted with an order of the rows 642 matching a read order of the image data from the image sensors (i.e. combined data from the top line of the image sensors (line index 1) is in a top line of the frame 660 and combined data from a next line of the image sensors (line index 2) is in a next line of the frame 660. Alternatively, in other embodiments the rows of the frame 660 may not match a read order of the image data and may instead correspond to any other order of the image data. For example, a top row of the frame 660 may correspond to line index 2 while a next row of the frame 660 may correspond to line index 1. The frame 660 may be programmable such that each of the rows 642 can be programmed to correspond to any of the line index values of the image data.

In a particular embodiment, the first line 610 of the first image data is associated with a first pixel size (e.g., a number of pixels per line) and a first pixel clock, and the corresponding line 620 of the second image data is associated with a second pixel size and a second pixel clock. The first sensor and the second sensor generating the data streams 602, 604 are configured to receive a common clock signal and a common reset signal. When the first line 610 of the first image data and the corresponding line 620 of the second image data are combined into a single image line, the size of the single image line is substantially double that of the first line 610 of the first image data or the corresponding line 620 of the second image data, and the pixel clock signal of the combined single image line (e.g., a third pixel clock signal) has a clock rate that is substantially double that of the first pixel clock signal or the second pixel clock signal. For example, the combined line data 630 may have an image size that is substantially double that of the line data 610 or double that of the corresponding line data 620. Similarly, the pixel clock frequency of the combined line data 630 may have a frequency that is substantially double that of the first pixel clock signal associated with the line data 610 or double that of the second pixel clock signal associated with the corresponding line data 620, such that the pixel clock frequency of the combined line data 630 may be associated with the third pixel clock signal having substantially double the frequency of that of the first pixel clock or the second pixel clock.

Alternatively, in an implementation where line data three image sensors having equal line sizes are combined, a synchronized line size may be substantially three times the sensor line size and a pixel clock rate may be substantially three times a pixel clock rate of the individual sensors. In a general case of an arbitrary number of sensors that may have unequal sizes, a synchronized line size can be set as greater than or equal to a sum of the line sizes that are combined, and a pixel clock rate can be set so that the output line bandwidth is equal to or greater than the sum of the input bandwidth.

The frame 660 may be processed at an image signal processor, such as the image signal processor 208 of FIG. 2, to generate a processed frame 650. The processed frame 650 includes a first section 652 including first image data from a first image sensor, such as the sensor 202 of FIG. 2, a second section 654 including second image data from a second image sensor, such as the sensor 204 of FIG. 2, and a gap section 656. The gap section 656 may include non-image data disposed between the first section 652 and the second section 654.

In a particular embodiment, the first section 652 includes a line of the first image data and the second section 654 includes a corresponding line of the second image data. In a particular embodiment, the gap section 656 may be used for edge filtering and may include a black gap that is approximately five pixels in width. As a further example, the gap section 656 may be added between lines and have a size equal to the size of an interpolation kernel or a size of a largest two-dimensional filter applied to the frame 650 by the image signal processor.

In a particular illustrative embodiment, statistics for automatic exposure, automatic focus, and automatic white balance may be collected from either the first section 652 or the second section 654, either of which may be a full image from one of the respective sensors. Therefore, the statistics for automatic exposure, automatic focus, and automatic white balance may be collected from half of the final image (e.g., the first section 652) and may be applied to both sensors since both sensors are receiving substantially identical timing information. As such, data output from multiple sensors has substantially the same frequency and phase such that synchronization may occur within one image line of image data of the image.

The frame 650 may be stored in a memory that is integrated in at least one semiconductor die. The frame 650 may be stored in memory that is incorporated into a consumer electronic device, such as a set top box, a music player, a video player, an entertainment unit, a navigation device, a communications device, a personal digital assistant (PDA), a fixed location data unit, and a computer. The electronic devices may utilize image processing methods, including 3D applications that process image data from multiple sensors.

Figure 7:
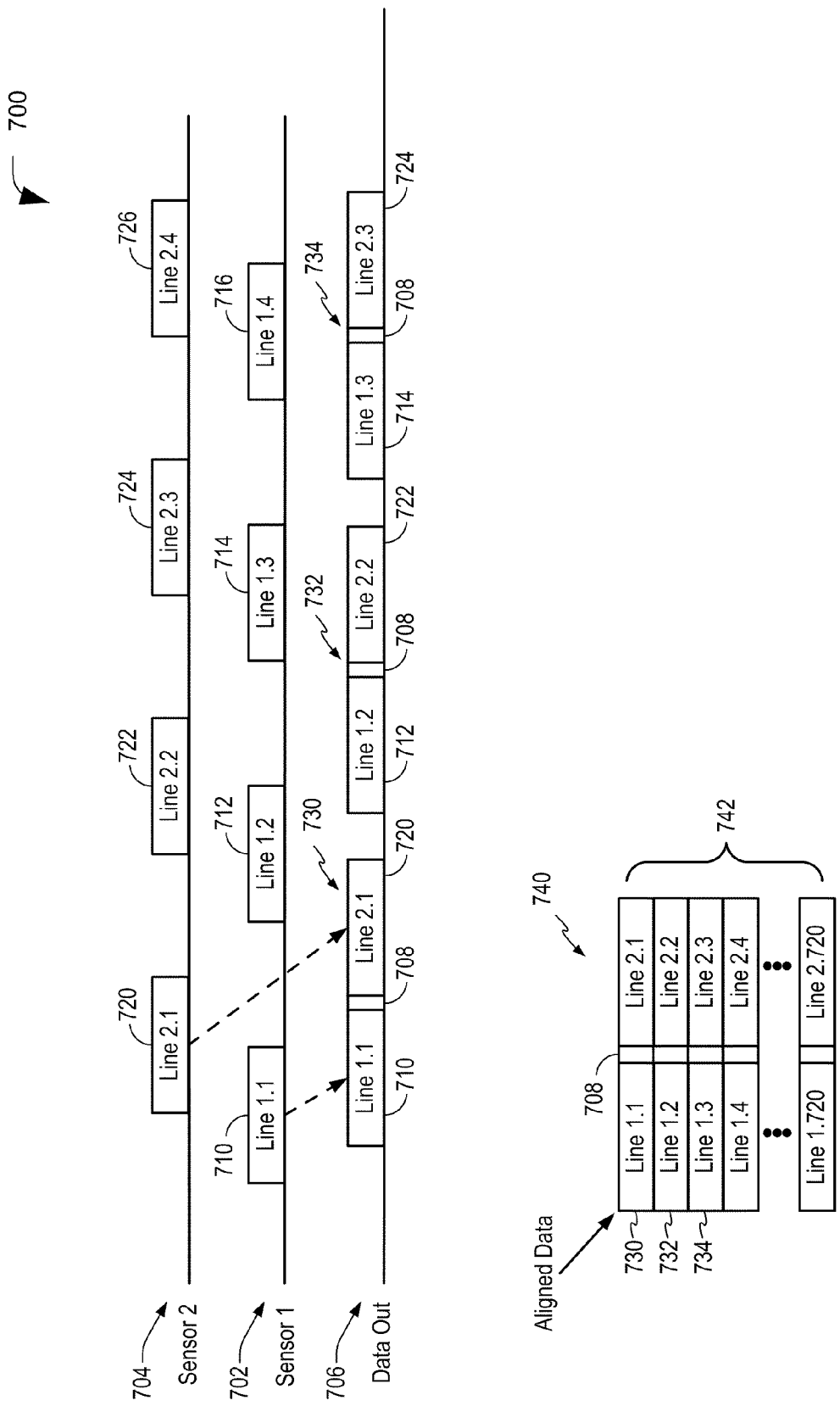
FIG. 7 is a diagrammatic representation of a second embodiment of a first data stream at an output of a first image sensor and a second data stream at an output of a second image sensor being combined to form a synchronized data line.

Referring to FIG. 7, a diagrammatic representation of a second embodiment of a first data stream at an output of a first image sensor and a second data stream at an output of a second image sensor being combined to form a synchronized data line is depicted and generally designated as 700. A first sensor, such as the first image sensor 202 of FIG. 2, generates a first data stream 702 that corresponds to first image data of an image. A second sensor, such as the second image sensor 204 of FIG. 2, generates a second data stream 704 that corresponds to second image data of the image. Data from the first data stream 702 and data from the second data stream 704 are combined to form a data out data stream 706.

In a particular embodiment, the first data stream 702 includes data associated with a first line of the first image data of the image and the second data stream 704 includes data associated with a corresponding line of the second image data of the image. The first data stream 702 includes line data 710 having a first line index value, line data 712 having a second line index value, line data 714 having a third line index value, and line data 716 having a fourth line index value. The second data stream 704 includes corresponding line data to that of the first data stream, including corresponding line data 720 having the first line index value, corresponding line data 722 having the second line index value, corresponding line data 724 having the third line index value, and corresponding line data 726 having the fourth line index value.

The data out data stream 706 includes a combination of the first line of the first image data of the image and the corresponding line of the second image data of the image. As illustrated, the first data stream 702 and the second data stream 704 are interleaved with a gap section 708 to form the data out data stream 706. For example, the illustrated portion of the data out data stream 706 includes combined line data 730 having the first line index value, combined line data 732 having the second line index value, and combined line data 734 having the third line index value. The combined line data 730 includes the line data 710 separated from the corresponding line data 720 by the gap section 708. The combined line data 732 includes the line data 712 separated from the corresponding line data 722 by the gap section 708. The combined line data 734 includes the line data 714 separated from the corresponding line data 724 by the gap section 708. Each combined line 730-734 may be generated by combining corresponding lines with the gap section 708 between the corresponding lines within a line buffer, such as the line buffer 216 of FIG. 2.

In a particular embodiment, the data from the first data stream 702 is combined with the data from the second data stream 704 to generate a plurality of synchronized data lines that form a frame 740. The frame 740 may include a plurality of rows 742, where each row corresponds to a line index value and stores a line of the first image data having the line index value and stores a corresponding line of the second image data having the line index value. For example, a first row of the frame 740 may include the combined line data 730, a second row of the frame 740 may include the combined line data 732, a third row of the frame 740 may include the combined line data 734, etc. such that the data in the frame 740 is aligned.

In a particular embodiment, the first line 710 of the first image data is associated with a first pixel size (e.g., a number of pixels per line) and a first pixel clock, and the corresponding line 720 of the second image data is associated with a second pixel size and a second pixel clock. The first sensor and the second sensor generating the data streams 702, 704 are configured to receive a common clock signal and a common reset signal. When the first line 710 of the first image data and the corresponding line 720 of the second image data are combined into a single image line, the size of the single image line is approximately double that of the first line 710 of the first image data or the corresponding line 720 of the second image data. Further, the pixel clock signal of the combined single image line (e.g., a third pixel clock signal) has a clock rate that is approximately double that of the first pixel clock signal or the second pixel clock signal. For example, the combined line data 730 may have an image size that is approximately double that of the line data 710 or double that of the corresponding line data 720. Similarly, the pixel clock frequency of the combined line data 730 may have a frequency that is approximately double that of the first pixel clock signal associated with the line data 710 or double that of the second pixel clock signal associated with the corresponding line data 720, such that the pixel clock frequency of the combined line data 730 may be associated with the third pixel clock signal having approximately double the frequency of that of the first pixel clock or the second pixel clock.

Each gap section 708 may include non-image data. In a particular embodiment, the non-image data area in the frame 740 formed by the gap sections 708 may be used for edge filtering. The gap section 708 may include a black gap that is approximately five pixels in width. In other embodiments, each gap section 708 has a size equal to the size of an interpolation kernel or a size of a largest two-dimensional filter applied to the frame 740 by an image processor, such as the image processor 208 of FIG. 2. The frame 740 may be processed by the image processor to generate a 3D image.

Figure 8:
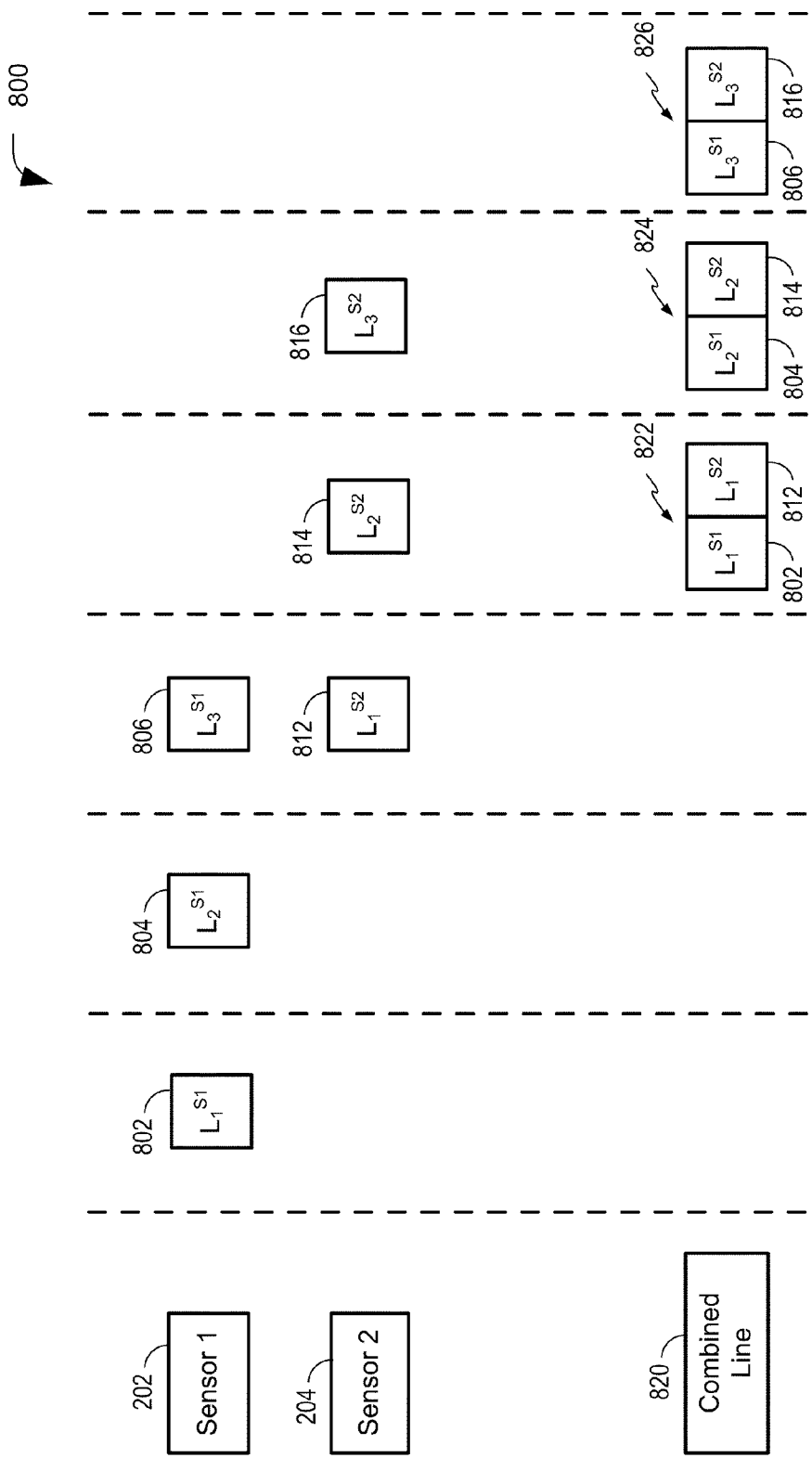
FIG. 8 is a diagrammatic representation of a first embodiment of phase diagram illustrating a two line phase difference between a first data stream from a first sensor and a second data stream from a second sensor.

Referring to FIG. 8, a diagrammatic representation of a first embodiment of a phase diagram illustrating a two line phase difference between a first data stream from a first sensor and a second data stream from a second sensor is depicted and generally designated 800. A first sensor, such as the first sensor 202 of FIG. 2, generates a first data stream that includes first sensor first line data 802, first sensor second line data 804, and first sensor third line data 806. A second sensor, such as the second sensor 204 of FIG. 2, generates a second data stream that includes second sensor first line data 812, second sensor second line data 814, and second sensor third line data 816. Data from the first data stream and data from the second data stream are combined to form a combined line 820. In the particular embodiment illustrated in FIG. 8, first, second and third line data is illustrated. Alternatively, any number of line data may be generated (e.g., 720 lines as illustrated in FIGS. 6 and 7).

In the particular embodiment of FIG. 8, there is a two line phase difference between data of the first data stream and data of the second data stream. For example, the first sensor first line data 802 may be received by a combiner such as combiner 216 of FIG. 2 during a first line phase, the first sensor second line data 804 may be received during a second line phase, and the first sensor third line data 806 and the second sensor first line data 812 may be received during a third line phase. As such, there is a two line phase difference between the first sensor first line data 802 and the second sensor first line data 812.

The combined line 820 includes a combination of the first line of the first image data of the image and the corresponding line of the second image data of the image. As illustrated, the first data stream and the second data stream are interleaved to form the combined line 820. For example, the combined line 820 includes combined line data 822 having the first sensor first line data 802 and the second sensor first line data 812, combined line data 824 having the first sensor second line data 804 and the second sensor second line data 814, and combined line data 826 having the first sensor third line data 806 and the second sensor third line data 816. Each combined line 822-826 may be generated by combining corresponding lines within a line buffer, such as the line buffer 216 of FIG. 2. The line buffer may be configured to buffer at least a portion of a next data line (e.g. the first sensor second line data 804) that is received from the first image sensor before a synchronized data line (e.g. the combined line data 822) is generated. As such, data output from multiple sensors having a two line phase difference may be combined such that synchronization may occur within one image line of image data of the image.

Figure 9:
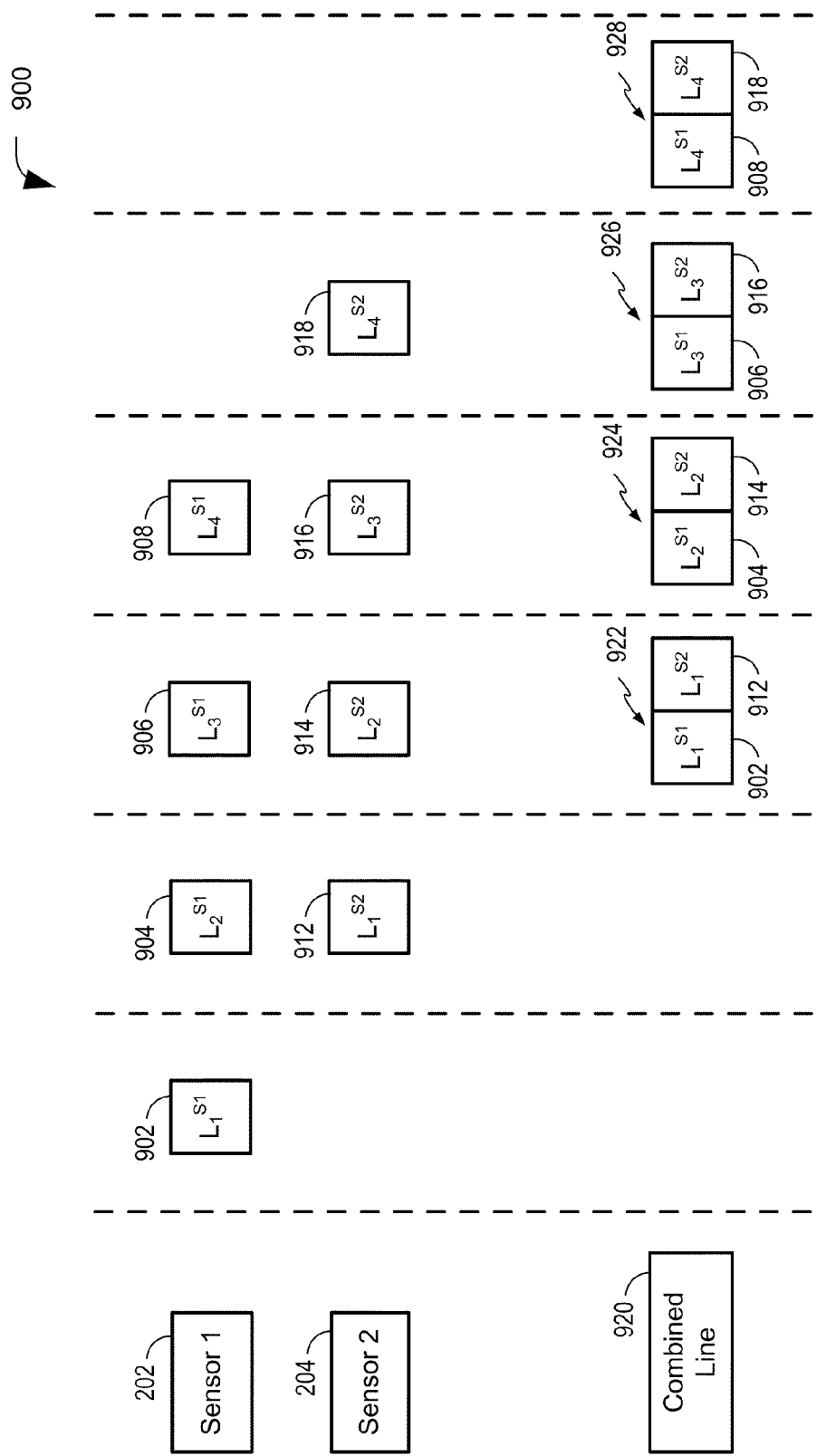
FIG. 9 is a diagrammatic representation of a second embodiment of phase diagram illustrating a one line phase difference between a first data stream from a first sensor and a second data stream from a second sensor.

Referring to FIG. 9, a diagrammatic representation of a first embodiment of a phase diagram illustrating a one line phase difference between a first data stream from a first sensor and a second data stream from a second sensor is depicted and generally designated 900. A first sensor, such as the first sensor 202 of FIG. 2, generates a first data stream that includes first sensor first line data 902, first sensor second line data 904, first sensor third line data 906, and first sensor fourth line data 908. A second sensor, such as the second sensor 204 of FIG. 2, generates a second data stream that includes second sensor first line data 912, second sensor second line data 914, second sensor third line data 916, and second sensor fourth line data 918. Data from the first data stream and data from the second data stream are combined to form a combined line 920. In the particular embodiment illustrated in FIG. 9, first, second, third, and fourth line data is illustrated. Alternatively, any number of line data may be generated (e.g., 720 lines as illustrated in FIGS. 6 and 7).

In the particular embodiment of FIG. 9, there is a one line phase difference between data of the first data stream and data of the second data stream. For example, the first sensor first line data 902 may be received by a combiner such as combiner 216 of FIG. 2 during a first line phase, and the first sensor second line data 904 and the second sensor first line data 912 may be received during a second line phase. As such, there is a one line phase difference between the first sensor first line data 902 and the second sensor first line data 912.

The combined line 920 includes a combination of the first line of the first image data of the image and the corresponding line of the second image data of the image. As illustrated, the first data stream and the second data stream are interleaved to form the combined line 920. For example, the combined line 920 includes combined line data 922 having the first sensor first line data 902 and the second sensor first line data 912, combined line data 924 having the first sensor second line data 904 and the second sensor second line data 914, combined line data 926 having the first sensor third line data 906 and the second sensor third line data 916, and combined line data 928 having the first sensor fourth line data 908 and the second sensor fourth line data 918. Each combined line 922-926 may be generated by combining corresponding lines within a line buffer, such as the line buffer 216 of FIG. 2. As such, data output from multiple sensors having a one line phase difference may be combined such that synchronization may occur within one image line of image data of the image.

Figure 10:
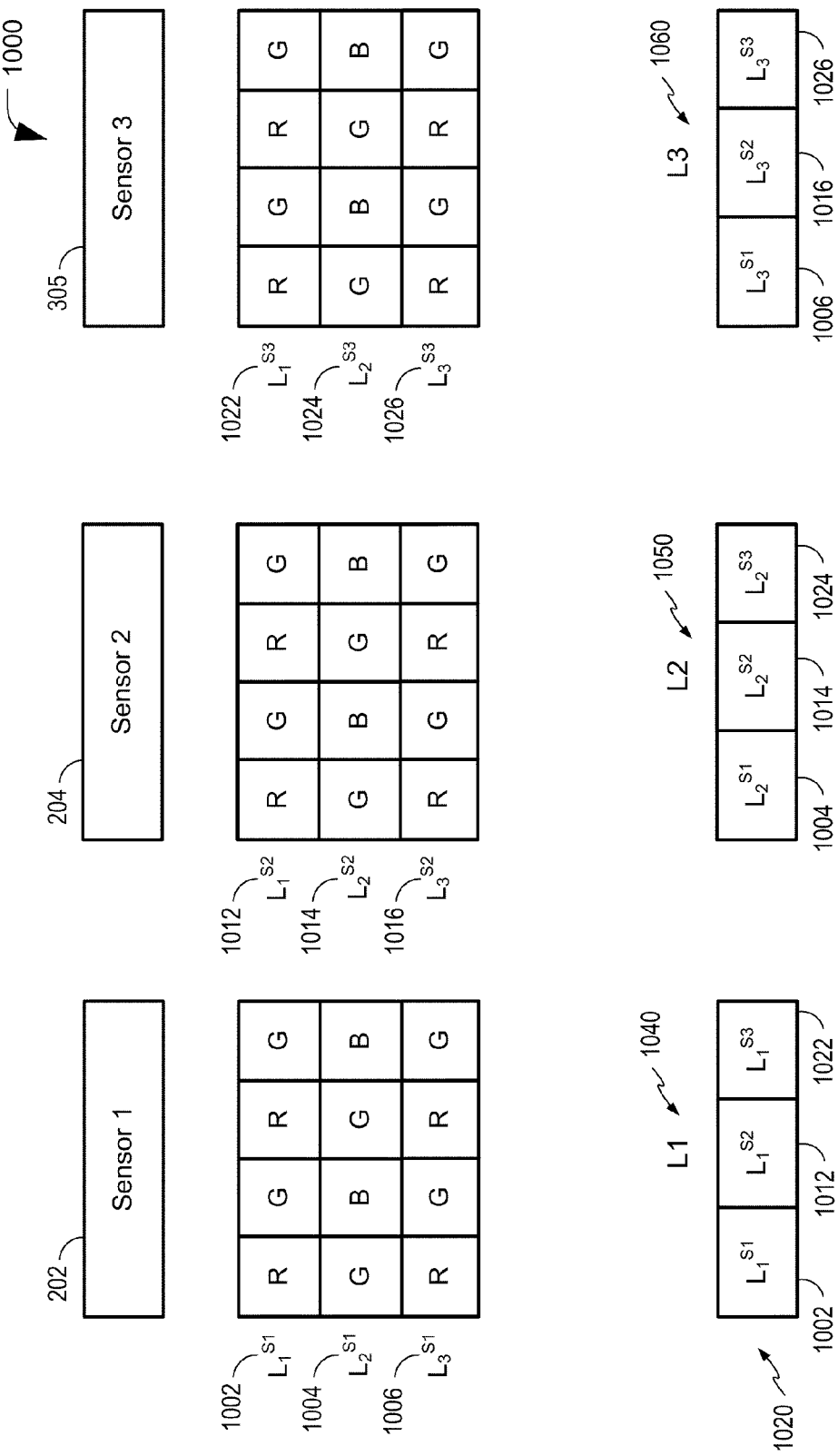
FIG. 10 is a diagrammatic representation illustrating pixel data of each of a plurality of sensors and illustrating synchronized data lines.

Referring to FIG. 10, a diagrammatic representation illustrating red-green-blue (RGB) data for each of a plurality of sensors and illustrating synchronized data lines is depicted and generally designated 1000. In the embodiment illustrated in FIG. 10, a first sensor, such as the first sensor 202 of FIG. 3, generates a first data stream that includes first sensor first line data 1002, first sensor second line data 1004, and first sensor third line data 1006. A second sensor, such as the second sensor 204 of FIG. 3, generates a second data stream that includes second sensor first line data 1012, second sensor second line data 1014, and second sensor third line data 1016. A third sensor, such as the Nth sensor 305 of FIG. 3, generates a third data stream that includes third sensor first line data 1022, third sensor second line data 1024, and third sensor third line data 1026. Data from the first data stream, data from the second data stream, and data from the third data stream are combined to form a combined line 1020.

As an illustrative example, each of the first line data 1002, 1012, 1022 includes alternating red and green pixel values, each of the second line data 1004, 1014, 1024 includes alternating green and blue pixel values, and each of the third line data 1006, 1016, 1026 includes alternating red and green pixel values according to a Bayer filter pattern.

As illustrated, the first data stream, the second data stream, and the third data stream are interleaved to form a combined line data stream 1020. For example, the combined line data stream 1020 includes combined line data 1040 having the first sensor first line data 1002, the second sensor first line data 1012, and the third sensor first line data 1002, combined line data 1050 having the first sensor second line data 1004, the second sensor second line data 1014, and the third sensor second line data 1024, and combined line data 1060 having the first sensor third line data 1006, the second sensor third line data 1016, and the third sensor third line data 1026. Each combined line 1040-1060 may be generated by combining corresponding lines within a line buffer, such as the line buffer 216 of FIG. 3. Each combined line 1040-1060 may include raw pixel (e.g., R, G, and B) values read from its respective sensor line data to be demosaiced at an image signal processor, such as the image signal processor 208 of FIG. 3. As such, data output from multiple sensors may be combined such that synchronization may occur within one image line of image data of the image.

Although FIG. 10 illustrates raw pixel values as including RGB data according to a Bayer filter pattern, in other embodiments the line data from the sensors may not include Bayer RGB pixel values. For example, the sensors may instead provide: luma, blue-difference chroma, red-difference chroma (YCbCr) values; cyan, yellow, green, and magenta (CYGM) values; red, green, blue, and emerald (RGBE) values; red, green, blue, and white (RGBW) values; or any other type of values, as illustrative, non-limiting examples. Alternatively, or in addition, one or more of the sensors may implement panchromatic cells, microlenses over groups of photoreceptors, vertical color filters, or any other sensor technology capable of line-by-line readout of raw image data.

Figure 11:
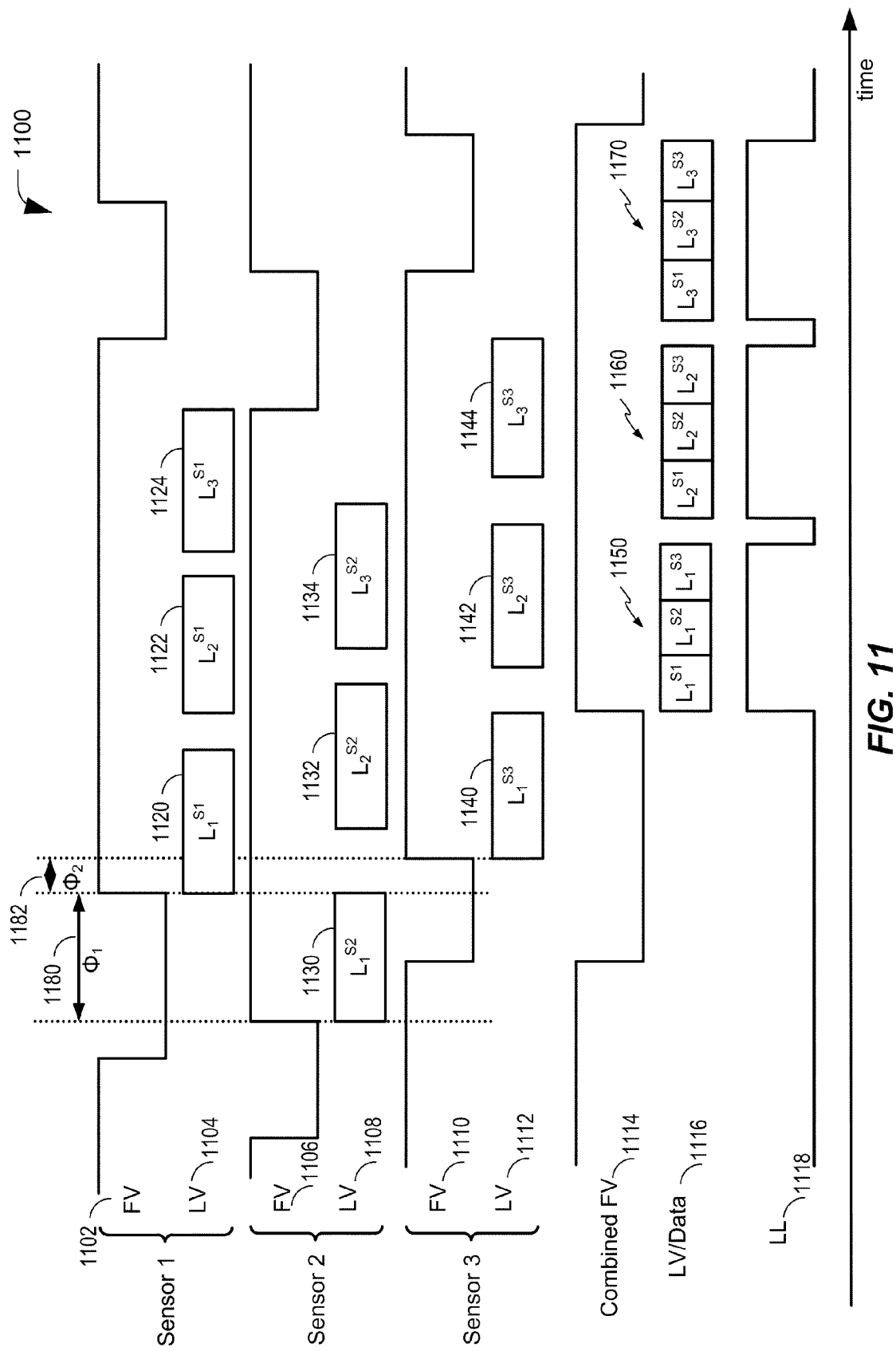
FIG. 11 is a timing diagram illustrating frame valid and line valid signal timing for multiple sensors.

Referring to FIG. 11, a particular embodiment of a timing diagram illustrating signal timing associated with an apparatus having multiple sensors is depicted and generally designated 1100. The signals include a frame valid (FV) signal 1102 and a line valid (LV) signal 1104 of a first sensor, an FV 1106 and an LV 1108 of a second sensor, and an FV 1110 and an LV 1112 of a third sensor. In a particular embodiment, the first sensor, the second sensor, and a third sensor may be the first, second, and third sensors 202, 204, 305 of FIG. 3. A combined frame valid signal 1114 is also illustrated in conjunction with a combined line valid/data signal 1116 and a line load (LL) signal 1118.

In a particular embodiment, the signals 1114-1118 correspond to signaling related to one or more synchronized data lines of a frame, such as the frame 660 of FIG. 6 generated by a combiner, and the signals 1102-1112 correspond to signaling received at the combiner. As illustrated, a first line data 1120, a second line data 1122, and a third line data 1124 are received from the first sensor, a first line data 1130, a second line data 1132, and a third line data 1134 are received from the second sensor, and a first line data 1140, a second line data 1142, and a third line data 1144 are received from the third sensor.

The first line data 1130 is received from the second sensor prior to the first line data 1120 and the first line data 1140. A phase difference between receipt of the first line data 1130 and the first line data 1120 is illustrated as a first phase difference 1180. The first line data 1120 of the first sensor is received prior to the first line data 1140 of the third sensor, illustrated as a second phase difference 1182. The line data from each of the sensors may follow a rising edge of a corresponding frame valid signal, indicating that data received via an image data line is valid line data from each particular sensor. As illustrated, the combined frame valid line 1114 remains low, indicating non-valid data, until after each of the first line data 1120, 1130, and 1140 have been received, such as at the combiner 206 of FIG. 2. After each of the first lines 1120, 1130, and 1140 has been received, the combined frame valid signal 1114 rises to indicate valid data on the line valid signal 1116. A first synchronized data line 1150 is generated in conjunction with a valid signal being asserted on the LL line 1118. After generation of the first synchronized line data 1150, the combined frame valid signal 1114 remains in a valid state while the LL signal 1118 returns to a non-valid state, after which the LL signal 1118 returns to a valid state upon generation of a second synchronized data line 1160, which is followed by generation of a third synchronized data line 1170.

Figure 12:
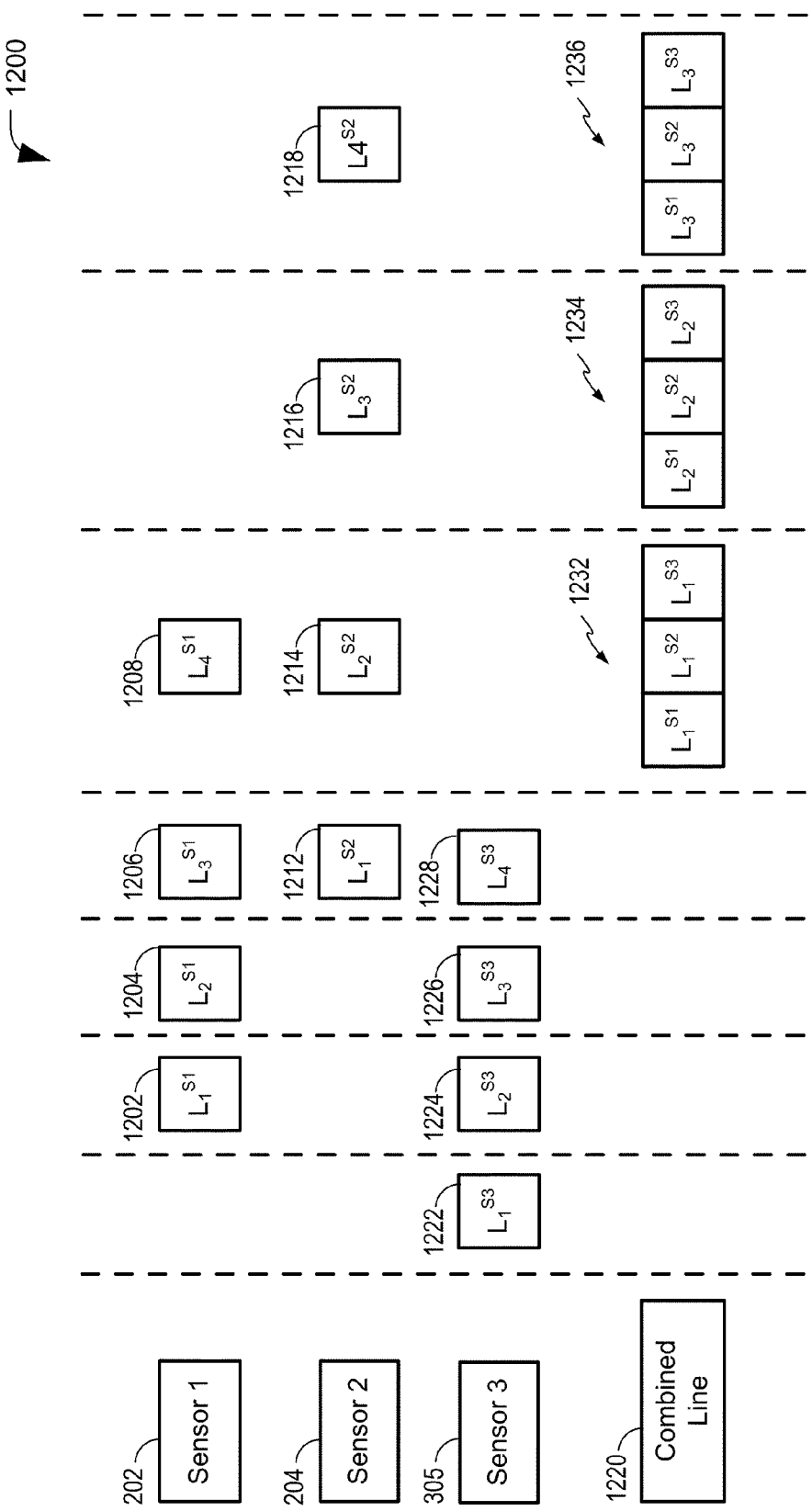
FIG. 12 is a diagrammatic representation of a third embodiment of phase diagram illustrating a three line phase difference between a first data stream from a first sensor and a second data stream from a second sensor.

Referring to FIG. 12, a diagrammatic representation of a first embodiment of a phase diagram illustrating a three line phase difference between a first data stream from a first sensor, a second data stream from a second sensor, and a third data stream from a third sensor is depicted and generally designated 1200. A first sensor, such as the first sensor 202 of FIG. 3, generates a first data stream that includes first sensor first line data 1202, first sensor second line data 1204, first sensor third line data 1206, and first sensor fourth line data 1208. A second sensor, such as the second sensor 204 of FIG. 3, generates a second data stream that includes second sensor first line data 1212, second sensor second line data 1214, second sensor third line data 1216, and second sensor fourth line data 1218. A third sensor, such as the Nth sensor 305 of FIG. 3, generates a third data stream that includes third sensor first line data 1222, third sensor second line data 1224, third sensor third line data 1226, and third sensor fourth line data 1228. Data from the first data stream, data from the second data stream, and data from the third data stream are combined to form a combined line 1220. In the particular embodiment illustrated in FIG. 12, first, second, third, and fourth line data is illustrated. Alternatively, any number of line data may be generated (e.g., 720 lines as illustrated in FIGS. 6 and 7).

In a particular embodiment, there is a three line phase difference between data of the first data stream, data of the second data stream, and data from the third data stream. For example, the third sensor first line data 1222 may be received by a combiner such as combiner 216 of FIG. 2 during a first line phase, the first sensor first line data 1202 and the third sensor second line data 1224 may be received during a second line phase, the first sensor second line data 1204 and the third sensor third line data 1226 may be received during a third line phase, and the first sensor third line data 1206, the second sensor first line data 1212, and the third sensor fourth line data 1228 may be received during a fourth line phase. As such, there is a three line phase difference between the first sensor first line data 1202, the second sensor first line data 1212, and the third sensor first line data 1222.

The combined line 1220 includes a combination of the first line of the first image data of the image and the corresponding line of the second image data and the third image data of the image. As illustrated, the first data stream, the second data stream, and the third data stream are interleaved to form the combined line 1220. For example, the combined line 1220 includes combined line data 1232 having the first sensor first line data 1202, the second sensor first line data 1212, and the third sensor first line data 1222, combined line data 1234 having the first sensor second line data 1204, the second sensor second line data 1214, and the third sensor second line data 1224, and combined line data 1236 having the first sensor third line data 1206, the second sensor third line data 1216, and the third sensor third line data 1226. Each combined line 1232-1236 may be generated by combining corresponding lines within a line buffer, such as the line buffer 216 of FIG. 3. As such, data output from multiple sensors having a three line phase difference may be combined such that synchronization may occur within one image line of image data of the image.

Figure 13:
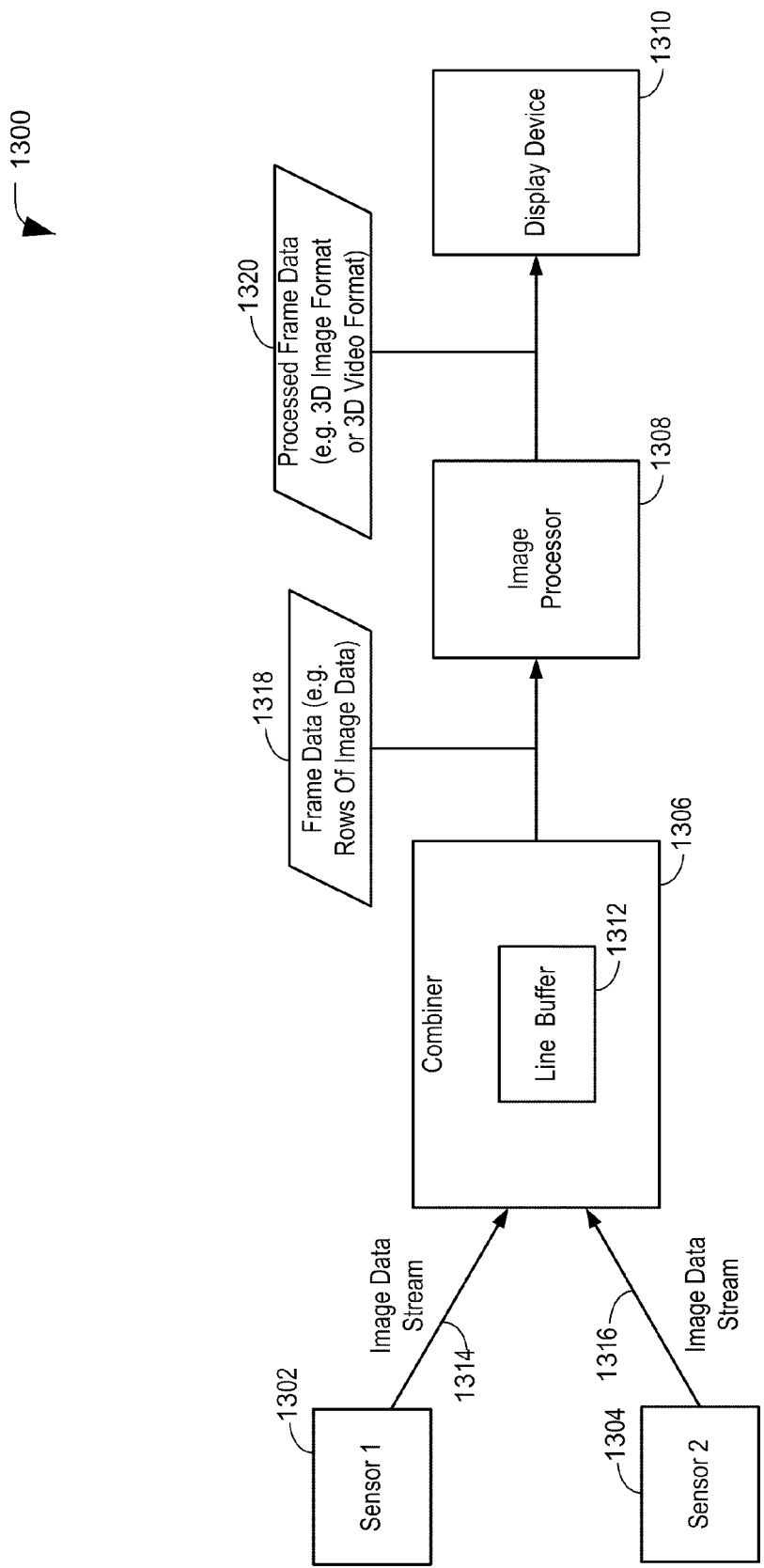
FIG. 13 is a block diagram of a particular illustrative embodiment of an image processing system to combine data from multiple image sensors to produce a three dimensional image format.

Referring to FIG. 13, a particular illustrative embodiment of an image processing system to combine data from multiple sensors to generate 3D data is depicted and generally designated 1300. The image processing system 1300 includes a first image sensor 1302 and a second image sensor 1304. The image processing system 1300 further includes a combiner 1306 and an image processor 1308. The image processor 1308 is coupled to a display device 1310. The combiner 1306 includes at least one line buffer 1312. The image processing system 1300 may be integrated in at least one semiconductor die.

The first image sensor 1302 is configured to generate a first data stream, illustrated as a first image data stream 1314, and the second image sensor 1304 is configured to generate a second data stream, illustrated as a second image data stream 1316. In a particular embodiment, the first image data stream 1314 may be asynchronous to the second image data stream 1316. The first and second image sensors 1302, 1304 may be substantially similar image sensors that are independent of each other and that may receive a common control signal from a processor (e.g., the combiner 1306 or the image processor 1308) to generate closely aligned image data streams 1314, 1316. For example, the image data streams 1314, 1316 may have substantially the same timing characteristics, such as frequency and phase. Because the common control signal may be generated by the processor, such as via the signal synchronizer 230 of FIG. 2, each of the image sensors 1302, 1304 may be directly responsive to, and controlled by, the single processor. While two image sensors 1302, 1304 have been shown, it should be understood that more than two image sensors may be used with the image processing system 1300.

The combiner 1306 is responsive to the first image data stream 1314 and the second image data stream 1316. The combiner 1306 is configured to combine data from the first image data stream 1314 and data from the second image data stream 1316 within the line buffer 1312. In a particular embodiment, the line buffer 1312 is configured to align first data from the first image sensor 1302 and second data from the second image sensor 1304. In a particular embodiment, the combiner 1306 is responsive to data stored within the line buffer 1312 and provides frame data 1318 to the image processor 1308. In a particular embodiment, the frame data 1318 may include a plurality of rows of image data, where each row is a combination of corresponding rows from each sensor 1302, 1304, such as described with respect to FIG. 3.

The image processor 1308 is configured to process the frame data 1318 and to output processed frame data 1320 to the display device 1310. The processed frame data 1320 may have a 3D image format or a 3D video format.

The display device 1310 renders and displays image data in response to receiving the processed frame data 1320. Thus, image data from multiple image sensors may be combined, processed and then rendered for display at the display device 1310. In a particular embodiment, the display device 1310 may be decoupled from the image processor 1308 to not be directly responsive to the image processor 1308. For example, the display device 1310 may be a separate device from the image processor 1308.

Because data received from the commonly controlled, similar image sensors 1302, 1304 may have substantially the same frequency and phase, synchronization between the data streams 1314, 1316 may occur within a single image line of image data. In a particular embodiment, the line buffer 1312 may be dimensioned for a worst case of misalignment (e.g., if the synchronization misalignment is three lines, then the line buffer 1312 should be sized to store at least six lines). As a result, the combined data may be efficiently processed using a single image processor 1308. Thus, overall image system cost and complexity may be reduced compared to multiple processor systems (e.g., a processor assigned to each sensor).

Embodiments may be configured to provide 3D/stereoscopic images and/or video data. For example, in one such embodiment, the first image sensor 1302 and the second image sensor 1304 may be positioned side by side so as to provide left/right (stereoscopic) images. The signal provided by the combiner 1306 is received and may be processed by the image processor 1308 to produce 3D images. A user command may allow the image processor 1308 to receive and process data from only a single sensor (i.e., the first image sensor 1302 or the second image sensor 1304) to produce two dimensional (2D) images in lieu of producing 3D images.

An image processor having an input for a single camera, such as image processor 1308, is able to process data that can be used for 3D processing by using combined data from two cameras provided by the combiner 1306. The image processor 1308 may receive image data from the combiner 1306 or from a memory that stores image data from the combiner 1306. In one such embodiment, the image processor 1308 processes received image data as 2D image/video data so that subsequent processing by the image processor 1308 provides a 3D stereoscopic image/video stream based on the processed data from the image processor 1308. Alternatively, the image processor 1308 may be configured to directly provide a 3D stereoscopic image/video stream based on received image data. In one embodiment, a 3D capture system comprises the combiner 1306 implemented as a first integrated circuit and the image processor 1308 implemented as a second integrated circuit. The first and second integrated circuits may be connected, for example, by one or more of a serial, parallel, or I2C bus.

Combining the image data stream 1314, 1316 to generate the frame data 1318 enables the image processor 1308 to perform formatting for multi-camera 3D processing even though the image processor 1308 has a single camera input. As a result, the system 1300 may be implemented at a reduced cost as compared to a system that use a separate processor for each camera or that uses a processor having multiple camera inputs.

Figure 14:
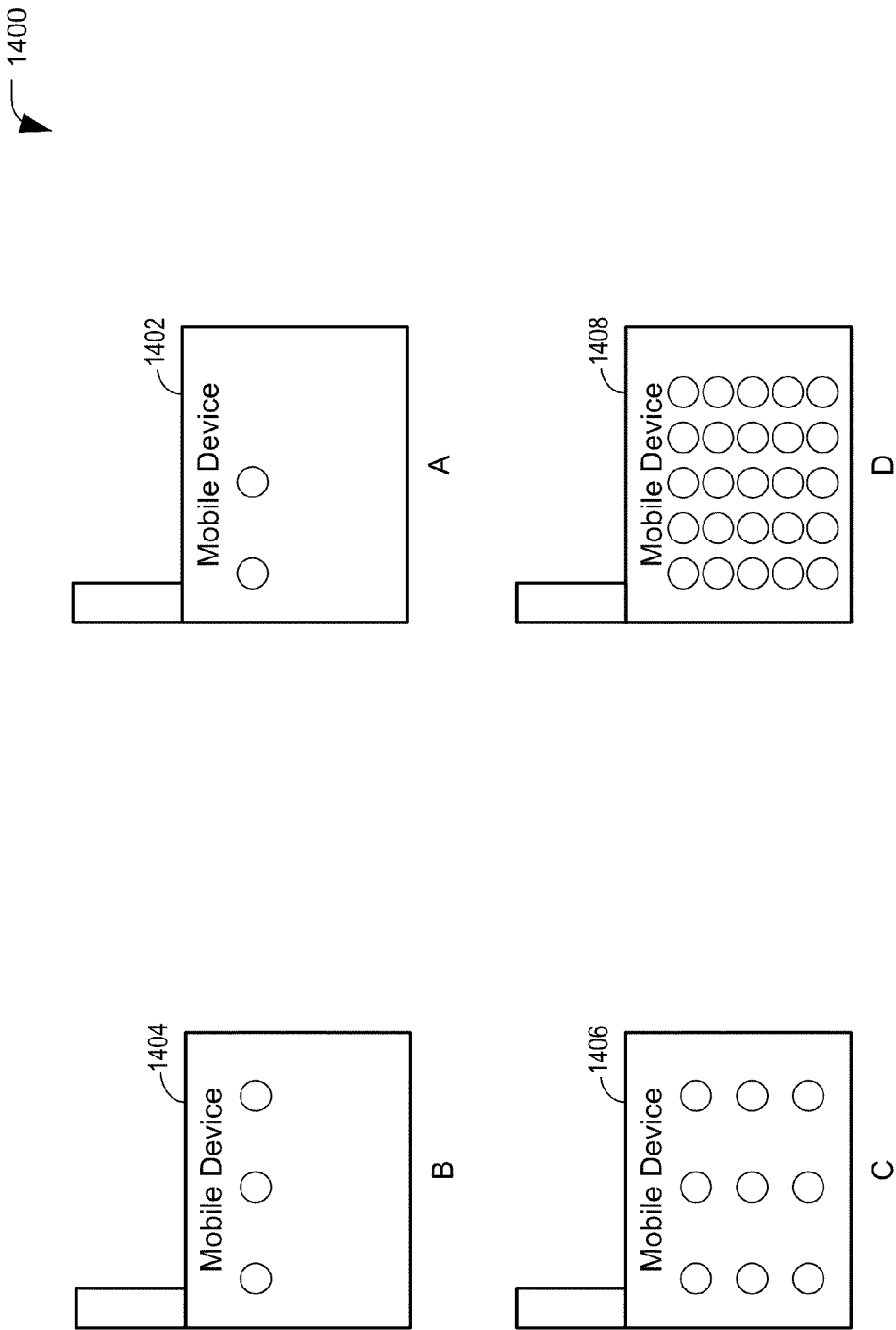
FIG. 14 is a diagrammatic representation illustrating various embodiments of mobile devices having image processing systems to combine data from multiple image sensors.

Referring to FIG. 14, a diagrammatic representation illustrating various embodiments of mobile devices having image processing systems to combine data from multiple image sensors is depicted and generally designated 1400. In the particular embodiment illustrated at 1402, the mobile device includes an image processing system having an array of two adjacent cameras. In the particular embodiment illustrated at 1404, the mobile device includes an image processing system having an array of three cameras arranged in an in-line configuration. Alternatively, any number of cameras may be arranged in an in-line configuration. In the particular embodiment illustrated at 1406, the mobile device includes an image processing system having a three-by-three array of cameras. In the particular embodiment illustrated at 1408, the mobile device includes an image processing system having a five-by-five array of cameras. Alternatively, any number of cameras may be arranged in a two-dimensional array.

Figure 15:
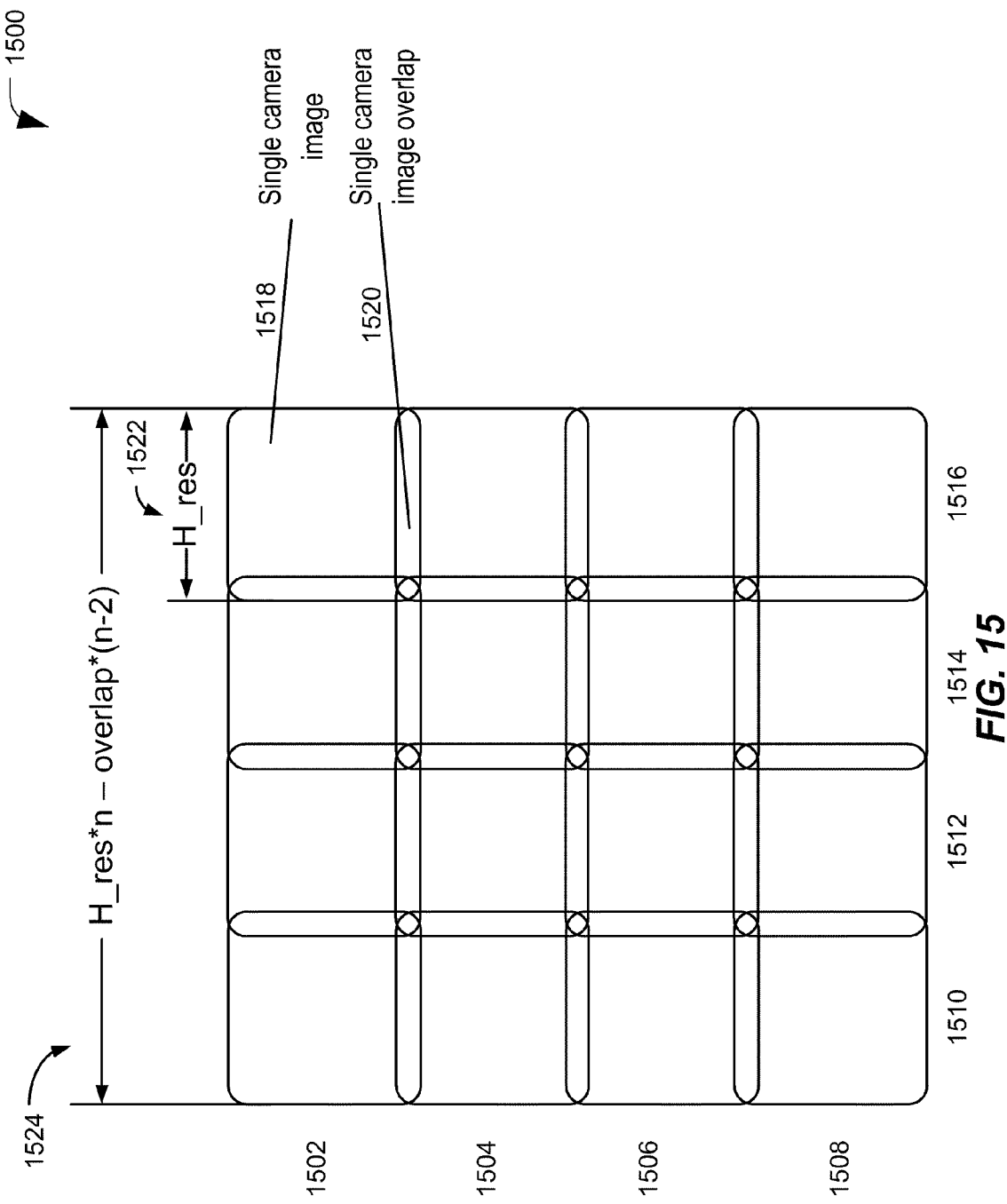
FIG. 15 is a diagrammatic representation illustrating an example of images that are captured by an array of cameras including overlap between images.
Figure 18:
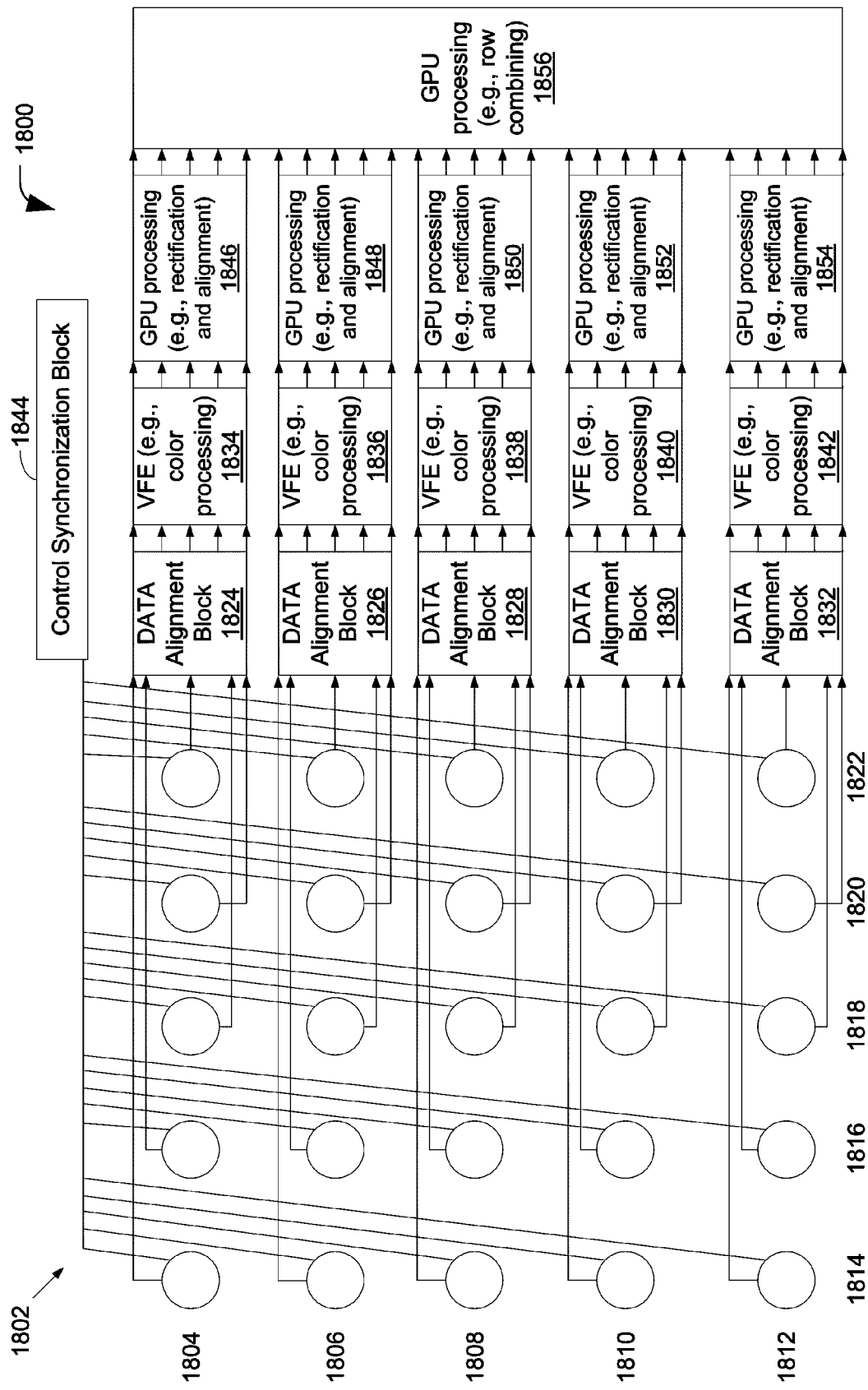
FIG. 18 is a block diagram of a first particular illustrative embodiment of a camera array processing system.
Figure 19:
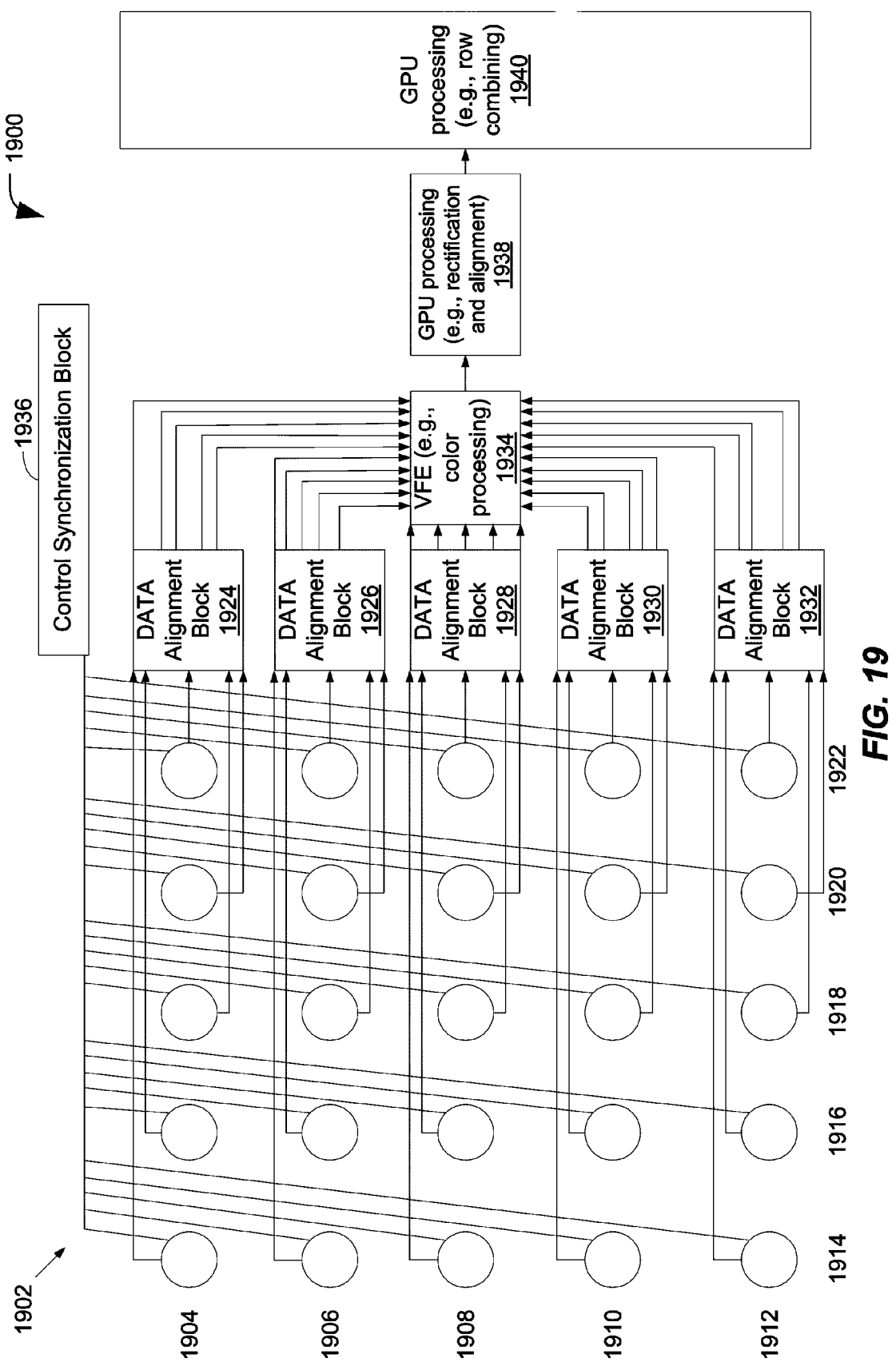
FIG. 19 is a block diagram of a first particular illustrative embodiment of a camera array processing system.

Referring to FIG. 15, an example of an array of images that are captured by multiple cameras or image sensors is illustrated and generally designated 1500. As illustrated in FIG. 15, an image captured by one camera may overlap with images captured by other neighboring cameras. Image overlap may be useful in combining the images captured by each of the cameras into a single image. In the particular embodiment illustrated in FIG. 15, the array 1500 corresponds to a four-by-four array of cameras or image sensors. Alternatively, any number of cameras may be arranged in a two-dimensional array (e.g., a five-by-five array as illustrated in FIGS. 18 and 19).

Each camera captures a single camera image of the array 1500. In the embodiment illustrated in FIG. 15, the array 1500 is a four-by-four array. As such, the array 1500 includes a first row 1502, a second row 1504, a third row 1506, and a fourth row 1508. Further, the array 1500 includes a first column 1510, a second column 1512, a third column 1514, and a fourth column 1516. As an illustrative example, a single camera image 1518 may be captured by a camera corresponding to the first row 1502 and the fourth column 1516. The single camera image 1518 may overlap with camera images captured by other cameras of neighboring cells. In the case of the camera corresponding to the first row 1502 and the fourth column 1516, a camera of a neighboring cell may include a camera corresponding to the first row 1502 and the third column 1514, a camera corresponding to the second row 1504 and the third column 1514, or a camera corresponding to the second row 1504 and the fourth column 1516. For example, a single camera image overlap 1520 may be associated with the single camera image 1508 captured by a camera corresponding to the first row 1502 and the fourth column 1516. FIG. 15 illustrates a theoretical case of absolute alignment of each camera of each of the rows 1502-1508 and each camera of each of the columns 1510-1516. As such, the image overlap with an image captured by a camera corresponding to a neighboring row (e.g., the second row 1504) may be the same as the image overlap with an image captured by a camera corresponding to a neighboring column (e.g., the third column 1514).

An individual image may be captured with a particular horizontal resolution ("H-res"). To illustrate, a horizontal resolution 1522 may be associated with the single camera image 1518 captured by the camera corresponding to the first row 1502 and the fourth column 1516. FIG. 15 illustrates a theoretical case of image overlap where each camera has the same horizontal resolution 1522. As such, an overall horizontal resolution 1524 (i.e., a number of pixels in each of the rows 1502-1508) may be calculated based on a combination of the horizontal resolution 1522 of an individual camera and a number of cells in a row ("n"). In the case of the four-by-four array 1500 of FIG. 15, there are four cells in each row (i.e., a cell associated with each of the columns 1510-1516). The overall horizontal resolution 1524 may account for image overlap. For example, the overall horizontal resolution 1524 may be calculated as H_res*n−overlap*(n−2), where overlap indicates a number of overlapping pixels of adjacent images. A similar calculation may be performed to determine an overall vertical resolution.

FIG. 15 illustrates a theoretical case of absolute alignment of each camera with the same image overlap. The image overlap between images captured by the individual cameras may allow each of the individual images to be "stitched together" into a single image.

Figure 16:
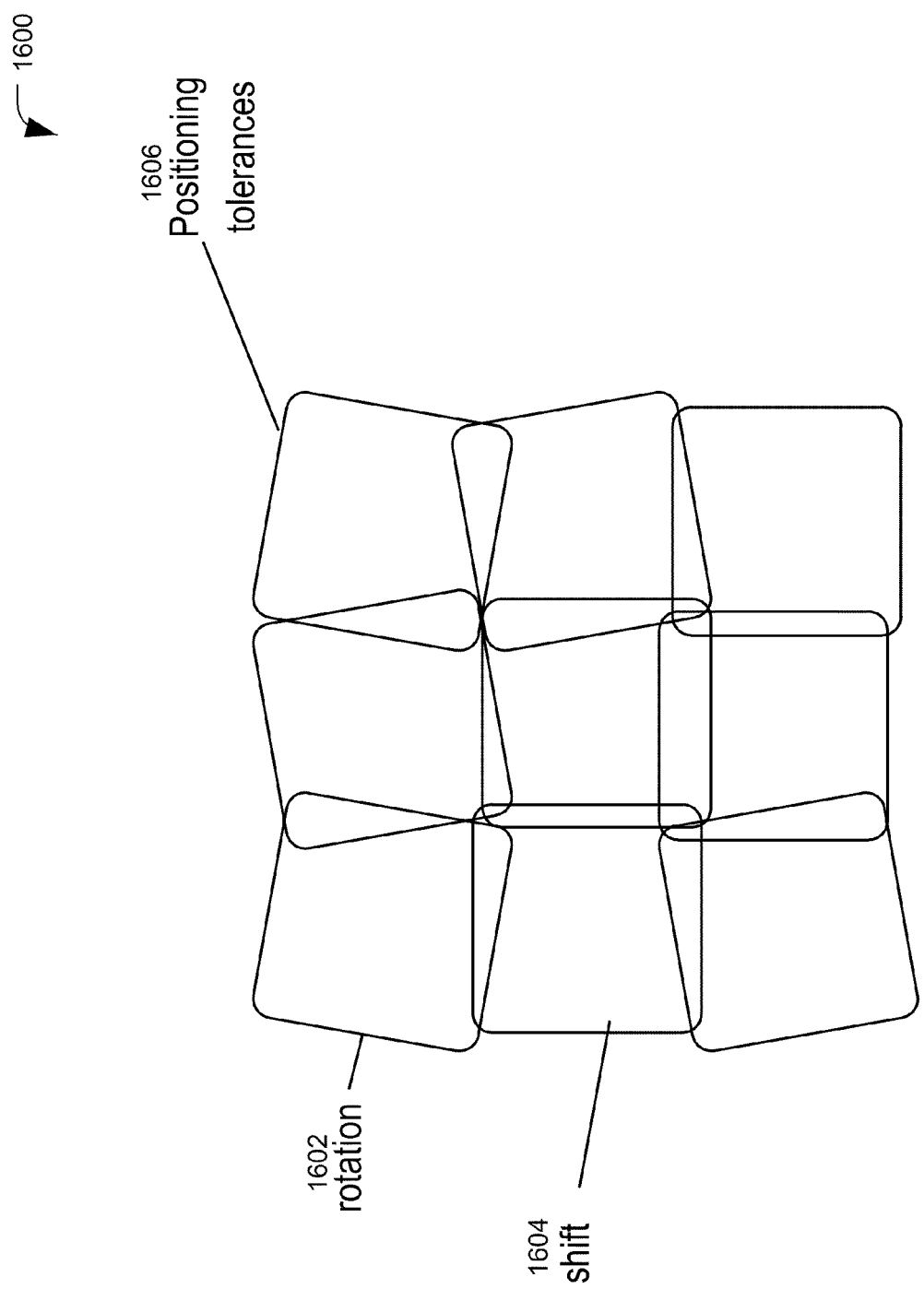
FIG. 16 is a diagrammatic representation illustrating an example of images that are captured by an array of cameras including overlap between images where each image may have its own shifting component and rotation component.

Referring to FIG. 16, an example of an array of images that are captured by multiple cameras or image sensors is illustrated and generally designated 1600. As illustrated in FIG. 16, an image captured by one camera may overlap with images captured by other neighboring cameras. Image overlap may be useful in combining the images captured by each of the cameras into a single image. In the particular embodiment illustrated in FIG. 16, the array 1600 corresponds to a four-by-four array of cameras or image sensors. Alternatively, any number of cameras may be arranged in a two-dimensional array. FIG. 16 illustrates that, due to mechanical constraints, it may not be feasible to achieve absolute alignment of cameras in a row or column (as illustrated in FIG. 15).

Each image of the array 1600 may have its own rotation 1602, shift 1604, and tilt (not shown). One or more positioning tolerances 1606 may be associated with each image. The positioning tolerances 1606 may include a rotation tolerance, a shift tolerance, a tilt tolerance, or a combination thereof. Image overlap may be useful in combining the images captured by each of the cameras into a single image. FIG. 16 illustrates that the image overlap that is used in combining the images may account for the rotation 1602, shift 1604, and tilt of each image that results from mechanical constraints associating with building a device. Once the device is built, the image overlap may be known and stable. As such, the image overlap may be quantified and may be corrected in a later stage.

Figure 17:
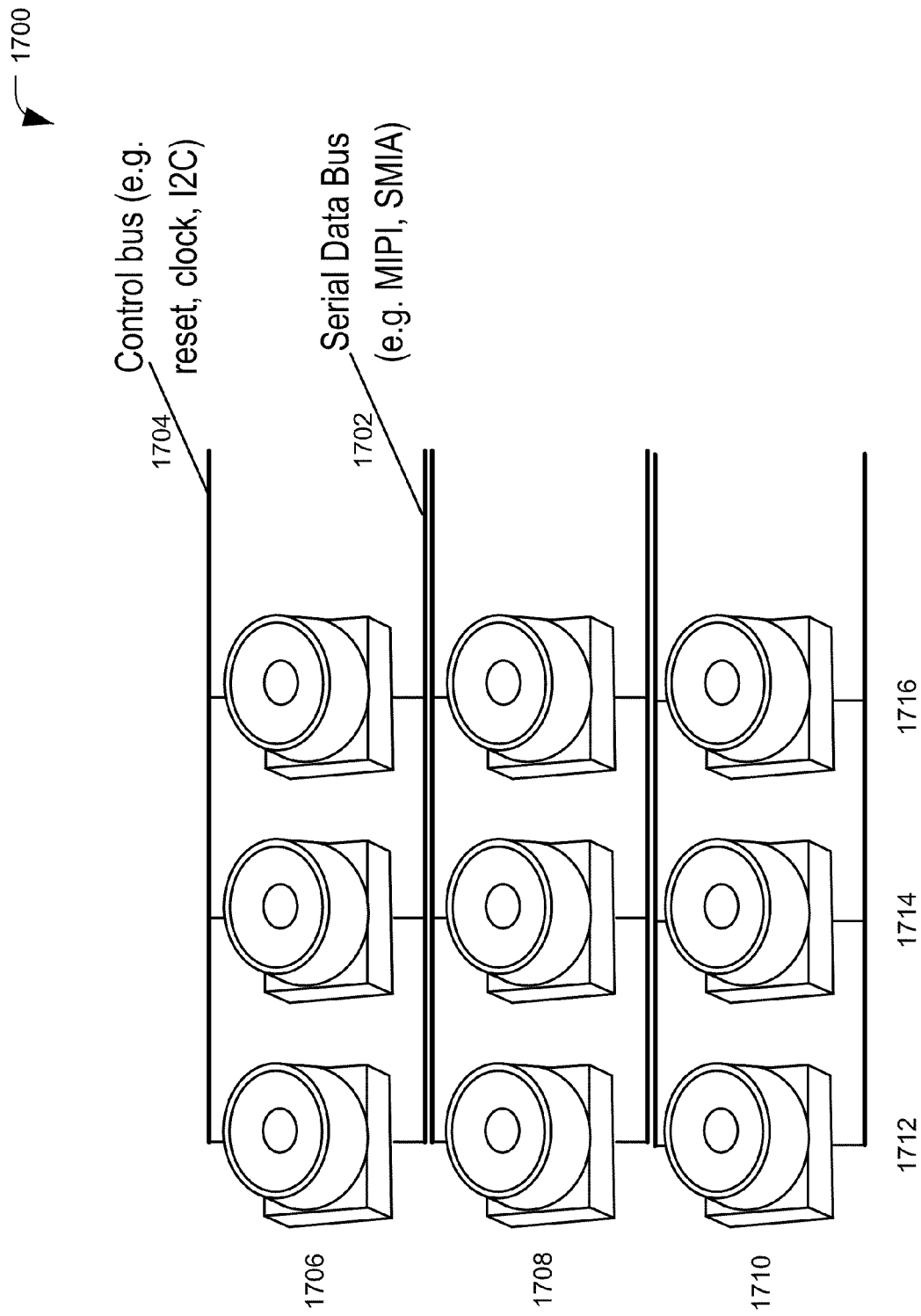
FIG. 17 is a block diagram illustrating a particular embodiment of an array of cameras and electrical connections associated with the array of cameras.

Referring to FIG. 17, a particular embodiment of an array of cameras and electrical connections associated with the array is illustrated and generally designated 1700. FIG. 17 illustrates that each camera of the array 1700 has a first type of interface (i.e., a data interface 1702) and a second type of interface (i.e., a control interface 1704). In the embodiment illustrated in FIG. 17, the array 1700 includes a three-by-three array of cameras. Alternatively, the array 1700 may include cameras arranged in a four-by-four array (e.g., the arrays 1500, 1600 of FIGS. 15 and 16) or any other number of cameras arranged in a two-dimensional array.

The data interface 1702 may include a serial data bus (e.g., a Mobile Industry Processor Interface or a Standard Mobile Imaging Architecture interface). The data interface 1702 in FIG. 17 is associated with a first row 1706 of the array 1700, a second row 1708 of the array 1700, and a third row 1710 of the array 1700. Lines associated with the data interface 1702 may be used to collect data from cameras in each of the rows 1706-1710 to be processed in parallel. As an illustrative example, for a resolution up to five megapixels (mpix) and ten frames per second, four wires may be needed (e.g., differential data and clock).

In the illustrative three-by-three array 1700 of FIG. 17, each of the rows 1706-1710 includes a camera in a first column 1712 of the array 1700, a camera in a second column 1714 of the array 1700, and a camera in a third column 1716 of the array 1700. Thus, the data interface 1702 may be used to collect data from nine cameras to be processed in parallel.

The control interface 1704 may include lines that are used to synchronize all cameras in the array 1700. For example, control interface lines may be associated with clock, reset, and I2C communication. In the illustrative three-by-three array 1700 of FIG. 17, the control interface 1704 may be used to synchronize the nine cameras of the array 1700.

Referring to FIG. 18, a particular embodiment of a camera array processing system is illustrated and generally designated 1800. All cameras in an array 1802 may be responsive to common control signals, aligned, and processed prior to the resulting image data being combined into a final image. In the embodiment illustrated in FIG. 18, the array 1802 includes a five-by-five array of cameras. Alternatively, the array 1802 may include any other number of cameras arranged in a two-dimensional array (e.g., the three-by-three array 1700 of FIG. 17).

All cameras in the array 1802 may be synchronized using a method of concurrent image sensor support using a single ISP pipeline. Further, each row of cameras may be aligned using an alignment method. That is, one row of images may be collected, aligned in the same order and sent for processing as a single line with a size n*line, where n is the number of cameras in a row and line is the horizontal size (i.e., "H_res" as described in FIG. 15) of one camera. The five-by-five array 1802 illustrated in FIG. 18 includes a first row 1804, a second row 1806, a third row 1808, a fourth row 1810, and a fifth row 1812. Further, the five-by-five array 1802 includes a first column 1814, a second column 1816, a third column 1818, a fourth column 1820, and a fifth column 1822. Each of the rows 1804-1812 may be processed in parallel for color at a VFE component, and each of the rows 1804-1812 may be processed at a graphics processor or graphics processing unit (GPU) component to align and rectify each individual image in a row. After rectification and alignment, GPU processing may be performed to combine all of the rows 1804-1812 together, resulting in a final image.

The first row 1804 may be associated with a first alignment block 1824, the second row 1806 may be associated with a second alignment block 1826, the third row 1808 may be associated with a third alignment block 1828, the fourth row 1810 may be associated with a fourth alignment block 1830, and the fifth row 1812 may be associated with a fifth alignment block 1832. To illustrate, the first alignment block 1824 may be adapted to collect image data lines from each camera in the first row 1804 (i.e., five cameras in the five columns 1814-1822 of the array 1802). The first alignment block 1824 may be adapted to align the image data lines in the same order and send the image data lines for processing as a single line. The first alignment block 1824 may be adapted to send the image data lines for processing as a single line to a first VFE component 1834 to be processed for color such as described with respect to the combiner of 206 of FIGS. 2, 3, and 5. A size of the single line may be determined based on the number of cameras (i.e., five cameras) and the horizontal size (i.e., "H_res" as described in FIG. 15) of each camera in the first row 1804.

The second alignment block 1826 may be adapted to collect images from each camera in the second row 1806, to align the images in a same order, and to send the images for processing as a single line to a second VFE component 1836. The third alignment block 1828 may be adapted to collect an image data line from each camera in the third row 1808, to align the image data lines in a same order, and to send the image data lines for processing as a single line to a third VFE component 1838. The fourth alignment block 1830 may be adapted to collect image data lines from each camera in the fourth row 1810, to align the image data lines in a same order, and to send the image data lines for processing as a single line to a fourth VFE component 1840. The fifth alignment block 1832 may be adapted to collect image data lines from each camera in the fifth row 1812, to align the image data lines in a same order, and to send the image data lines for processing as a single line to a fifth VFE component 1842.

A control synchronization block 1844 may be used to synchronize each of the cameras of the array 1802 (i.e., twenty five cameras in the case of the illustrative five-by-five array 1802 of FIG. 18) in a manner similar to the sensor synchronizer 230. In a particular embodiment, the control synchronization block 1834 may implement the control interface 1704 of FIG. 17. The control synchronization block 1844 may be communicatively coupled to each of the cameras of the array 1802 and to each of the VFE components 1834-1842. Synchronization of all cameras in the array 1802 may allow for usage of a rolling shutter on a high resolution. As all cameras may be read out at the same time, the rolling shutter effect may be diminished (with the size of the array). For example, in the five-by-five array 1802 of FIG. 18, synchronization of the twenty five cameras may diminish the rolling shutter effect associated with a Complementary Metal Oxide Semiconductor (CMOS) camera.

The first VFE component 1834 may be communicatively coupled to a first GPU component 1846 to align and rectify each individual image in the first row 1804 (i.e., five images captured by the cameras in the five columns 1814-1822). The second VFE component 1836 may be communicatively coupled to a second GPU component 1848 to align and rectify each individual image in the second row 1806. The third VFE component 1838 may be communicatively coupled to a third GPU component 1850 to align and rectify each individual image in the third row 1808. The fourth VFE component 1840 may be communicatively coupled to a fourth GPU component 1852 to align and rectify each individual image in the fourth row 1810. The fifth VFE component 1842 may be communicatively coupled to a fifth GPU component 1854 to align and rectify each individual image in the fifth row 1812. Each of the GPU components 1846-1854 may be communicatively coupled to a GPU processing component 1856 that is adapted to combine all of the rows 1804-1812 together, resulting in a final image.

In the embodiment illustrated in FIG. 18, each of the alignment blocks 1824-1832 is associated with its own VFE component and its own GPU rectification and alignment component. Thus, FIG. 18 illustrates that each of the rows 1804-1812 may be processed in parallel for color using separate VFE, components, and each of the rows 1804-1812 may be processed using separate GPU components to align and rectify each individual image in a particular row. Alternatively, each of the alignment blocks 1824-1832 may be associated with a single VFE component and a single GPU rectification and alignment component (see FIG. 19).

Referring to FIG. 19, a particular embodiment of a camera array processing system is illustrated and generally designated 1900. All cameras in an array 1902 may be synchronized, aligned, and processed prior to being combined into a final image. In the embodiment illustrated in FIG. 19, the array 1902 includes a five-by-five array of cameras. Alternatively, the array 1902 may include any other number of cameras arranged in a two-dimensional array. FIG. 19 illustrates that a single VFE component and a single GPU rectification and alignment component may be used to process all rows of the array 1902, rather than the multiple VFE and GPU rectification and alignment components illustrated in FIG. 18.

The five-by-five array 1902 illustrated in FIG. 19 includes a first row 1904, a second row 1906, a third row 1908, a fourth row 1910, and a fifth row 1912. Further, the five-by-five array 1902 includes a first column 1914, a second column 1916, a third column 1918, a fourth column 1920, and a fifth column 1922. The first row 1904 may be associated with a first alignment block 1924, the second row 1906 may be associated with a second alignment block 1926, the third row 1908 may be associated with a third alignment block 1928, the fourth row 1910 may be associated with a fourth alignment block 1930, and the fifth row 1912 may be associated with a fifth alignment block 1932. To illustrate, the first alignment block 1924 may be adapted to collect image data lines from each camera in the first row 1904 (i.e., five cameras in the five columns 1914-1922 of the array 1902).

The first alignment block 1924 may be adapted to align the image data lines in a same order and send the image data lines for processing as a single line. The second alignment block 1926 may be adapted to collect image data lines from each camera in the second row 1906, to align the image data lines in a same order, and to send the image data lines for processing as a single line. The third alignment block 1928 may be adapted to collect image data lines from each camera in the third row 1908, to align the image data lines in a same order, and to send the image data lines for processing as a single line. The fourth alignment block 1930 may be adapted to collect image data lines from each camera in the fourth row 1910, to align the image data lines in a same order, and to send the image data lines for processing as a single line. The fifth alignment block 1932 may be adapted to collect image data lines from each camera in the fifth row 1912, to align the image data lines in a same order, and to send the image data lines for processing as a single line.

In the embodiment illustrated in FIG. 19, each of the alignment blocks 1924-1932 may be adapted to send its images for processing to a single VFE component 1934 to be processed for color. The single VFE component 1934 may process each of the five lines that are sent from the five alignment blocks 1924-1932. As noted above, the size of a single line from a particular alignment block may be determined based on a number of cameras in a particular row (i.e., five cameras) and a horizontal size (i.e., "H_res" as described in FIG. 15) of each camera in the particular row. As such, the size of the multiple lines processed by the single VFE component 1934 of FIG. 19 may be five times the size of a single line processed by one of the VFE components 1834-1842 of FIG. 18.

A control synchronization block 1936 may be used to synchronize each of the cameras of the array 1902 such as providing common control signals to cameras in one or more rows 1904-1912. The control synchronization block 1936 may be communicatively coupled to each of the cameras of the array 1902 and to the single VFE components 1934. Synchronization of all cameras in the array 1902 may allow for usage of a rolling shutter on a high resolution. As all cameras may be read out at the same time, a rolling shutter effect may be diminished (with the size of the array). For example, in the five-by-five array 1902 of FIG. 19, synchronization of the twenty five cameras may diminish a rolling shutter effect associated with a CMOS camera.

The single VFE component 1934 may be communicatively coupled to a single GPU component 1938 to align and rectify each individual image in each of the rows 1904-1912. As such, the single GPU component 1938 of FIG. 19 may align and rectify twenty five images compared to the five images processed by each of the GPU alignment and rectification components 1846-1854 of FIG. 18. The single GPU component 1938 may be communicatively coupled to a GPU processing component 1940 that is adapted to combine all of the rows 1904-1912 together, resulting in a final image.

Figure 20:
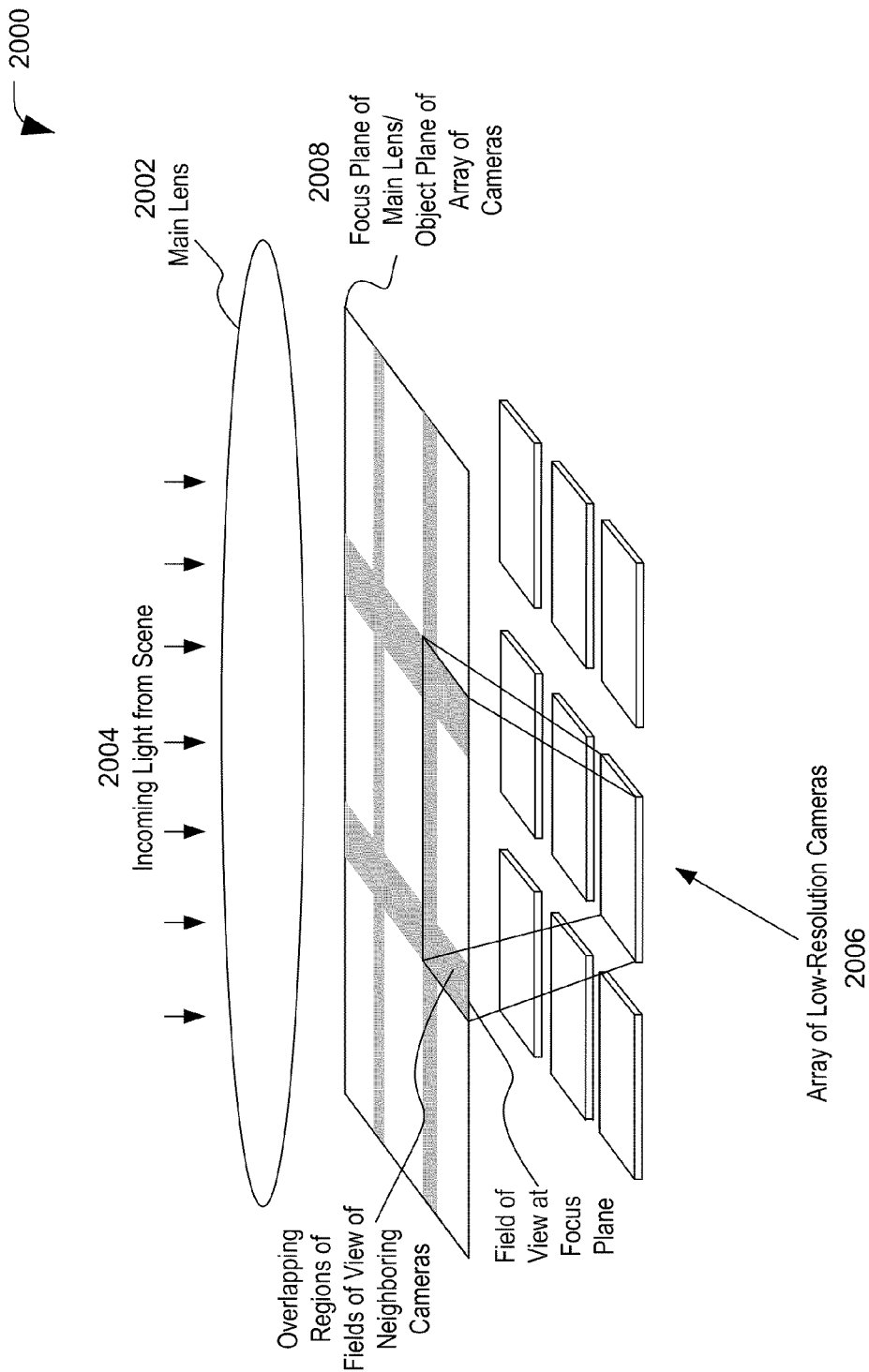
FIG. 20 is a diagrammatic representation illustrating a camera system that includes a main lens and multiple cameras arranged in an array.

FIG. 20 illustrates a high-resolution digital camera system 2000 that includes a main lens 2002 configured to focus incoming light 2004 and multiple cameras arranged in an array 2006. A high-resolution image can be generated as a composite (or "mosaic") image by combining images captured at each of the cameras in the array 2006. For example, each of the cameras of the array 2006 may be a CMOS-type camera or a Charge Coupled Device (CCD) type camera. The main lens 2002 may focus a captured scene to a plane 2008 (referred to as a "focus plane" of the main lens 2002 or an "object plane" of cameras in the array 2006), and each camera in the array 2006 may capture a portion of the total image. Each camera of the array 2006 has a field of view that partially overlaps its neighbors' fields of view at the plane 2008. This overlap may enable images taken from neighboring cameras in the array 2006 to be aligned on a row-by-row basis and "stitched" together during subsequent processing and may provide tolerance for non-ideal position and alignment of cameras within the array (such as described with respect to FIG. 16).

A composite image can be generated by aligning image data from the cameras of the array 2006 on a row-by-row basis. For example, the array 2006 of FIG. 20 includes a three-by-three array with three rows. Each camera within a particular row of the array 2006 (an "array row") may include an image sensor that has light detectors arranged in columns and rows ("sensor columns" and "sensor rows"). The cameras within an array row may be positioned so that sensor rows are substantially aligned. To illustrate, a first sensor row of each camera in an array row is substantially aligned with the first sensor row of every other camera in the same array row.

During image capture, the first sensor row of image data is read from each camera in an array row and provided to image processing circuitry (such as described with respect to FIGS. 17-19). The image data from the first sensor row is merged according to the position of each camera in the array row. The merged image data is processed as if it were a single row of image data from a larger camera. The second, third, and subsequent image sensor rows are read, merged, and provided to the image processing circuitry to be processed as rows of the composite image. Each array row may be processed in parallel with the other array rows.

The arrangement of FIG. 20 may provide an inexpensive alternative to high-resolution cameras. For example, a 100 megapixel (mpix) camera can be built using an array of twenty 5 mpix CMOS cameras behind a main lens. Because image capture can be performed using multiple CMOS cameras with each camera capturing a portion of the image, "rolling shutter" artifacts may be reduced as compared to a single 100 mpix CMOS camera capturing the entire image.

Figure 21:
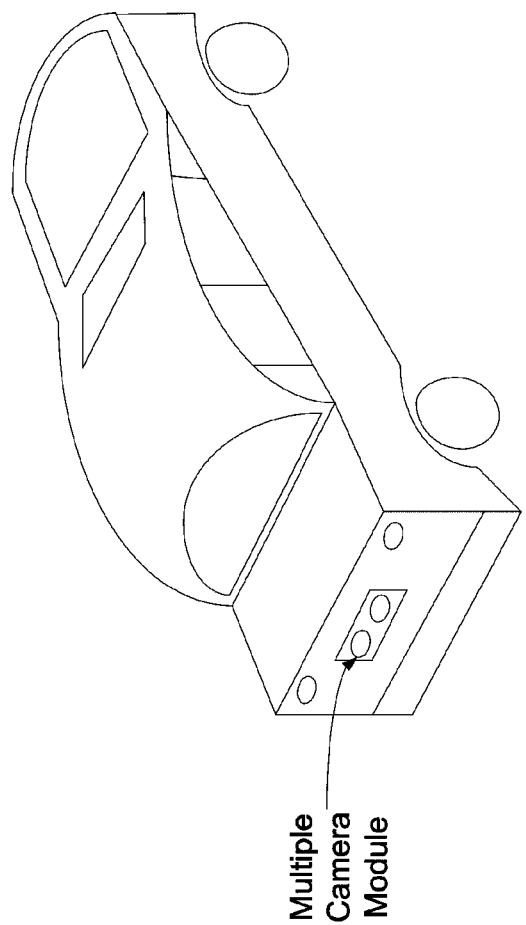
FIG. 21 is a diagrammatic representation illustrating a multiple camera module in an automobile.

Referring to FIG. 21, a particular embodiment of an implementation of a multi-camera module is depicted and generally designated 2100. The system 2100 illustrates a multiple camera module, such as a multiple camera module as illustrated in FIGS. 1-5, mounted on an automobile. The multiple camera module may be configured to generate synchronized line data frames for formatting as three dimensional image or video data, such as described with respect to FIGS. 6-7. By mounting the multiple camera module to a rear portion of the automobile, a three dimensional view may be obtained to provide an operator of the automobile with depth perception on an internal display (not shown) while backing the automobile. It will be understood that the multiple camera module may be mounted to any type of vehicle, without limitation to automobiles.

Figure 22:
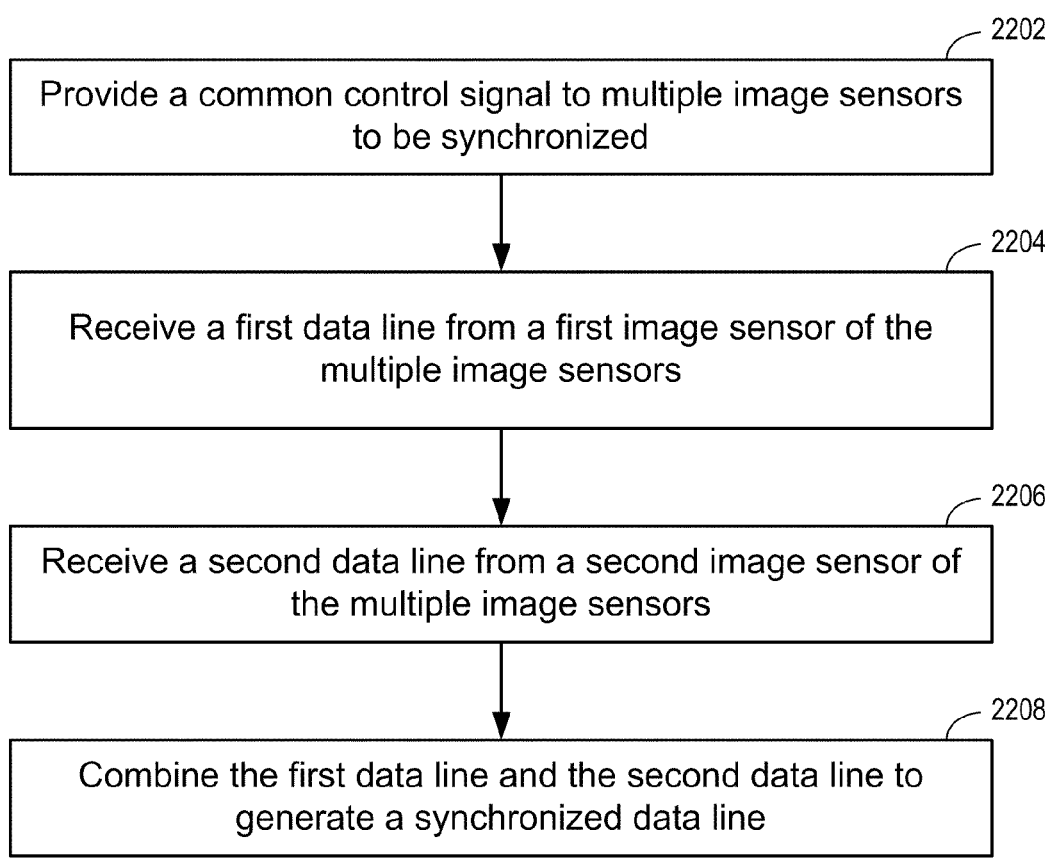
FIG. 22 is a flow diagram of a particular illustrative embodiment of a method of combining data from multiple sensors into a synchronized data line.

Referring to FIG. 22, a flow diagram of a particular illustrative embodiment of a method of combining data from multiple sensors into a synchronized data line depicted and generally designated 2200. As an illustrative example, the method 2200 may be performed by the system of FIG. 2, the system of FIG. 3, the system of FIG. 5, or any combination thereof.

A common control signal may be provided to multiple image sensors to be synchronized, at 2202. For example, the common control signal may include a common clock signal and a common reset signal, such as the common control signals 404-410 depicted in FIG. 4.

A first data line from a first image sensor of the multiple image sensors may be received, at 2204. A second data line from a second image sensor of the multiple image sensors may be received, at 2206. For example, the first sensor and the second sensor may be the sensors 202, 204 of FIG. 2.

The first data line and the second data line may be combined line to generate a synchronized data line, at 2208. For example, the method 2200 may include interleaving a first data stream received from the first image sensor and a second data stream received from the second image sensor on a line by line basis. The synchronized data line may be formed as described with respect to the combiner 406 of combining the first sensor image data 422 and the second sensor image data 432 illustrated in FIG. 5.

The synchronized data line may form part of a frame, such as the frame 660 of FIG. 6. The frame can include a first section (e.g. the first section 652) including first image data from the first image sensor, a second section (e.g. the second section 654) including second image data from the second image sensor, and a gap section (e.g. the gap section 656) including non-image data disposed between the first section and the second section. In other embodiments, the frame may not include a gap section between the first section and the second section.

Receiving the first data line may be completed before receiving the second data line is completed, and the synchronized data line may be generated after receiving the second data line is completed. As an example, the combined data line 822 of FIG. 8 is generated after the second sensor first line data 812 has been received.

In an embodiment having more than two image sensors, a third data line may be received from a third image sensor of the multiple image sensors, such as illustrated in FIG. 11. The third data line can be combined with the first data line and the second data line to generate the synchronized data line, such as the first synchronized data line 1150 of FIG. 11.

Figure 23:
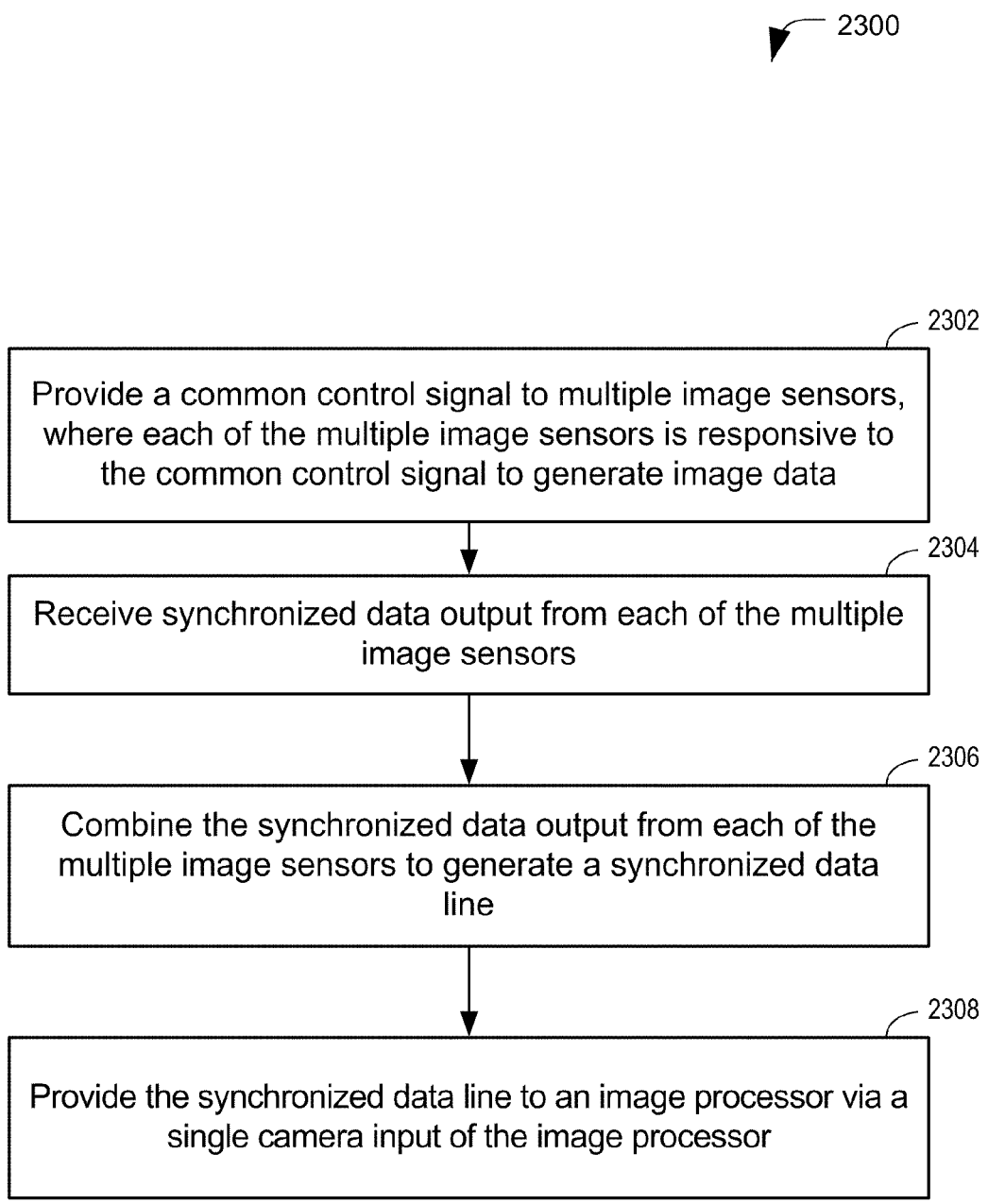
FIG. 23 is a flow diagram of a particular illustrative embodiment of a method of providing a common control signal to multiple image sensors and providing a synchronized data line to an image processor via a single camera input of the image processor.

Referring to FIG. 23, a flow diagram of a particular illustrative embodiment of a method of providing a common control signal to multiple image sensors and providing a synchronized data line to an image processor via a single camera input of the image processor is depicted and generally designated 2300. The method 2300 may be performed at one or more of the systems of FIGS. 2, 3, and 5, as illustrative, non-limiting examples.

A common control signal may be provided to multiple image sensors, at 2302. Each of the multiple image sensors may be responsive to the common control signal to generate image data. For example, the common control signal may be provided by a sensor synchronizer that is coupled to each of the multiple image sensors, such as the sensor synchronizer 230 of FIG. 2. To illustrate, the sensor synchronizer may be coupled to each of the multiple image sensors via an inter-integrated circuit (I2C) control interface, via an interface compliant with a camera serial interface (CSI) specification, or via an interface compliant with a camera parallel interface (CPI) specification.

Synchronized data output from each of the multiple image sensors may be received, at 2304. A first data line may be received from a first image sensor of the multiple image sensors and a second data line may be received from a second image sensor of the multiple image sensors. Receiving the first data line may be completed before receiving the second data line is completed, and a synchronized data line may be generated after receiving the second data line is completed, such as the combined data line 822 that is generated after the second sensor first line data 812 has been received in FIG. 8.

The synchronized data output from each of the multiple image sensors may be combined to generate a synchronized data line, at 2306. For example, the combiner 206 of FIG. 2 may interleaving a first data stream received from the first image sensor 202 and a second data stream received from the second image sensor 204 on a line by line basis.

The synchronized data line may be provided to an image processor via a single camera input of the image processor, at 2308. The synchronized data line may form part of a frame that has a multiple rows, such as the frame 660 of FIG. 6. For example, the frame may include a first section including first image data from the first image sensor, a second section including second image data from the second image sensor, and a gap section between the first and second sections.

Figure 24:
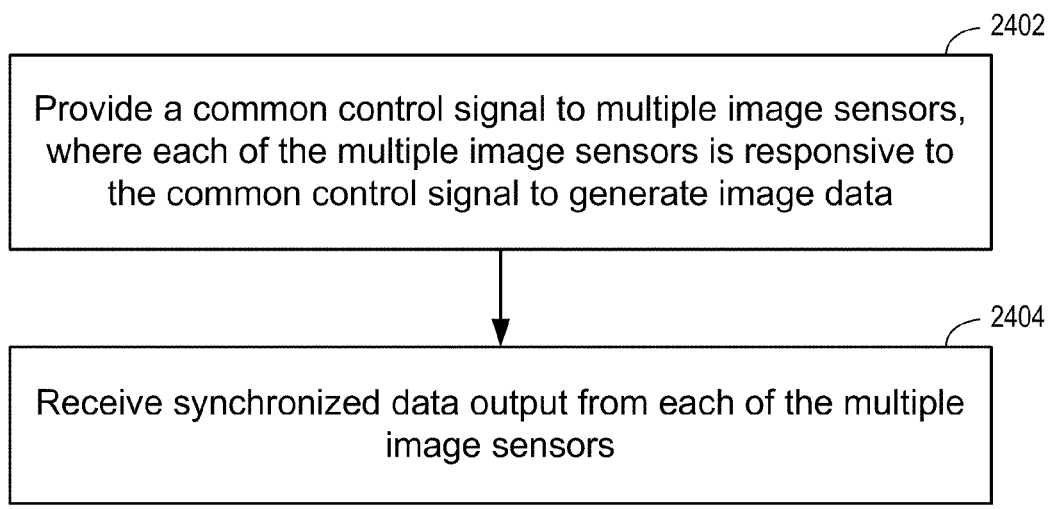
FIG. 24 is a flow diagram of a particular illustrative embodiment of a method of providing a common control signal to multiple image sensors and receiving synchronized data output from each of the multiple image sensors.

Referring to FIG. 24, a flow diagram of a particular illustrative embodiment of a method of providing a common control signal to multiple image sensors and receiving synchronized data output from each of the multiple image sensors is depicted and generally designated 2400.

A common control signal to multiple image sensors may be provided, at 2402. Each of the multiple image sensors is responsive to the common control signal to generate image data. For example, the common control signal may provided by a sensor synchronizer that is coupled to each of the multiple image sensors, such as the sensor synchronizer 230 of any of FIGS. 2-5, the control synchronization block 1844 of FIG. 18, the control synchronization block 1936 of FIG. 19, or any combination thereof.

Synchronized data output from each of the multiple image sensors may be received, at 2404. The synchronized data output may include first data lines received from a first image sensor and second data lines received from a second image sensor. A phase offset between each received data line from the first image sensor and each corresponding data line from the second image sensor may be substantially constant, such as the one-line phase difference of FIG. 9, the two-line phase difference of FIG. 8, or the 3-line phase difference of FIG. 12, as illustrative, non-limiting examples.

Figure 25:
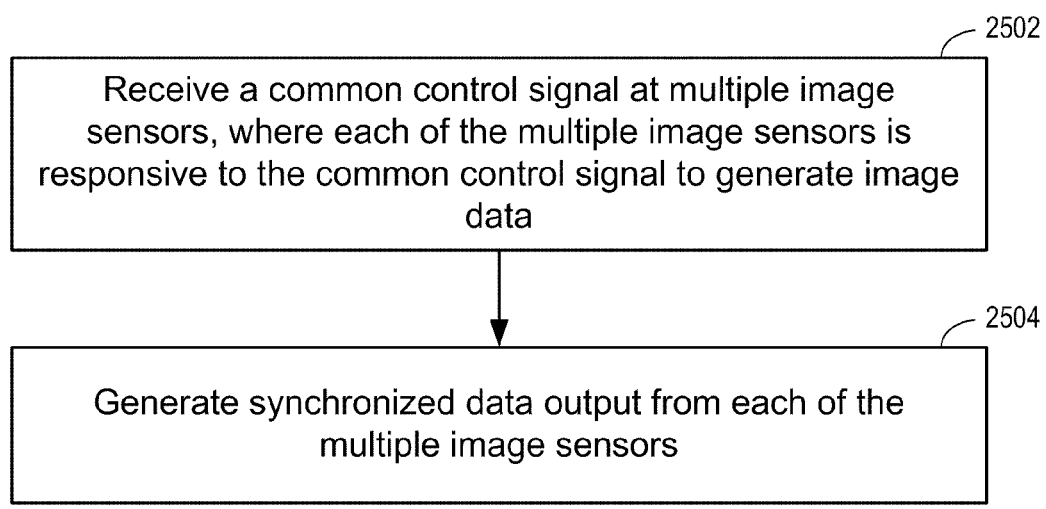
FIG. 25 is a flow diagram of a particular illustrative embodiment of a method of receiving a common control signal at multiple image sensors and generating synchronized data output from each of the multiple image sensors.

Referring to FIG. 25, a flow diagram of a particular illustrative embodiment of a method of receiving a common control signal at multiple image sensors and generating synchronized data output from each of the multiple image sensors is depicted and generally designated 2500.

A common control signal may be received at multiple image sensors, at 2502. Each of the multiple image sensors is responsive to the common control signal to generate image data. For example, the common control signal may received from a sensor synchronizer that is coupled to each of the multiple image sensors, such as the sensor synchronizer 230 of any of FIGS. 2-5, the control synchronization block 1844 of FIG. 18, the control synchronization block 1936 of FIG. 19, or any combination thereof.

Synchronized data output from each of the multiple image sensors may be generated, at 2504. The synchronized data output may include first data lines received from a first image sensor and second data lines received from a second image sensor. A phase offset between each received data line from the first image sensor and each corresponding data line from the second image sensor may be substantially constant, such as the one-line phase difference of FIG. 9, the two-line phase difference of FIG. 8, or the 3-line phase difference of FIG. 12, as illustrative, non-limiting examples.

Referring to FIG. 26, a flow diagram of a particular illustrative embodiment of a method of combining data from multiple sensors at an image signal processor having an input for a single camera is depicted and generally designated 2600.

Lines of image data may be received at an image processor having an input for a single camera, at 2602. Each line of the image data may include first line data from a first image captured by a first camera and second line data from a second image captured by a second camera. As an illustrative, non-limiting example, the image processor may include the image signal processor 208 of FIGS. 2-3 or FIG. 5, the image processor 1308 of FIG. 13, the VFEs 1834-1842 of FIG. 18, the VFEs 1934-1942 of FIG. 19, or any combination thereof.

The lines of image data may be received at the image processor from a combiner that is coupled to the first camera and to the second camera. Line by line readout of first image data from the first camera and second image data from the second camera may be synchronized, using the combiner, to generate each line of the image data. For example, the combiner may be the combiner 206 of FIGS. 2-3 or FIG. 5, the combiner 1306 of FIG. 13, the data alignment blocks 1824-1832 of FIG. 18, the data alignment blocks 1924-1932 of FIG. 19, or any combination thereof.

An output frame having a first section corresponding to line data of the first image and having a second section corresponding to line data of the second image may be generated, at 2604. The first section and the second section may be configured to be used to generate a three-dimensional (3D) image format or a 3D video format.

In a particular embodiment, the output frame is processed to generate 3D image data, and the 3D image data is sent to a display device. In another embodiment, the output frame is processed to generate 3D video data, and the 3D video data is sent to a display device, such as the display device 1310 of FIG. 13. To illustrate, the display device may be a component of at least one of a communication device, a camera, a personal digital assistant, and a computer.

Figure 27:
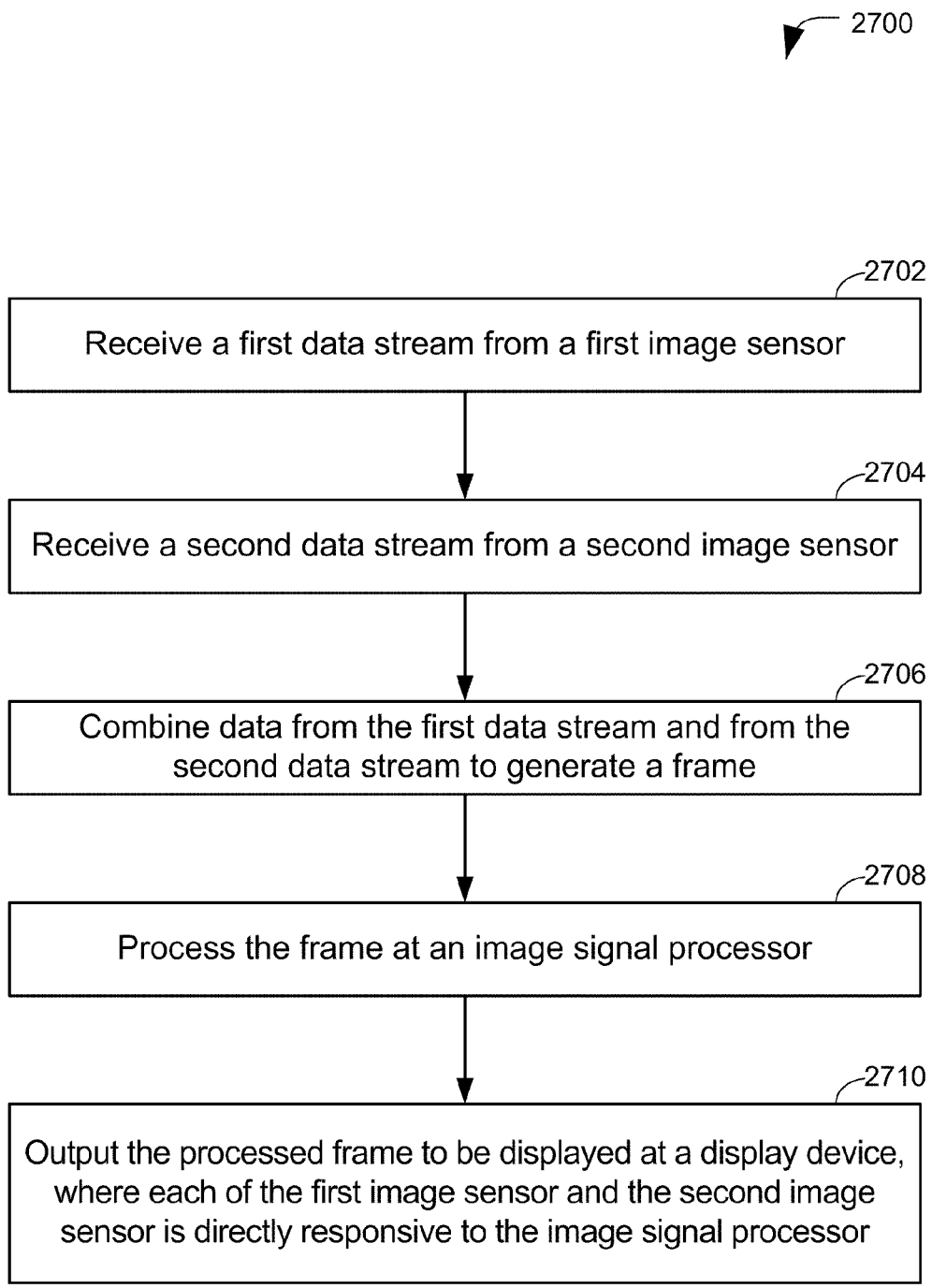
FIG. 27 is a flow diagram of a particular illustrative embodiment of a method of combining data from multiple sensors into a frame.

Referring to FIG. 27, a flow diagram of an illustrative embodiment of a method of combining data from multiple sensors into a frame is depicted and generally designated 2700. As an illustrative example, the method 2700 may be performed by the system of FIG. 2, the system of FIG. 5, or any combination thereof.

A first data stream may be received from a first image sensor, such as the first sensor 202 of FIG. 2, at 2702. The first data stream, such as the first image data stream 212 of FIG. 2, the first data stream 602 of FIG. 6, or the timing data signal 420 and the image data signal 422 of FIG. 5, may correspond to first image data of an image. A second data stream may be received from a second image sensor, such as the second sensor 204 of FIG. 2, at 2704. The second data stream, such as the second image data stream 214 of FIG. 2, the second data stream 604 of FIG. 6, or the timing signal data 430 and the image data signal 432 of FIG. 5, may correspond to second image data of the image.

Data from the first data stream and data from the second data stream may be combined, at 2706. For example, a combiner, such as the combiner 206 of FIG. 2 or the combiner 206 of FIG. 5, may combine the first image data from the first data stream and the second image data from the second data stream and generate a resulting frame. To illustrate, the first data stream may include data associated with a first line of the first image data including line data having a first line index value, line data having a second line index value, etc. The second data stream may include line data that corresponds to that of the first data stream, including corresponding line data having a first line index value, and corresponding line data having a second line index value, etc. The line data from the first data stream having the first line index value and the line data from the second data stream having the corresponding first line index value may be appended to each other, or combined, to form a single image line. The process may be repeated for each line index value to generate the resulting frame, such as the frame 660 of FIG. 6. In a particular embodiment, the frame may include a plurality of rows, where each row corresponds to a line index value and stores a line of the first image data having the line index value and stores a corresponding line of the second image data having the line index value. In a particular embodiment, when the first line of the first image data and the corresponding line of the second image data are combined into a single image line, the size of the single image line is substantially double that of the first line of the first image data or the corresponding line of the second image data.

The frame may be processed at an image signal processor to generate a processed frame, at 2708. In a particular embodiment, the image signal processor may be the image signal processor 208 of FIG. 2 or the image signal processor 208 of FIG. 5, and the processed frame may be the processed frame 240 of FIG. 2 or the processed frame 650 of FIG. 6. In a particular embodiment, the processed frame may include a first section including first image data from the first image sensor, such as the first section 652, a second section including second image data from the second image sensor, such as the second section 654, and a gap section, such as the gap section 656 of FIG. 6. The gap section may include non-image data disposed between the first section and the second section. In a particular embodiment, the first section may include a line of the first image data and the second section may include a corresponding line of the second image data.

The processed frame may be output to be displayed at a display device, at 2710. In a particular embodiment, the first image sensor and the second image sensor are each directly responsive to the image signal processor, and the display device may be decoupled from the image signal processor.

Figure 28:
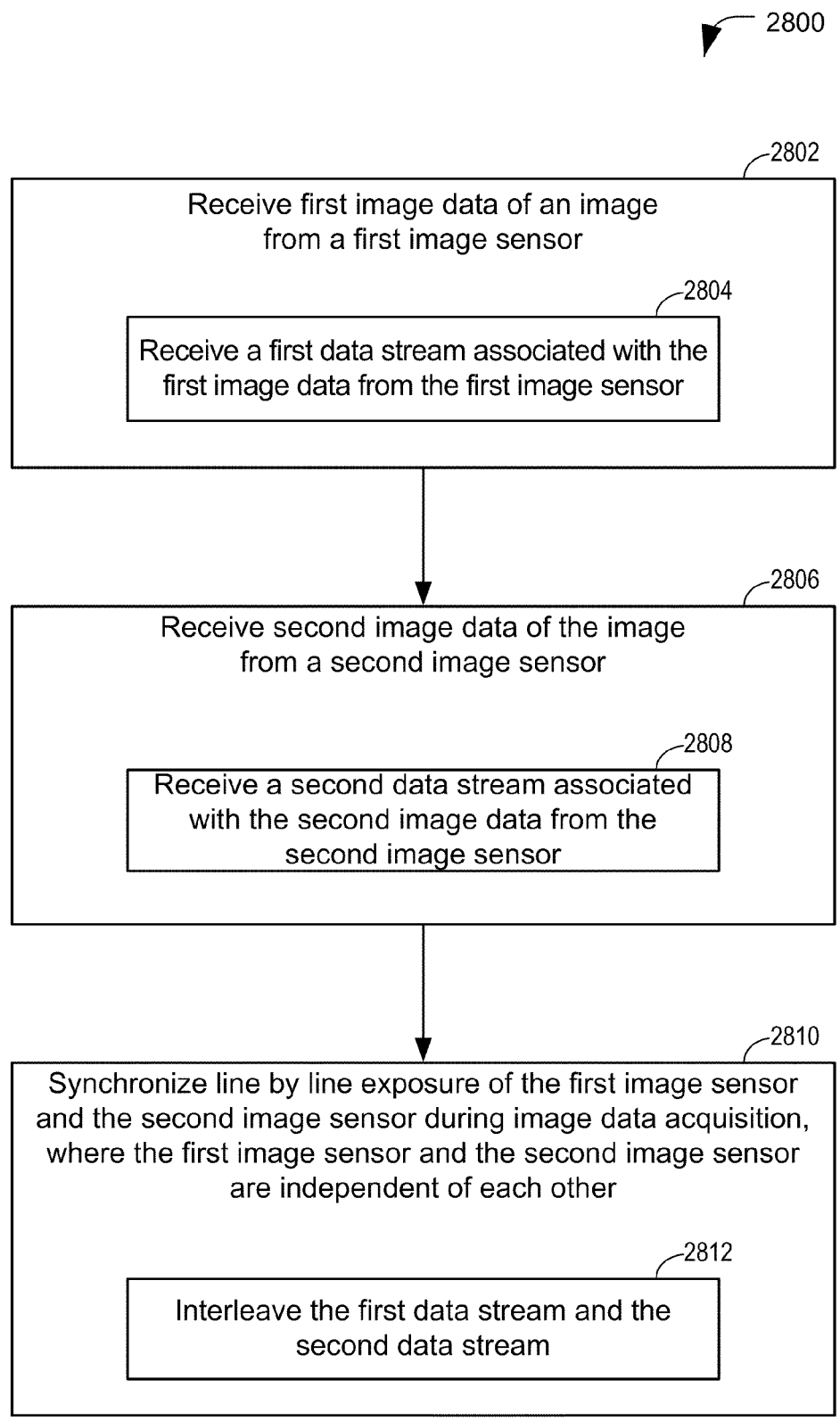
FIG. 28 is a flow diagram of a particular illustrative embodiment of a method of synchronizing line by line exposure of a first image sensor and a second image sensor.

Referring to FIG. 28, a flow diagram of an illustrative embodiment of a method of synchronizing a first image sensor and a second image sensor is depicted and generally designated 2800. As an illustrative example, the method 2800 may be performed at the system 200 of FIG. 2, the system 600 of FIG. 5, or any combination thereof.

First image data of an image may be received from a first image sensor, at 2802. In a particular embodiment, the first image sensor may be the first sensor 202 of FIG. 2. A first data stream associated with the first image data may be received from the first image sensor, at 2804. In a particular embodiment, the first data stream may be generated by the image sensor and may be the first image data stream 212 of FIG. 2, the first data stream 602 of FIG. 6, or the timing data signal 420 and the image data signal 422 of FIG. 5.

Second image data of the image may be received from a second image sensor, at 2806. In a particular embodiment, the second image sensor may be the second sensor 204 of FIG. 2. A second data stream associated with the second image data may be received from the second image sensor, at 2808. In a particular embodiment, the second data stream may be generated by the image sensor and may be the second image data stream 214 of FIG. 2, the second data stream 604 of FIG. 6, or the timing data signal 430 and the image data signal 432 of FIG. 5.

Line by line exposure of the first image sensor and the second image sensor during image data acquisition may be synchronized, at 2810. In a particular embodiment, the synchronization may occur during image data acquisition of an image at a host including a combiner, such as the combiner 206 of FIG. 2 or the combiner 206 of FIG. 5. In a particular embodiment, the first image sensor and the second image sensor are independent of each other. For example, the first and second sensors 202, 204 of FIG. 2 are directly responsive to the image signal processor 208 via the control signal 232 to have similar timing characteristics while remaining independent of each other. The first data stream and the second data stream may be interleaved, at 2812. In a particular embodiment, the first data stream and the second data stream may be interleaved on a line by line basis. For example, line data from the first data stream having a first line index value and line data from the second data stream having a corresponding first line index value may be appended to each other to form an interleaved single image line.

Thus, the combined data may be efficiently processed using a single image signal processor. Thus, overall image system cost and complexity may be reduced compared to multiple processor systems in which a processor is assigned to each sensor.

Figure 29:
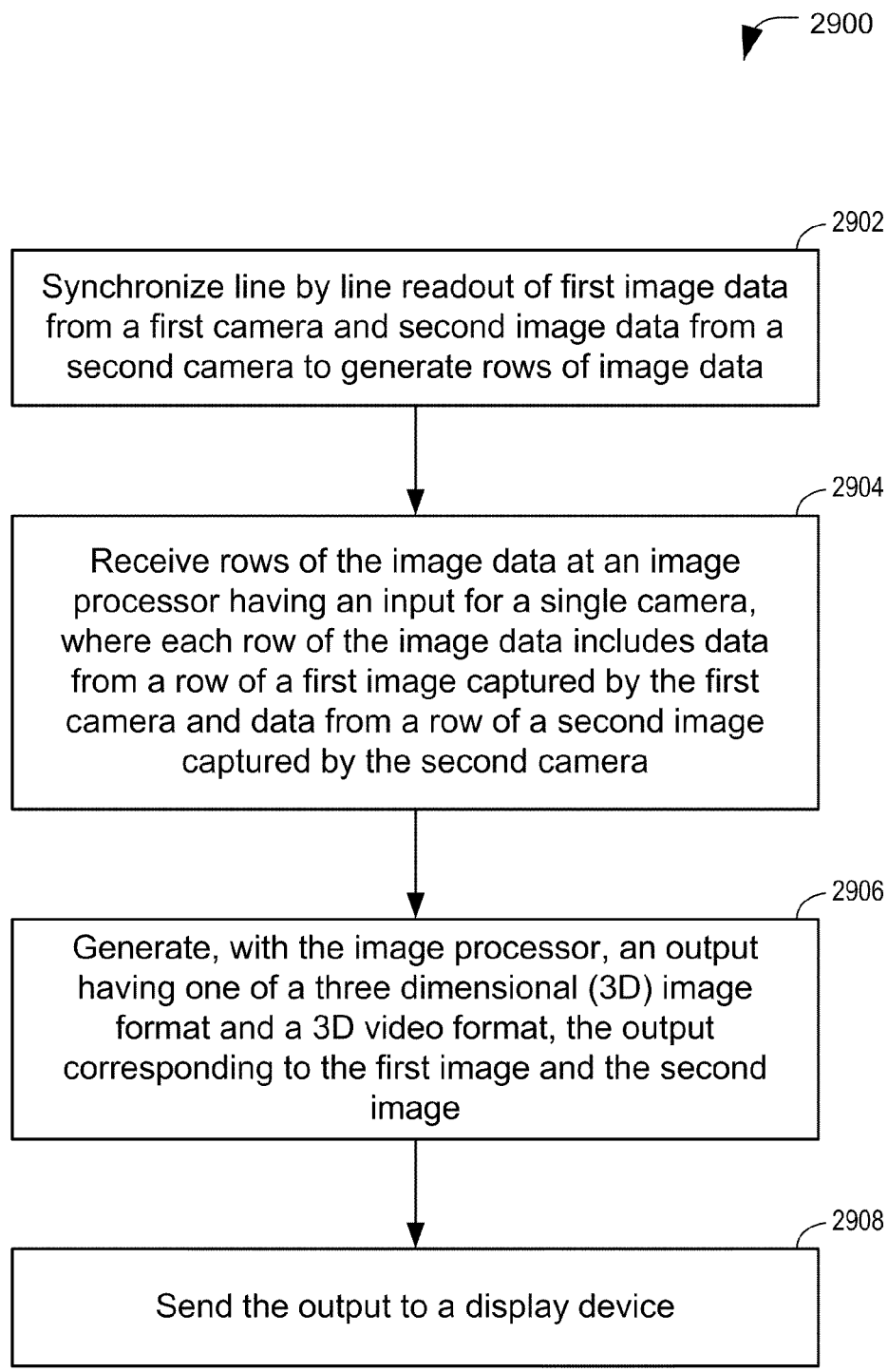
FIG. 29 is a flow diagram of a first illustrative embodiment of a method of combining data from multiple sensors to generate three dimensional image data.

Referring to FIG. 29, a flow diagram of a first illustrative embodiment of a method of combining data from multiple image sensors to generate 3D image data is depicted and generally designated 2900. As an illustrative example, the method 2900 may be performed by the system of FIG. 13.

The method includes synchronizing line by line readout of first image data from a first camera and a second camera to generate rows of image data, at 2902. The first image data from the first camera may be the image data stream 1314 from the first image sensor 1302 of FIG. 1 and the second image data may be the image data stream 1316 from the second image sensor 1304 of FIG. 13.

The method includes receiving rows of the image data at an image processor having an input for a single camera, at 2904. Each row of the image data includes data from a row of a first image captured by the first camera and data from a row of a second image captured by the second camera. The rows of image data may be the data out stream 706 depicted in FIG. 7.

The method includes generating, with the image processor, an output having one of a 3D image format and a 3D video format, at 2906. The output corresponds to the first image and the second image. The output is sent to a display device (e.g., the display device 1310 of FIG. 13), at 2908.

Figure 30:
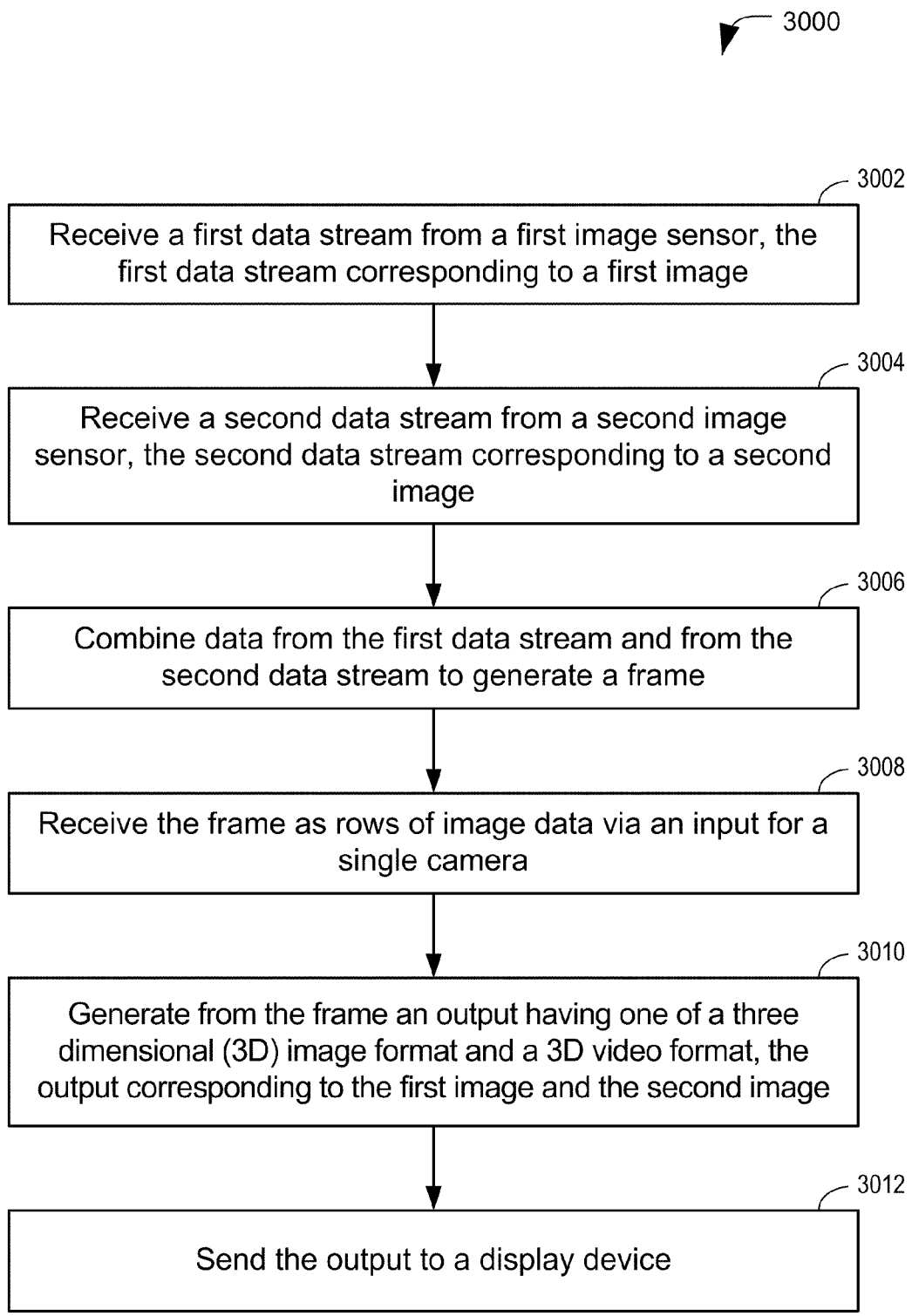
FIG. 30 is a flow diagram of a second illustrative embodiment of a method of combining data from multiple sensors to generate three dimensional image data.

Referring to FIG. 30, a flow diagram of an illustrative embodiment of a method of combining data from multiple sensors into a frame is depicted and generally designated 3000. As an illustrative example, the method 3000 may be performed by the system of FIG. 13.

A first data stream is received from a first image sensor, such as the first image sensor 1302 of FIG. 13, at 3002. The first data stream, such as the first image data stream 1314 of FIG. 13 or the first data stream 702 of FIG. 7 may correspond to first image data of a first image. A second data stream may be received from a second image sensor, such as the second image sensor 1304 of FIG. 13, at 3004. The second data stream, such as the second image data stream 1316 of FIG. 13, the second data stream 704 of FIG. 7 may correspond to second image data of a second image. The first image and the second image may be images of a scene. The first image and the second image of the scene may be taken at substantially the same time, or may be taken at different times. The first image may be taken from a different vantage point than the second image so that depth information can be determined from the first image and the second image of the scene.

Data from the first data stream and data from the second data stream is combined, at 3006. For example, a combiner, such as the combiner 1306 of FIG. 13 may combine the first image data from the first data stream and the second image data from the second data stream and generate a resulting frame. To illustrate, the first data stream may include data associated with a first line of the first image data including line data having a first line index value, line data having a second line index value, etc. The second data stream may include line data that corresponds to that of the first data stream, including corresponding line data having a first line index value, and corresponding line data having a second line index value, etc. The line data from the first data stream having the first line index value and the line data from the second data stream having the corresponding first line index value may be appended to each other, or combined, to form a single image line. The process may be repeated for each line index value to generate the resulting frame, such as the frame 740 of FIG. 7. In a particular embodiment, the frame may include a plurality of rows, where each row corresponds to a line index value and stores a line of the first image data having the line index value and stores a corresponding line of the second image data having the line index value. In a particular embodiment, when the first line of the first image data and the corresponding line of the second image data are combined into a single image line, the size of the single image line is substantially double that of the first line of the first image data or the corresponding line of the second image data.

The frame is received as rows of image data via an input for a single camera, at 3008. In a particular embodiment, the input for the single camera may be the input of an image processor, such as the image processor 1308 of FIG. 13. The frame may be frame 740 of FIG. 7.

An output is generated from the frame, at 3010. The output has one of a 3D image format and a 3D video format. The output corresponds to the first image and the second image. The output may be the processed frame data 1320 of FIG. 13. The output is sent to a display device, at 3012. In a particular embodiment, the display device may be the display device 1310 of FIG. 13.

Figure 31:
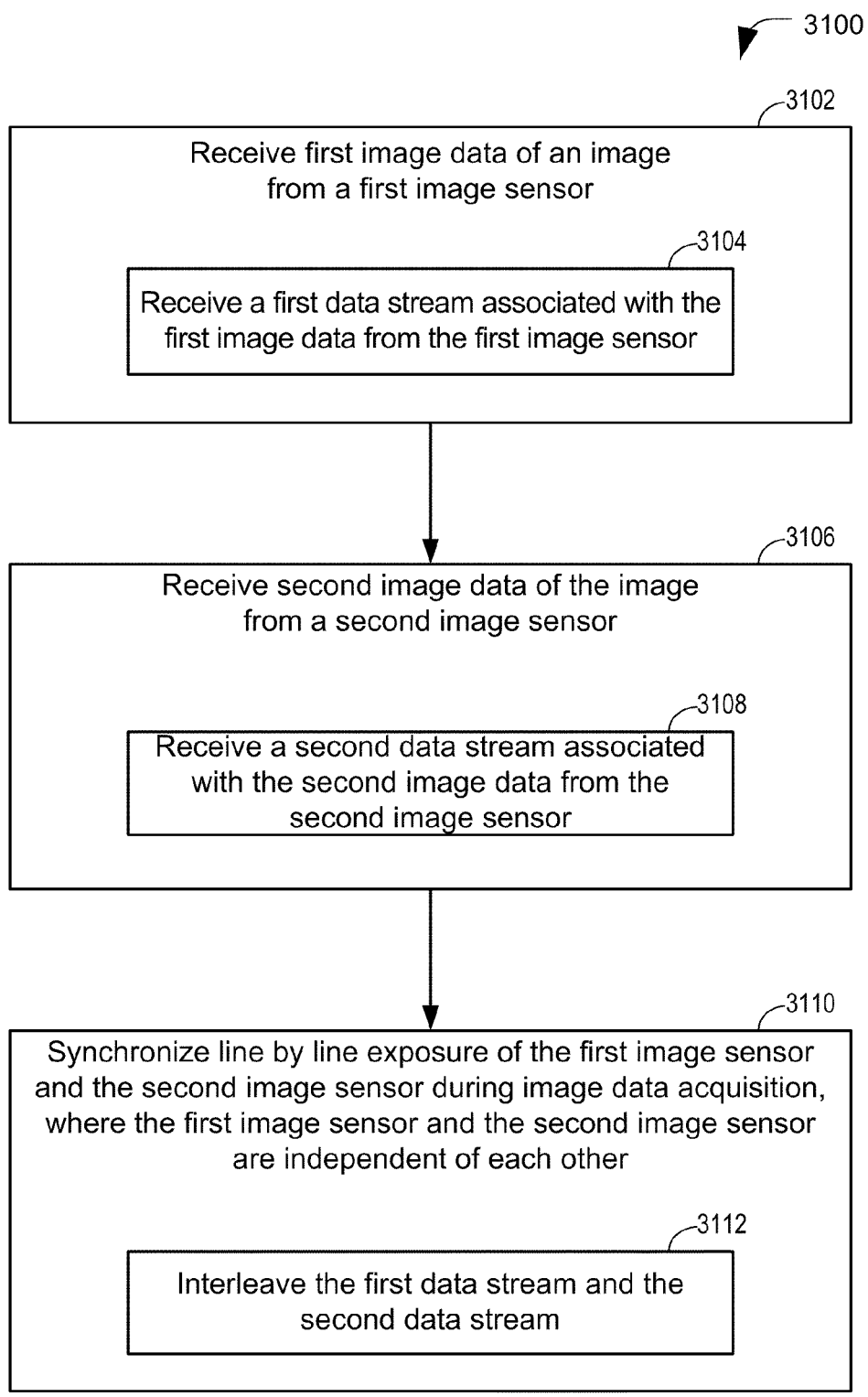
FIG. 31 is a flow diagram of a particular illustrative embodiment of a method of synchronizing line by line exposure of a first image sensor and a second image sensor.

Referring to FIG. 31, a flow diagram of an illustrative embodiment of a method of synchronizing a first image sensor and a second image sensor is depicted and generally designated 3100. As an illustrative example, the method 3100 may be performed by the system 1300 of FIG. 13.

First image data of an image may be received from a first image sensor, at 3102. In a particular embodiment, the first image sensor may be the first image sensor 1302 of FIG. 13. A first data stream associated with the first image data may be received from the first image sensor, at 3104. In a particular embodiment, the first data stream may be generated by the image sensor and may be the first image data stream 1314 of FIG. 13 or the first data stream 702 of FIG. 7.

Second image data of the image may be received from a second image sensor, at 3106. In a particular embodiment, the second image sensor may be the second image sensor 1304 of FIG. 13. A second data stream associated with the second image data may be received from the second image sensor, at 3108. In a particular embodiment, the second data stream may be generated by the image sensor and may be the second image data stream 1316 of FIG. 13 or the second data stream 704 of FIG. 7.

Line by line exposure of the first image sensor and the second image sensor during image data acquisition may be synchronized, at 3110. In a particular embodiment, the synchronization may occur during image data acquisition of an image at a host including a combiner, such as the combiner 1306 of FIG. 13. In a particular embodiment, the first image sensor and the second image sensor are independent of each other. For example, the first and second image sensors 1302, 1304 of FIG. 13 may be directly responsive to the image processor 1308 via a control signal to have similar timing characteristics while remaining independent of each other. In another embodiment, the first and second image sensors 1302, 1304 are directly responsive to the combiner 1306 via a control signal to have similar timing characteristics while remaining independent of each other. The first data stream and the second data stream may be interleaved, at 3112. In a particular embodiment, the first data stream and the second data stream may be interleaved on a line by line basis. For example, line data from the first data stream having a first line index value and line data from the second data stream having a corresponding first line index value may be appended to each other to form an interleaved single image line.

Thus, the combined data may be efficiently processed using a single image processor. Thus, overall image system cost and complexity may be reduced compared to multiple processor systems in which a processor is assigned to each sensor.

Figure 32:
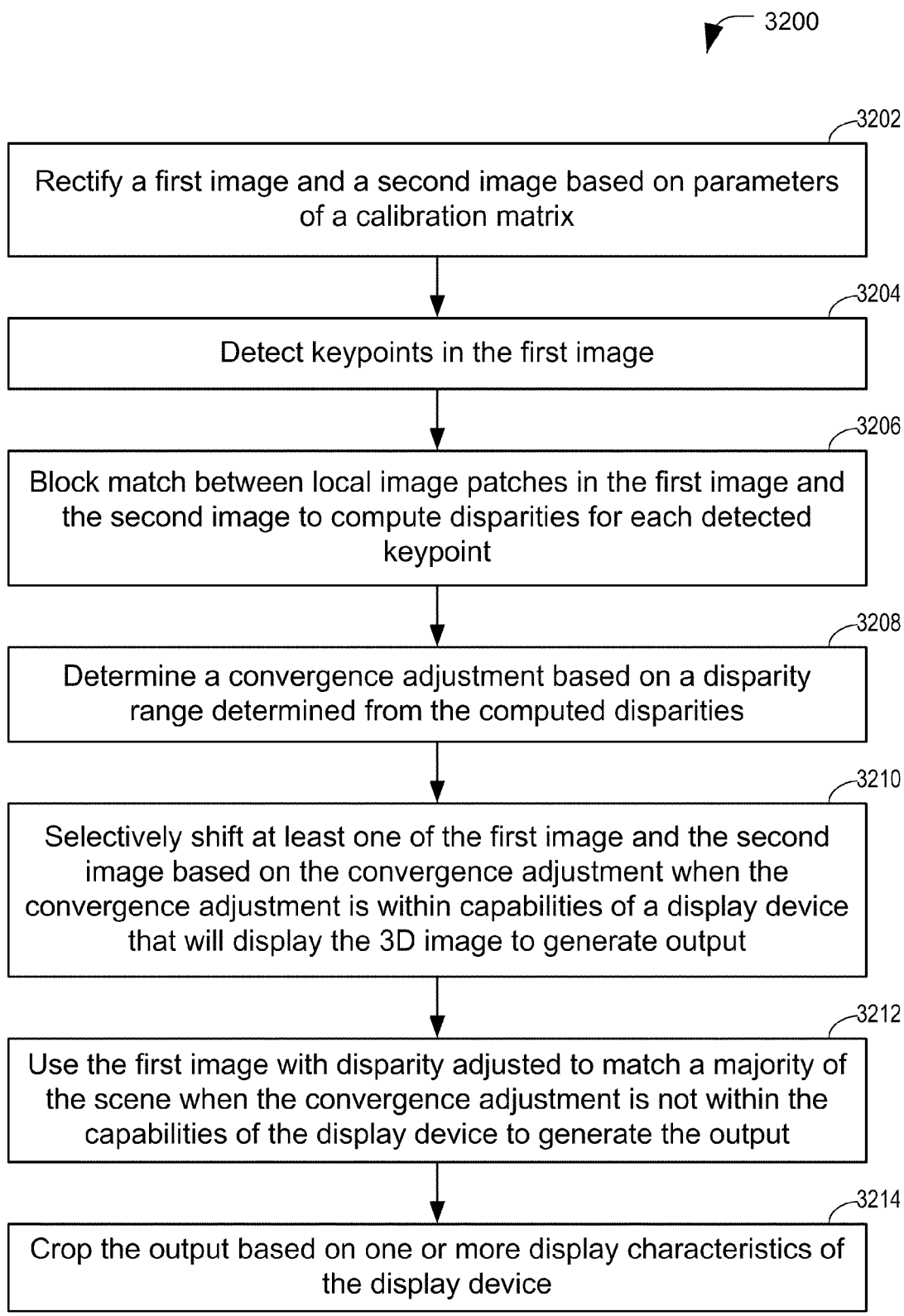
FIG. 32 is a flow diagram of a particular illustrative embodiment of a method of combining data from multiple sensors to generate three dimensional image data from a synchronized data line.

Referring to FIG. 32, a flow diagram of an illustrative embodiment of a method of generating a 3D image with an image processor is depicted and generally designated as 3200. The image processor may be the image processor 1308 of FIG. 13. The method 3200 may be used when the image processor treats a frame received from a combiner (e.g., the combiner 1306 of FIG. 1), a frame from a memory, or when a user chooses to alter a displayed 3D image using a zoom feature or a pan feature of a device displaying the 3D image.

The image processor rectifies a first image and a second image based on parameters of a calibration matrix, at 3202. The calibration matrix may provide adjustments for relative positions of a first image sensor and a second image sensor that capture the first image and the second image. The relative positions of the two cameras may be selected to ensure minimal scene distortion and eye strain. The calibration matrix may be determined during a manufacturing process for a device that takes the 3D image where the positions of the first image sensor and the second image sensor are fixed relative to each other. The calibration may be stored in a memory of the device. For a device that takes the 3D image where the positions of the first image sensor, the second image sensor, or both are adjustable, a processor of the device may be used to run a calibration routine to determine the calibration matrix and store the calibration matrix in the memory. The calibration routine may require the first image sensor and the second image sensor to be focused on a particular calibration scene positioned a set distance from the image sensors. The calibration routine may be performed after position adjustment of the image sensors relative to each other.

The image processor detects keypoints in the first image, at 3204. The image processor may detect distinctive (high frequency) points in the first image. The image processor block matches between local image patches in the first image and the second image to compute disparities for each detected keypoint in the first image, at 3206. A reliability estimator may be produced for every keypoint to insure that erroneous matches are discarded. The image processor determines a convergence adjustment based on a disparity range determined from the computed disparities, at 3208. The convergence adjustment takes scene depth and display geometry into consideration.

The image processor selectively shifts at least one of the first image and the second image based on the convergence adjustment when the convergence adjustment is within capabilities of a display device that will display the 3D image to generate output, at 3210. The image processor uses the first image with disparity adjusted to match a majority of the scene when the convergence adjustment is not within the capabilities of the display device to generate the output, at 3212. The image processor crops the output based on one or more display characteristics of the display device, at 3214.

Figure 33:
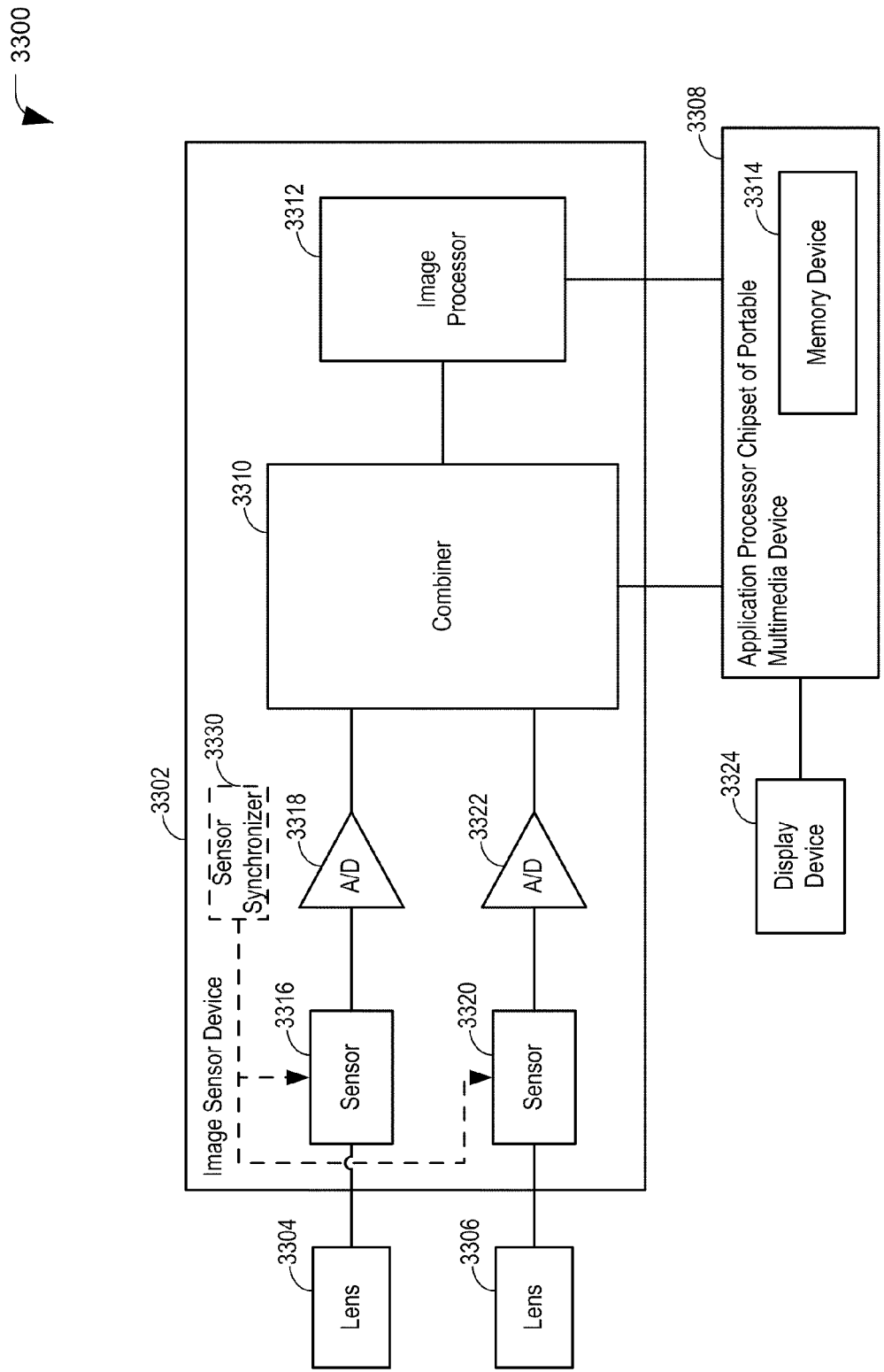
FIG. 33 is a block diagram of a particular illustrative embodiment of an image processing system to combine data from multiple image sensors.

FIG. 33 is a block diagram of a particular embodiment of an image processing system 3300 to combine data from multiple image sensors. The image processing system 3300 may include an image sensor device 3302 that is coupled to a first lens 3304, coupled to a second lens 3306, and coupled to an application processor chipset of a portable multimedia device 3308. The image sensor device 3302 may include a combiner 3310 and an image processor 3312 that receives input for a single camera. The image processor 3312 may receive the single camera input from the combiner 3310 or from a memory device 3314 of the application processor chipset of the portable multimedia device 3308. The combiner 3310 may combine data from a first data stream and from a second data stream to generate a frame, such as by implementing the system 1300 of FIG. 13, by operating in accordance with any of the embodiments of FIGS. 29-31, or any combination thereof.

The combiner 3310 is coupled to receive image data from a first sensor 3316 via a first analog-to-digital convertor 3318. The combiner 3310 is coupled to receive image data from a second sensor 3320 via a second analog-to-digital convertor 3322. The combiner 3310 or the image processor 3312 may control the first sensor 3316 and the second sensor 3320, which may be otherwise independent of each other. In a particular embodiment, the image processor 3312 may control the first sensor 3316 and the second sensor 3320 via a sensor synchronizer 3330 (shown in shadow).

In a particular embodiment, an integrated circuit that includes image processing circuitry, such as the combiner 3310, is configured to generate a frame. The image processing circuitry is configured to receive a first data stream from a first image sensor, such as the first sensor 3316, to receive a second data stream from a second image sensor, such as the second sensor 3320, and to combine data from the first data stream and from the second data stream to generate the frame. For example, the first data stream 702 and the second data stream 704 of FIG. 7 may be combined by the combiner 3310 to form the frame 740 of FIG. 7.

Output from the combiner 3310 may be sent to a memory device 3314 of the application processor chipset of the portable multimedia device 3308, to an image processor 3312, or both. The image processor 3312 may be configured to perform additional image processing operations, such as one or more operations performed by an image processing system. The image processor 3312 may receive a frame from the combiner 3310 or from the memory device 3314. The image processor 3312 may produce processed image data such as a processed frame having a 3D image format or a 3D video format. In an embodiment, an average time for producing processed image data is about 20 milliseconds. The image processor 3312 may provide the processed image data to the application processor chipset of the portable multimedia device 3308 for further processing, transmission, storage, display to a display device 3324, or any combination thereof.

Figure 34:
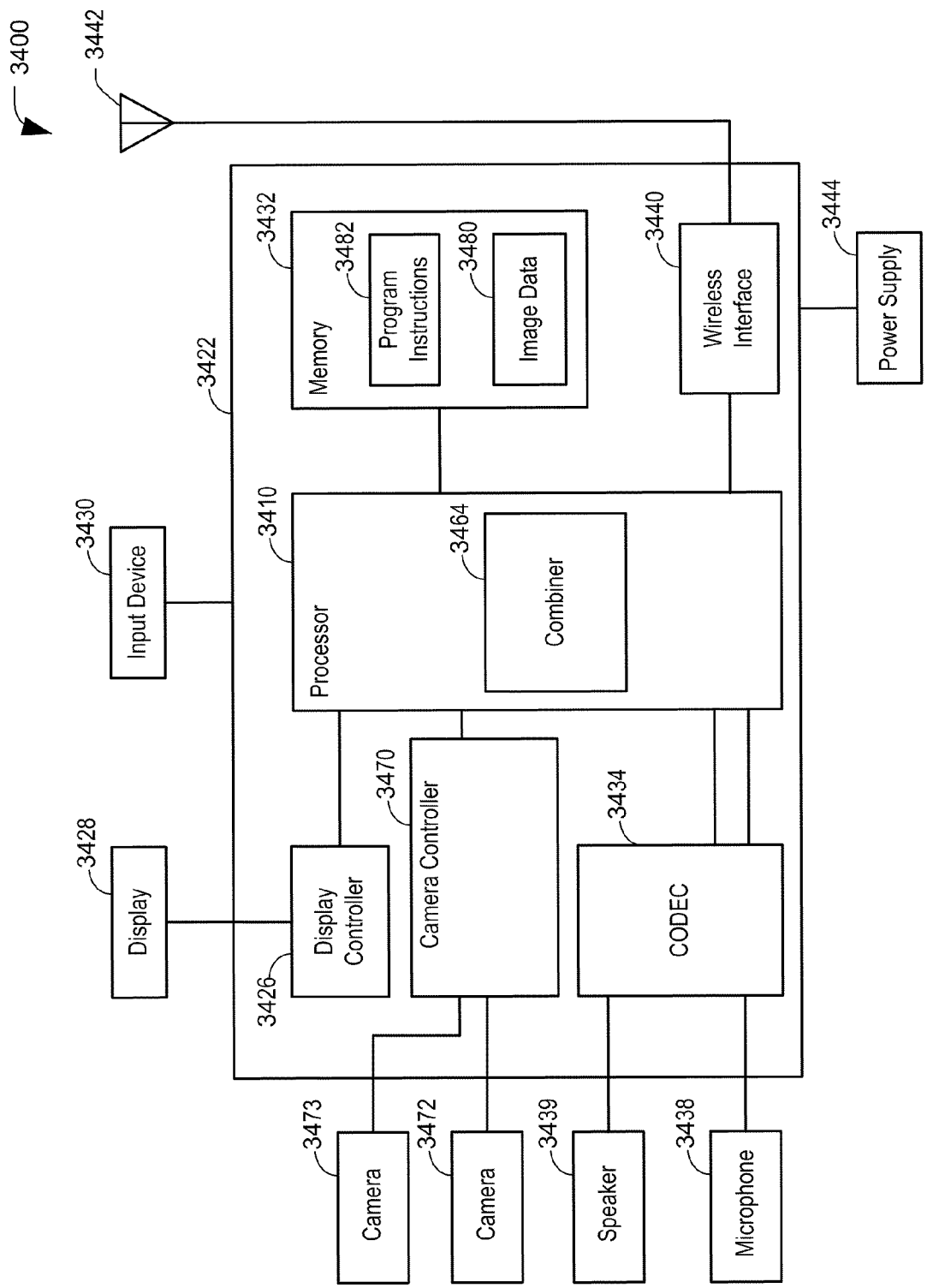
FIG. 34 is a block diagram of a first illustrative embodiment of a wireless device including an image processing system to combine data from multiple image sensors.

Referring to FIG. 34, a block diagram of a particular illustrative embodiment of an electronic device, such as a wireless phone, including a frame generator module, as described herein, is depicted and generally designated 3400. The device 3400 includes a processor 3410 coupled to a memory 3432. The processor includes or is coupled to a controller 3464. Alternatively, the electronic device may be a set top box, a music player, a video player, an entertainment unit, a navigation device, a communications device, a personal digital assistant (PDA), a camera, a fixed location data unit, or a computer.

FIG. 34 also shows a display controller 3426 that is coupled to the processor 3410 and to a display 3428. A coder/decoder (CODEC) 3434 can also be coupled to the processor 3410. A speaker 3439 and a microphone 3438 can be coupled to the CODEC 3434. A camera controller 3470 can also be coupled to the processor 3410. A first camera 3472 and a second camera 3473 can be coupled to the camera controller 3470.

FIG. 34 also indicates that a wireless interface 3440 can be coupled to the processor 3410 and to a wireless antenna 3442. In a particular embodiment, the processor 3410, the display controller 3426, the memory 3432, the CODEC 3434, the wireless interface 3440, and the controller 3464 are included in a system-in-package or system-on-chip 3422. In a particular embodiment, an input device 3430 and a power supply 3444 are coupled to the on-chip system 3422. Moreover, in a particular embodiment, as illustrated in FIG. 34, the display 3428, the input device 3430, the speaker 3439, the microphone 3438, the wireless antenna 3442, and the power supply 3444 are external to the on-chip system 3422. However, each can be coupled to a component of the on-chip system 3422, such as an interface or a controller.

In a particular embodiment, the processor 3410 executes processor-readable program instructions from a processor-readable medium, such as program instructions 3482 stored at the memory 3432. For example, the memory 3432 may be readable by the processor 3410 and the instructions 3482 may be operational instructions that are executable by the processor 3410 to perform the method 2200 of FIG. 22. For example, the instructions 3482 may include instructions that are executable by the processor 3410 to receive a first data stream from a first image sensor, such as the camera 3473 to receive a second data stream from a second image sensor, such as the camera 3472, and to combine data from the first data stream and from the second data stream to generate a frame. For example, the first image sensor may be the first sensor 202 of FIG. 2 and the second image sensor may be the second sensor 204 of FIG. 2. The instructions 3482 may further include instructions that are executable by the processor 3410 to process the frame at the processor 3410 or at an image signal processor (not shown) to generate a processed frame. The instructions 3482 may further include instructions that are executable by the processor 3410 to output the processed frame to be displayed at the display device 3428 or stored at the memory 3432 as image data 3480.

Figure 35:
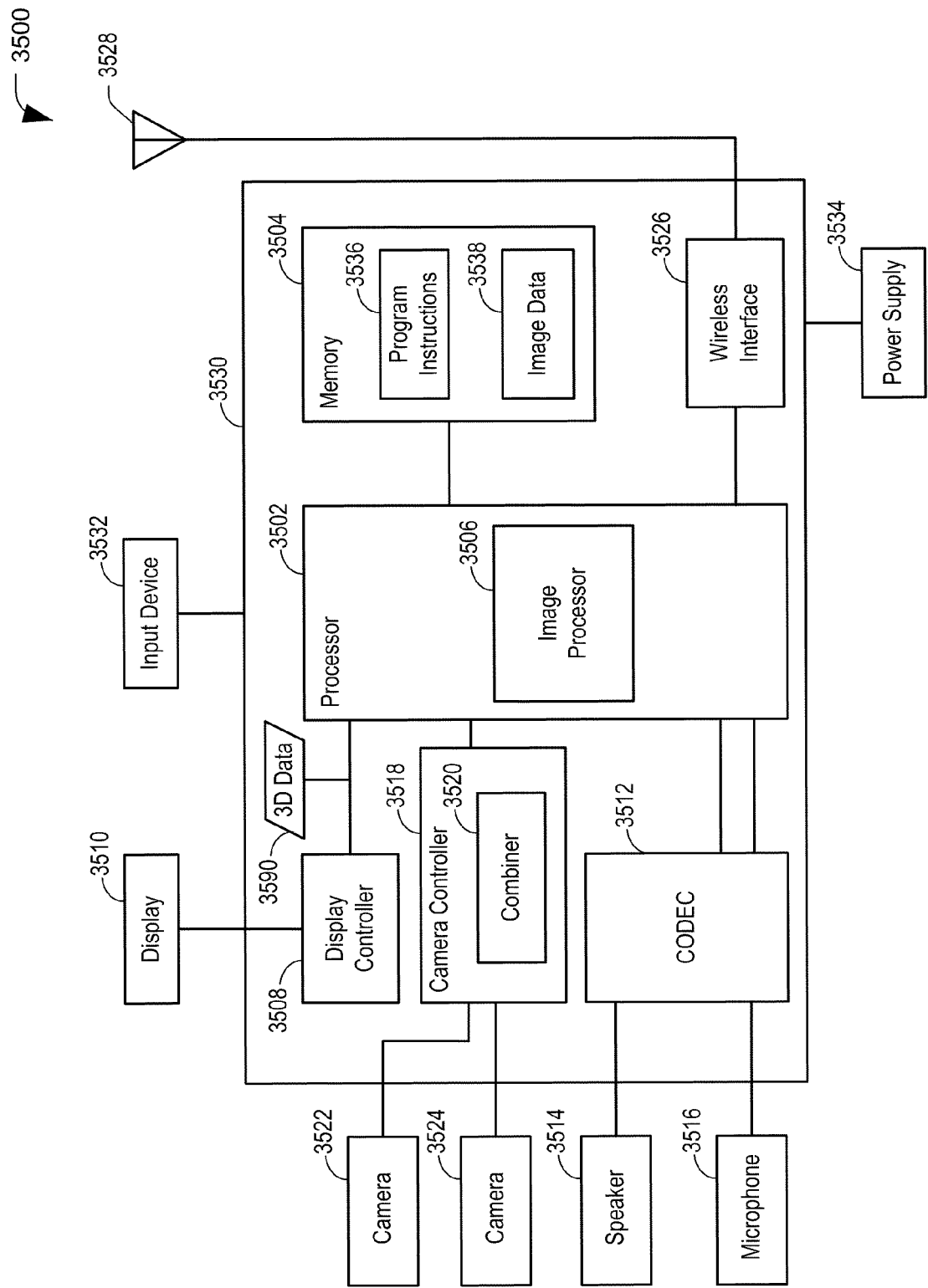
FIG. 35 is a block diagram of a second illustrative embodiment of a wireless device including an image processing system to combine data from multiple image sensors.

Referring to FIG. 35, a block diagram of a particular illustrative embodiment of an electronic device, such as a mobile phone, is depicted and generally designated 3500. The device 3500 includes a processor 3502 coupled to a memory 3504. The processor 3502 includes or is coupled to an image processor 3506. The image processor 3506 may receive a single camera input and may output 3D data 3590. The 3D data 3590 may be in 3D image format or 3D video format. Alternatively, the electronic device 3500 may be a set top box, a music player, a video player, an entertainment unit, a navigation device, a communications device, a personal digital assistant (PDA), a camera, a fixed location data unit, a computer, or combinations thereof.

FIG. 35 also shows a display controller 3508 that is coupled to the processor 3502 and to a display 3510. A coder/decoder (CODEC) 3512 can also be coupled to the processor 3502. A speaker 3514 and a microphone 3516 can be coupled to the CODEC 3512. A camera controller 3518 can also be coupled to the processor 3502. The camera controller 3518 may include a combiner 3520. The combiner 3520 may provide image data to the image processor 3506. As illustrative examples, the combiner 3520 may be the combiner 1306 of FIG. 13, or other hardware circuitry or processor configured to combine data from multiple cameras as illustrated with respect to FIG. 7. A first camera 3522 and a second camera 3524 can be coupled to the camera controller 3518.

FIG. 35 also indicates that a wireless interface 3526 can be coupled to the processor 3502 and to a wireless antenna 3528. In a particular embodiment, the processor 3502, the display controller 3508, the memory 3504, the CODEC 3512, the camera controller 3518, and the wireless interface 3526 are included in a system-in-package or system-on-chip 3530. In a particular embodiment, an input device 3532 and a power supply 3534 are coupled to the on-chip system 3530. Moreover, in a particular embodiment, as illustrated in FIG. 35, the display 3510, the input device 3532, the speaker 3514, the microphone 3516, the wireless antenna 3528, and the power supply 3534 are external to the on-chip system 3530. However, each can be coupled to a component of the on-chip system 3530, such as an interface or a controller.

In a particular embodiment, the processor 3502 executes processor-readable program instructions from a processor-readable medium, such as program instructions 3536 stored at the memory 3504. For example, the memory 3504 may be readable by the processor 3502 and the instructions 3536 may be operational instructions that are executable by the processor 3502 to perform the method 2500 of FIG. 25. For example, the instructions 3536 may include instructions that are executable by the processor 3502 to receive a first data stream from a first image sensor, such as the camera 3522, to receive a second data stream from a second image sensor, such as the camera 3524, and to combine data from the first data stream and from the second data stream using the combiner 3520 of the camera controller 3518 to generate a frame. For example, the first image sensor may be the first image sensor 1302 of FIG. 13, and the second image sensor may be the second image sensor 1304 of FIG. 13. The instructions 3536 may further include instructions that are executable by the processor 3502 to process the frame at the image processor 3506 to generate a processed frame. The instructions 3536 may further include instructions that are executable by the processor 3502 to output the processed frame as 3D data to the display controller 3508 for display at the display device 3510 or to store the processed frame at the memory 3504 as image data 3538.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present disclosure.

The methods of FIGS. 22-32 may be performed by executing program code that may be stored in memory in the form of computer readable instructions. In that case, a processor, such as a digital signal processor (DSP) an image signal processor (ISP), or other processor, may execute instructions stored in memory in order to carry out one or more of the image processing methods. In some cases, the methods may be executed by a DSP or ISP that invokes various hardware components to accelerate the image processing. In other cases, the units described herein may be implemented as, or methods may be performed by, a microprocessor, one or more application specific integrated circuits (ASICs), one or more field programmable gate arrays (FPGAs), or any combination thereof.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory computer readable storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
providing a common control signal to multiple image sensors, wherein each of the multiple image sensors is responsive to the common control signal to generate data lines, and wherein each data line corresponds to a line of image data;
receiving synchronized data output from each of the multiple image sensors;
rectifying the synchronized data output using a calibration matrix, wherein the calibration matrix accounts for non-ideal position and alignment of the multiple image sensors; and
forming a combined image frame, wherein the combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

2. The method of claim 1, wherein the synchronized data output includes first data lines received from a first image sensor and second data lines received from a second image sensor, and wherein a phase offset between each received data line from the first image sensor and each corresponding data line from the second image sensor is substantially constant.

3. The method of claim 1, wherein the multiple image sensors capture image data from a common focal plane of a main lens to generate the synchronized data output.

4. The method of claim 1, wherein the common control signal is provided by a sensor synchronizer that is coupled to each of the multiple image sensors via an inter-integrated circuit (I2C) control interface.

5. The method of claim 1, wherein the synchronized data output includes multiple data lines, wherein each data line includes first data corresponding to a first line of a first image sensor, second data corresponding to a first line of a second image sensor, and multiple bits of non-image data between the first data and the second data.

6. The method of claim 1, wherein the common control signal is provided by a sensor synchronizer that is coupled to each of the multiple image sensors via an interface compliant with a camera serial interface (CSI) specification or a camera parallel interface (CPI) specification.

7. The method of claim 1, wherein the gap sections correspond to black pixels.

8. A method comprising:
receiving a common control signal at multiple image sensors, wherein each of the multiple image sensors is responsive to the common control signal to generate data lines, and wherein each data line corresponds to a line of image data; and
generating synchronized data output from each of the multiple image sensors, wherein the synchronized data output from each of the multiple image sensors corresponds to image data, and wherein each of the multiple image sensors captures corresponding image data from a different portion of a common focal plane of a main lens,
wherein a combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

9. The method of claim 8, wherein the synchronized data output includes first data lines generated by a first image sensor and second data lines generated by a second image sensor, and wherein a phase offset between each data line output from the first image sensor and each corresponding data line output from the second image sensor is substantially constant.

10. The method of claim 8, wherein the common control signal is received from a sensor synchronizer that is coupled to each of the multiple image sensors.

11. The method of claim 8, wherein the common control signal is received at each of the multiple image sensors via an inter-integrated circuit (I2C) control interface, and wherein the common control signal includes a camera reset signal, a camera clock signal, a control clock signal, and a control data signal.

12. The method of claim 8, wherein the gap sections correspond to black pixels.

13. The method of claim 8, wherein the common control signal is received at each of the multiple image sensors via an interface compliant with a camera serial interface (CSI) specification.

14. The method of claim 8, wherein the common control signal is received at each of the multiple image sensors via an interface compliant with a camera parallel interface (CPI) specification.

15. An apparatus comprising:
a sensor synchronizer configured to provide a common control signal to multiple image sensors to cause the multiple image sensors to generate data lines, wherein each data line corresponds to a line of image data;
a sensor data interface configured to receive synchronized data output from each of the multiple image sensors;
a memory device to store a calibration matrix, wherein the calibration matrix is usable to rectify the synchronized data output to account for non-ideal position and alignment of the multiple image sensors; and
an image processor configured to form a combined image frame, wherein the combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

16. The apparatus of claim 15, wherein the sensor synchronizer is coupled to each of the multiple image sensors via an inter-integrated circuit (I2C) control interface.

17. The apparatus of claim 15, wherein the common control signal includes a camera reset signal, a camera clock signal, a control clock signal, and a control data signal.

18. The apparatus of claim 15, wherein the sensor synchronizer is coupled to each of the multiple image sensors via an interface compliant with a camera serial interface (CSI) specification or a camera parallel interface (CPI) specification.

19. The apparatus of claim 15, wherein the gap sections correspond to black pixels.

20. An apparatus comprising:
a first image sensor;
a second image sensor, wherein the first image sensor and the second image sensor are configured to receive a common control signal and are responsive to the common control signal to generate synchronized data output, wherein the synchronized data output from the first image sensor and the second image sensor corresponds to data lines, wherein each data line corresponds to a line of image data, and wherein the first image sensor and the second image sensor capture corresponding image data from different portions of a common focal plane of a main lens; and
an image processor configured to form a combined image frame, wherein the combined image frame comprises image sections including image data from the first image sensor and the second image sensor and gap sections including non-image data that is disposed between the image sections and that is configured to align the image sections, wherein the combined image frame has multiple rows, and wherein each row includes at least one of the gap sections and includes a data line from each of the first image sensor and the second image sensor.

21. The apparatus of claim 20, wherein the synchronized data output includes first data lines generated by the first image sensor and second data lines generated by the second image sensor, and wherein a phase offset between each data line output from the first image sensor and each corresponding data line output from the second image sensor is substantially constant.

22. The apparatus of claim 20, wherein the first image sensor and the second image sensor are configured to receive the common control signal via an inter-integrated circuit (I2C) control interface.

23. The apparatus of claim 20, wherein the first image sensor and the second image sensor are configured to receive the common control signal via an interface compliant with a camera serial interface (CSI) specification.

24. The apparatus of claim 20, wherein the first image sensor and the second image sensor are configured to receive the common control signal via an interface compliant with a camera parallel interface (CPI) specification.

25. An apparatus comprising:
means for providing a common control signal to multiple image sensors to cause the multiple image sensors to generate data lines, wherein each data line corresponds to a line of image data;
means for receiving synchronized data output from each of the multiple image sensors;
means for rectifying the synchronized data output using a calibration matrix, wherein the calibration matrix accounts for non-ideal position and alignment of the multiple image sensors; and
means for forming a combined image frame, wherein the combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

26. The apparatus of claim 25, wherein the means for providing the common control signal is coupled to each of the multiple image sensors via an inter-integrated circuit (I2C) control interface.

27. The apparatus of claim 25, wherein the means for providing the common control signal is coupled to each of the multiple image sensors via an interface compliant with a camera serial interface (CSI) specification.

28. The apparatus of claim 25, wherein the means for providing the common control signal is coupled to each of the multiple image sensors via an interface compliant with a camera parallel interface (CPI) specification.

29. An apparatus comprising:
means for generating first image data;
means for generating second image data, wherein the first image data and the second image data comprise data lines, wherein the means for generating the first image data and the means for generating the second image data are configured to receive a common control signal and are responsive to the common control signal to generate synchronized data output; and
means for focusing light on a common focal plane, wherein the first image data corresponds to a first portion of the common focal plane and the second image data corresponds to a second portion of the common focal plane,
wherein a combined image frame comprises image sections including image data from the means for generating the first image data and the means for generating the second image data and gap sections including non-image data that is disposed between the image sections and that is configured to align the image sections, wherein the combined image frame has multiple rows, and wherein each row includes at least one of the gap sections and includes a data line from each of the means for generating first image data and the means for generating second image data.

30. The apparatus of claim 29, wherein a phase offset between each data line output from the means for generating the first image data and each corresponding data line output from the means for generating the second image data is substantially constant.

31. The apparatus of claim 29, wherein the means for generating the first image data and the means for generating the second image data are configured to receive the common control signal via an inter-integrated circuit (I2C) control interface.

32. A non-transitory computer readable-medium comprising instructions, which when executed by a processor cause the processor to:
provide a common control signal to multiple image sensors, wherein each of the multiple image sensors is responsive to the common control signal to generate data lines, and wherein each data line corresponds to a line of image data;

receive synchronized data output from each of the multiple image sensors;

rectify the synchronized data output using a calibration matrix, wherein the calibration matrix accounts for non-ideal position and alignment of the multiple image sensors; and form a combined image frame, wherein the combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

33. The non-transitory computer readable-medium of claim 32, wherein the synchronized data output includes first data lines received from a first image sensor and second data lines received from a second image sensor, and wherein a phase offset between each received data line from the first image sensor and each corresponding data line from the second image sensor is substantially constant.

34. A non-transitory computer readable-medium comprising instructions, which when executed by a processor cause the processor to:

receive a common control signal at multiple image sensors, wherein each of the multiple image sensors is responsive to the common control signal to generate data lines, and wherein each data line corresponds to a line of image data; and generate synchronized data output from each of the multiple image sensors, wherein the synchronized data output from each of the multiple image sensors corresponds to image data, and wherein each of the multiple image sensors captures corresponding image data from a different portion of a common focal plane of a main lens, wherein a combined image frame comprises image sections including image data from the multiple image sensors and gap sections including non-image data that is disposed between the image sections and that is configured to align the image sections, wherein the combined image frame has multiple rows, and wherein each row includes at least one of the gap sections and includes a data line from each of the multiple image sensors.

35. The non-transitory computer readable-medium of claim 34, wherein the synchronized data output includes first data lines generated by a first image sensor and second data lines generated by a second image sensor, and wherein a phase offset between each data line output from the first image sensor and each corresponding data line output from the second image sensor is substantially constant.

* * * * *